(12) United States Patent
Siminoff

(10) Patent No.: US 12,096,156 B2
(45) Date of Patent: *Sep. 17, 2024

(54) CUSTOMIZABLE INTRUSION ZONES ASSOCIATED WITH SECURITY SYSTEMS

(71) Applicant: Amazon Technologies, Inc., Seattle, WA (US)

(72) Inventor: James Siminoff, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/897,792

(22) Filed: Feb. 15, 2018

(65) Prior Publication Data

US 2018/0176512 A1    Jun. 21, 2018

Related U.S. Application Data

(63) Continuation-in-part of application No. 15/794,001, filed on Oct. 26, 2017.
(Continued)

(51) Int. Cl.
*H04N 7/18*  (2006.01)
*G06F 3/04847*  (2022.01)
(Continued)

(52) U.S. Cl.
CPC ......... *H04N 7/181* (2013.01); *G06F 3/04847* (2013.01); *G06V 10/235* (2022.01);
(Continued)

(58) Field of Classification Search
CPC .... H04N 7/188; H04N 7/181; G06K 9/00771; G06K 9/2081; G08B 13/19602; G08B 13/19652; G06F 3/04897; G06F 3/04847
See application file for complete search history.

(56) References Cited

U.S. PATENT DOCUMENTS 3,653,044 A     3/1972  Breeze et al.
4,249,207 A  *  2/1981  Harman ............. G06K 9/00771
                                                              340/541
(Continued)

FOREIGN PATENT DOCUMENTS

CA    2511886    1/2006
CA    2814294    10/2014
(Continued)

OTHER PUBLICATIONS

Ahn, Jeong Hwan International Search Report and Written Opinion of the International Searching Authority for PCT/US2017/058383, Apr. 5, 2018, International Application Division, Korean Intellectual Property Office, Republic of Korea.
(Continued)

*Primary Examiner* — Daniel T Tekle
(74) *Attorney, Agent, or Firm* — Lee & Hayes, P.C.

(57) ABSTRACT

The present application is directed to creating intrusion zones for security systems. For example, a client device may cause a graphical user interface (GUI) to be displayed on a display, the GUI configured for creating an intrusion zone for an audio/video (A/V) recording and communication device. The GUI may include one or more motion zones associated with a field of view of the A/V recording and communication device. While displaying the GUI, the client device may receive a first input selecting a motion zone from the one or more motion zones, at least a portion of the motion zone being associated with the intrusion zone, a second input for setting a conditional setting for the intrusion zone, and a third input selecting an activation mode of the security system to associate with the intrusion zone. The client device may then transmit, to at least one of a network device and the A/V recording and communication device, a control signal that is configured to cause the at least one of (Continued)

the network device and the A/V recording and communication device to save the intrusion zone.

24 Claims, 38 Drawing Sheets

Related U.S. Application Data

(60) Provisional application No. 62/413,378, filed on Oct. 26, 2016.

(51) Int. Cl.
  *G06V 10/22* (2022.01)
  *G06V 20/52* (2022.01)
  *G08B 13/196* (2006.01)

(52) U.S. Cl.
  CPC ....... *G06V 20/52* (2022.01); *G08B 13/19602* (2013.01); *H04N 7/188* (2013.01)

(56) References Cited

U.S. PATENT DOCUMENTS

| | | | |
|---|---|---|---|
| 4,258,255 A | 3/1981 | Guscott | |
| 4,288,867 A | 9/1981 | Guthart | |
| 4,321,594 A | 3/1982 | Galvin et al. | |
| 4,347,590 A | 8/1982 | Heger et al. | |
| 4,551,711 A | 11/1985 | Akiyama et al. | |
| 4,737,847 A * | 4/1988 | Araki ................ | G08B 13/19602 348/161 |
| 4,764,953 A | 8/1988 | Chern et al. | |
| 4,940,987 A | 7/1990 | Frederick | |
| 5,026,990 A | 6/1991 | Marman et al. | |
| 5,091,780 A | 2/1992 | Pomerleau | |
| 5,151,945 A | 9/1992 | Lee et al. | |
| 5,276,427 A | 1/1994 | Peterson | |
| 5,311,024 A | 5/1994 | Marman et al. | |
| 5,382,943 A | 1/1995 | Tanaka | |
| 5,416,725 A | 5/1995 | Pacheco et al. | |
| 5,428,388 A | 6/1995 | von Bauer et al. | |
| 5,467,402 A | 11/1995 | Okuyama et al. | |
| 5,493,273 A | 2/1996 | Smurlo et al. | |
| 5,541,414 A | 7/1996 | Hori | |
| 5,641,963 A | 6/1997 | Mueller | |
| 5,666,157 A | 9/1997 | Aviv | |
| 5,708,436 A | 1/1998 | Loiz et al. | |
| 5,760,848 A | 6/1998 | Cho | |
| 5,822,077 A | 10/1998 | Sasaki et al. | |
| 5,822,542 A | 10/1998 | Smith et al. | |
| 5,828,848 A | 10/1998 | MacCormack et al. | |
| 5,936,666 A * | 8/1999 | Davis ................ | G08B 13/19 348/143 |
| 5,966,074 A | 10/1999 | Baxter | |
| 5,999,634 A | 12/1999 | Abbott et al. | |
| 6,035,341 A * | 3/2000 | Nunally ............ | G08B 13/19645 348/E5.099 |
| 6,049,353 A | 4/2000 | Gray | |
| 6,061,014 A | 5/2000 | Rautanen et al. | |
| 6,072,402 A | 6/2000 | Kniffin et al. | |
| 6,144,405 A | 11/2000 | Toba | |
| 6,150,658 A | 11/2000 | Hagiwara | |
| 6,192,257 B1 | 2/2001 | Ray | |
| 6,208,248 B1 | 3/2001 | Ross | |
| 6,211,522 B1 | 4/2001 | Kotlicki et al. | |
| 6,271,752 B1 | 8/2001 | Vaios | |
| 6,307,622 B1 | 10/2001 | Lewis | |
| 6,359,560 B1 * | 3/2002 | Budge ............... | G08B 13/19602 340/506 |
| 6,429,893 B1 | 8/2002 | Xin | |
| 6,456,322 B1 | 9/2002 | Marinacci | |
| 6,462,663 B1 | 10/2002 | Wilson et al. | |
| 6,476,858 B1 | 11/2002 | Ramirez Diaz et al. | |
| 6,493,041 B1 | 12/2002 | Hanko et al. | |
| 6,546,322 B2 | 4/2003 | Williams | |
| 6,628,835 B1 | 9/2003 | Brill et al. | |
| 6,633,231 B1 | 10/2003 | Okamoto et al. | |
| 6,658,091 B1 | 12/2003 | Naidoo et al. | |
| 6,707,486 B1 | 3/2004 | Millet et al. | |
| 6,727,938 B1 | 4/2004 | Randall | |
| 6,753,774 B2 | 6/2004 | Pan et al. | |
| 6,922,145 B2 | 7/2005 | Piesinger | |
| 6,940,998 B2 | 9/2005 | Garoutte | |
| 6,970,183 B1 | 11/2005 | Monroe | |
| 6,977,609 B2 | 12/2005 | Pleva et al. | |
| 7,008,063 B2 | 3/2006 | Porter et al. | |
| 7,035,430 B2 * | 4/2006 | Ito .................... | G08B 13/19602 348/169 |
| 7,062,291 B2 | 6/2006 | Ryley et al. | |
| 7,065,196 B2 | 6/2006 | Lee | |
| 7,075,431 B2 | 7/2006 | Buckley et al. | |
| 7,084,761 B2 | 8/2006 | Izumi et al. | |
| 7,085,361 B2 | 8/2006 | Thomas | |
| 7,095,321 B2 | 8/2006 | Primm et al. | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,430,186 B1 | 9/2008 | Kim | |
| 7,450,638 B2 | 11/2008 | Iwamura | |
| 7,468,662 B2 | 12/2008 | Velipasalar et al. | |
| 7,522,745 B2 | 4/2009 | Grasso et al. | |
| 7,543,327 B1 | 6/2009 | Kaplinsky | |
| 7,545,953 B2 | 6/2009 | Lai et al. | |
| 7,643,056 B2 | 1/2010 | Silsby | |
| 7,646,329 B2 | 1/2010 | Britton et al. | |
| 7,674,052 B2 | 3/2010 | Hirooka et al. | |
| 7,683,924 B2 | 3/2010 | Oh et al. | |
| 7,683,929 B2 | 3/2010 | Elazar et al. | |
| 7,683,940 B2 * | 3/2010 | Fleming ............ | G11B 27/034 348/207.1 |
| 7,738,917 B2 | 6/2010 | Ryley et al. | |
| 7,777,780 B2 | 8/2010 | Oya et al. | |
| 7,825,792 B2 * | 11/2010 | Buehler ............ | G08B 13/19697 340/506 |
| 7,880,668 B1 | 2/2011 | Krause et al. | |
| 7,929,016 B2 | 4/2011 | Yoshida et al. | |
| 7,973,701 B2 | 7/2011 | Lohmeier et al. | |
| 8,035,505 B2 * | 10/2011 | Ogiyama ........... | G05B 23/0267 340/501 |
| 8,139,098 B2 | 3/2012 | Carter | |
| 8,144,183 B2 | 3/2012 | Carter | |
| 8,154,581 B2 | 4/2012 | Carter | |
| 8,169,356 B2 | 5/2012 | Wu et al. | |
| 8,305,447 B1 | 11/2012 | Wong | |
| 8,560,128 B2 | 10/2013 | Ruff et al. | |
| 8,619,136 B2 | 12/2013 | Howarter et al. | |
| 8,711,217 B2 | 4/2014 | Venetianer et al. | |
| 8,780,201 B1 | 7/2014 | Scalisi et al. | |
| 8,817,102 B2 * | 8/2014 | Saeki ................ | G08B 13/19613 348/154 |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,294 B1 | 4/2015 | Trundle | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,170,707 B1 | 10/2015 | Laska et al. | |

(56) References Cited

U.S. PATENT DOCUMENTS

| | | |
|---|---|---|
| 9,172,913 B1 | 10/2015 | Johnston et al. |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,353,965 B1 | 5/2016 | Goyal et al. |
| 9,454,820 B1 | 9/2016 | Kirmani et al. |
| 9,508,239 B1 | 11/2016 | Harrison et al. |
| 9,626,580 B2* | 4/2017 | Gupta ............... G06K 9/46 |
| 9,628,286 B1* | 4/2017 | Nguyen ........... G08B 13/19678 |
| 9,639,760 B2 | 5/2017 | Ottlik et al. |
| 9,672,727 B1 | 6/2017 | Alexander et al. |
| 9,704,040 B2 | 7/2017 | Maruyama et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 9,799,184 B2 | 10/2017 | Chen |
| 9,892,606 B2 | 2/2018 | Venetianer et al. |
| 9,894,328 B2 | 2/2018 | Siminoff et al. |
| 9,928,707 B2* | 3/2018 | Naylor ............. G08B 13/19606 |
| 9,939,528 B2 | 4/2018 | Yamazaki et al. |
| 9,976,895 B2 | 5/2018 | Miura et al. |
| 10,223,619 B2 | 3/2019 | Urashita |
| 10,480,996 B2 | 11/2019 | Roberts |
| 2002/0008758 A1 | 1/2002 | Broemmelsiek et al. |
| 2002/0044082 A1 | 4/2002 | Woodington et al. |
| 2002/0067287 A1 | 6/2002 | Delcheccolo et al. |
| 2002/0094111 A1 | 7/2002 | Puchek et al. |
| 2002/0147982 A1 | 10/2002 | Naidoo et al. |
| 2002/0163577 A1 | 11/2002 | Myers |
| 2003/0025599 A1 | 2/2003 | Monroe |
| 2003/0043047 A1 | 3/2003 | Braun |
| 2003/0085998 A1* | 5/2003 | Ramirez-Diaz .... G08B 13/1961 348/143 |
| 2003/0163289 A1 | 8/2003 | Whelan et al. |
| 2003/0206239 A1 | 11/2003 | Battles |
| 2004/0032494 A1 | 2/2004 | Ito et al. |
| 2004/0036603 A1* | 2/2004 | Bingham .......... G08B 13/19628 340/541 |
| 2004/0046795 A1 | 3/2004 | Josephson et al. |
| 2004/0082342 A1* | 4/2004 | Toguchi ............. G01S 7/4004 455/456.1 |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2004/0141633 A1 | 7/2004 | Horie |
| 2004/0155963 A1 | 8/2004 | Kondo et al. |
| 2004/0161133 A1 | 8/2004 | Elazar et al. |
| 2004/0227817 A1* | 11/2004 | Oya .................... G06F 3/017 348/155 |
| 2004/0246123 A1* | 12/2004 | Kawabe ........... G08B 13/19673 340/506 |
| 2005/0024208 A1 | 2/2005 | Maki et al. |
| 2005/0040947 A1 | 2/2005 | Buckley et al. |
| 2005/0046699 A1* | 3/2005 | Oya ................. G08B 13/19602 348/207.1 |
| 2005/0073585 A1 | 4/2005 | Ettinger et al. |
| 2005/0078183 A1 | 4/2005 | Yoshimura et al. |
| 2005/0111660 A1 | 5/2005 | Hosoda |
| 2005/0116171 A1 | 6/2005 | Lee et al. |
| 2005/0156737 A1* | 7/2005 | Al-Khateeb ..... G08B 13/19602 340/541 |
| 2005/0169367 A1 | 8/2005 | Venetianer et al. |
| 2005/0174350 A1 | 8/2005 | Ridenour et al. |
| 2005/0207487 A1 | 9/2005 | Monroe |
| 2005/0231352 A1 | 10/2005 | DiPoala |
| 2005/0259158 A1 | 11/2005 | Jacob et al. |
| 2005/0280704 A1 | 12/2005 | Clare et al. |
| 2005/0285941 A1 | 12/2005 | Haigh et al. |
| 2006/0010199 A1 | 1/2006 | Brailean et al. |
| 2006/0022816 A1 | 2/2006 | Yukawa |
| 2006/0028556 A1 | 2/2006 | Bunn et al. |
| 2006/0045354 A1 | 3/2006 | Hanna et al. |
| 2006/0139449 A1 | 6/2006 | Cheng et al. |
| 2006/0155851 A1* | 7/2006 | Ma .................... H04L 29/06027 709/226 |
| 2006/0156361 A1 | 7/2006 | Wang et al. |
| 2006/0170769 A1 | 8/2006 | Zhou |
| 2006/0171453 A1* | 8/2006 | Rohlfing .......... G08B 13/19632 375/240.01 |
| 2006/0179463 A1* | 8/2006 | Chisholm ........ G08B 13/19656 725/90 |
| 2006/0215030 A1* | 9/2006 | Shih ................. G08B 13/19652 348/155 |
| 2006/0227997 A1 | 10/2006 | Au et al. |
| 2006/0238618 A1 | 10/2006 | Wren et al. |
| 2006/0239645 A1 | 10/2006 | Curtner et al. |
| 2006/0242186 A1* | 10/2006 | Hurley ................. G01J 5/0022 |
| 2007/0008081 A1 | 1/2007 | Tylicki et al. |
| 2007/0014439 A1* | 1/2007 | Ando ................. G06K 9/00771 382/118 |
| 2007/0018106 A1* | 1/2007 | Zhevelev ............... G01J 5/08 250/353 |
| 2007/0018884 A1 | 1/2007 | Adams et al. |
| 2007/0035622 A1 | 2/2007 | Hanna et al. |
| 2007/0139258 A1 | 6/2007 | Tsai et al. |
| 2007/0162248 A1 | 7/2007 | Hardin et al. |
| 2007/0176765 A1 | 8/2007 | Babich et al. |
| 2007/0223808 A1* | 9/2007 | Kerr .................. G06K 9/00771 382/159 |
| 2007/0252693 A1* | 11/2007 | Janson ............... G08B 13/1961 340/541 |
| 2007/0279215 A1* | 12/2007 | Tomooka ............... G08B 13/19 340/522 |
| 2007/0296813 A1 | 12/2007 | Hsieh |
| 2008/0029703 A1* | 2/2008 | DiPoala .............. G08B 29/183 250/342 |
| 2008/0100704 A1 | 5/2008 | Venetianer et al. |
| 2008/0209505 A1 | 8/2008 | Ghai et al. |
| 2008/0211906 A1 | 9/2008 | Lovric |
| 2008/0244409 A1 | 10/2008 | Millar et al. |
| 2008/0303903 A1 | 12/2008 | Bentley et al. |
| 2008/0317286 A1 | 12/2008 | Thorpe et al. |
| 2009/0002157 A1* | 1/2009 | Donovan ................. H04N 7/18 340/540 |
| 2009/0022362 A1 | 1/2009 | Gagvani et al. |
| 2009/0079563 A1 | 3/2009 | Tsuji |
| 2009/0102668 A1 | 4/2009 | Thompson et al. |
| 2009/0219388 A1 | 9/2009 | Zisa et al. |
| 2009/0227997 A1 | 9/2009 | Wang et al. |
| 2009/0237509 A1 | 9/2009 | Saxon |
| 2009/0276705 A1 | 11/2009 | Ozdemir et al. |
| 2009/0295923 A1* | 12/2009 | Moore ............. G08B 13/19623 348/152 |
| 2009/0315712 A1 | 12/2009 | Bloemendaal et al. |
| 2009/0322874 A1 | 12/2009 | Knutson et al. |
| 2009/0322882 A1 | 12/2009 | Seo et al. |
| 2010/0026802 A1 | 2/2010 | Titus et al. |
| 2010/0033568 A1 | 2/2010 | Lee |
| 2010/0103020 A1 | 4/2010 | Wu |
| 2010/0150456 A1 | 6/2010 | Tanaka |
| 2010/0193668 A1 | 8/2010 | Kawabata |
| 2010/0198365 A1 | 8/2010 | Kawabata et al. |
| 2010/0208064 A1 | 8/2010 | Liu et al. |
| 2010/0225455 A1 | 9/2010 | Claiborne et al. |
| 2010/0238030 A1* | 9/2010 | Shafer ................. G08B 13/193 340/552 |
| 2010/0321183 A1 | 12/2010 | Donovan et al. |

(56) References Cited

U.S. PATENT DOCUMENTS

| | | | |
|---|---|---|---|
| 2011/0043806 A1* | 2/2011 | Guetta | G01S 17/026 356/432 |
| 2011/0058036 A1 | 3/2011 | Metzger et al. | |
| 2011/0102588 A1* | 5/2011 | Trundle | G08B 13/19613 348/143 |
| 2011/0128150 A1 | 6/2011 | Kanga et al. | |
| 2011/0169950 A1 | 7/2011 | Weaver | |
| 2012/0000431 A1 | 1/2012 | Khoshkish | |
| 2012/0140068 A1 | 6/2012 | Monroe et al. | |
| 2012/0169842 A1* | 7/2012 | Chuang | G08B 13/19619 348/39 |
| 2012/0170902 A1 | 7/2012 | Zhu et al. | |
| 2012/0314063 A1 | 12/2012 | Cirker | |
| 2013/0057695 A1 | 3/2013 | Huisking | |
| 2013/0083198 A1* | 4/2013 | Maslan | H04N 7/188 348/155 |
| 2013/0169842 A1 | 7/2013 | Kojima | |
| 2014/0020635 A1 | 1/2014 | Sayers et al. | |
| 2014/0029855 A1 | 1/2014 | Manako et al. | |
| 2014/0035775 A1 | 2/2014 | Zeng et al. | |
| 2014/0085480 A1 | 3/2014 | Saptharishi | |
| 2014/0160294 A1 | 6/2014 | Naylor | |
| 2014/0267716 A1 | 9/2014 | Child et al. | |
| 2015/0035987 A1 | 2/2015 | Fernandez | |
| 2015/0077566 A1 | 3/2015 | Xiao et al. | |
| 2015/0163463 A1 | 6/2015 | Hwang et al. | |
| 2015/0301167 A1 | 10/2015 | Sentelle et al. | |
| 2015/0310606 A1 | 10/2015 | Shreve et al. | |
| 2015/0325092 A1* | 11/2015 | Zhevelev | G08B 13/22 348/155 |
| 2016/0005281 A1 | 1/2016 | Laska et al. | |
| 2016/0026890 A1 | 1/2016 | Gupta et al. | |
| 2016/0042621 A1 | 2/2016 | Hogg et al. | |
| 2016/0044287 A1 | 2/2016 | Scalisi et al. | |
| 2016/0091607 A1* | 3/2016 | Buckley | G01S 17/026 250/353 |
| 2016/0134918 A1 | 5/2016 | Chen et al. | |
| 2016/0147774 A1 | 5/2016 | Xiao-Devins | |
| 2016/0191864 A1 | 6/2016 | Siminoff et al. | |
| 2016/0202678 A1 | 7/2016 | Aggarwal et al. | |
| 2016/0225160 A1* | 8/2016 | Shimada | H04N 5/232 |
| 2016/0295198 A1* | 10/2016 | Grossman | G08B 13/19695 |
| 2016/0342845 A1* | 11/2016 | Tien-Spalding | G08B 13/19656 |
| 2016/0358436 A1 | 12/2016 | Wautier et al. | |
| 2016/0366346 A1 | 12/2016 | Shin et al. | |
| 2016/0374177 A1* | 12/2016 | Chen | G06F 3/04883 |
| 2017/0048495 A1 | 2/2017 | Scalisi | |
| 2017/0076588 A1 | 3/2017 | Naylor et al. | |
| 2017/0084252 A1* | 3/2017 | Matsuo | G06T 3/40 |
| 2017/0084452 A1* | 3/2017 | Yang | C23C 16/44 |
| 2017/0147885 A1 | 5/2017 | Aggarwal et al. | |
| 2017/0181249 A1* | 6/2017 | Takahashi | H05B 37/0227 |
| 2017/0193782 A1 | 7/2017 | Purohit et al. | |
| 2017/0201724 A1 | 7/2017 | Galvin et al. | |
| 2017/0243472 A1 | 8/2017 | Davies et al. | |
| 2017/0358186 A1 | 12/2017 | Harpole | |
| 2018/0012463 A1 | 1/2018 | Chaudhry et al. | |
| 2018/0018081 A1 | 1/2018 | Dattilo-Green et al. | |
| 2018/0033271 A1* | 2/2018 | Xia | G02B 3/08 |
| 2018/0075593 A1 | 3/2018 | Wang et al. | |
| 2018/0102858 A1 | 4/2018 | Tiwari et al. | |
| 2018/0113577 A1 | 4/2018 | Burns et al. | |
| 2018/0114421 A1 | 4/2018 | Siminoff | |
| 2018/0174413 A1 | 6/2018 | Siminoff | |
| 2018/0249054 A1 | 8/2018 | Chien | |
| 2019/0080573 A1 | 3/2019 | Micko et al. | |
| 2019/0212432 A1 | 7/2019 | DiPoala | |
| 2019/0238786 A1* | 8/2019 | Takahashi | H04N 7/181 |

FOREIGN PATENT DOCUMENTS

| | | | |
|---|---|---|---|
| CA | 2861370 | 3/2015 | |
| CN | 2585521 Y | 11/2003 | |
| CN | 2792061 Y | 6/2006 | |
| EP | 0944883 | 6/1998 | |
| EP | 0853237 | 7/1998 | |
| EP | 1376502 A1 * | 1/2004 | G08B 13/19604 |
| EP | 1480462 | 11/2004 | |
| EP | 2645345 | 10/2013 | |
| GB | 2286283 | 8/1995 | |
| GB | 2354394 | 3/2001 | |
| GB | 2357387 | 6/2001 | |
| GB | 2391936 | 2/2004 | |
| GB | 2400958 | 10/2004 | |
| GB | 2431987 | 5/2007 | |
| JP | 2001103463 | 4/2001 | |
| JP | 2002033839 | 1/2002 | |
| JP | 2002125059 | 4/2002 | |
| JP | 2002342863 | 11/2002 | |
| JP | 2002344640 | 11/2002 | |
| JP | 2002354137 | 12/2002 | |
| JP | 2002368890 | 12/2002 | |
| JP | 2003283696 | 10/2003 | |
| JP | 2004128835 | 4/2004 | |
| JP | 2004171279 | 6/2004 | |
| JP | 2005341040 | 12/2005 | |
| JP | 2006018750 | 1/2006 | |
| JP | 2006147650 | 6/2006 | |
| JP | 2006262342 | 9/2006 | |
| JP | 2009008925 | 1/2009 | |
| KR | 1020160032561 | 3/2016 | |
| WO | WO199839894 | 9/1998 | |
| WO | WO200113638 | 2/2001 | |
| WO | WO200193220 | 12/2001 | |
| WO | WO-0245434 A1 * | 6/2002 | G08B 13/19652 |
| WO | WO2002085019 | 10/2002 | |
| WO | WO2003028375 | 4/2003 | |
| WO | WO2003096696 | 11/2003 | |
| WO | WO2006038760 | 4/2006 | |
| WO | WO2006067782 | 6/2006 | |
| WO | WO20070125143 | 8/2007 | |
| WO | WO2007108790 A1 | 9/2007 | |

OTHER PUBLICATIONS

Non Final Office Action dated Oct. 2, 2019 for U.S. Appl. No. 15/897,887 "Customizable Intrusion Zones Associated With Security Systems" Siminoff, 15 pages.

Office Action for U.S. Appl. No. 15/897,887, mailed on Apr. 30, 2020, Siminoff, "Customizable Intrusion Zones Associated With Security Systems", 17 Pages.

Office Action for U.S. Appl. No. 15/794,001, mailed on Sep. 30, 2020, Siminoff, "Customizable Intrusion Zones Associated With Security Systems", 13 Pages.

Office Action for U.S. Appl. No. 15/794,001, mailed on Apr. 29, 2021, Siminoff, "Customizable Intrusion Zones Associated With Security Systems", 22 pages.

Office Action for U.S. Appl. No. 15/794,001, mailed on Nov. 12, 2021, Siminoff, "Customizable Intrusion Zones Associated With Security Systems", 20 pages.

Office Action for U.S. Appl. No. 15/794,001, mailed May 26, 2022, Siminoff, "Customizable Intrusion Zones Associated With Security Systems", 17 pages.

* cited by examiner

CUSTOMIZABLE INTRUSION ZONES ASSOCIATED WITH SECURITY SYSTEMS

CROSS-REFERENCE TO RELATED APPLICATION

This application is a continuation-in-part of application Ser. No. 15/794,001 filed Oct. 26, 2017, which claims priority to provisional application Ser. No. 62/413,378, filed on Oct. 26, 2016, the entire contents of which are hereby incorporated by reference.

TECHNICAL FIELD

The present embodiments relate to audio/video (A/V) recording and communication devices, including A/V recording and communication doorbell systems. In particular, the present embodiments relate to improvements in the functionality of A/V recording and communication devices that enable customization of intrusion zones, thereby strengthening the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present customizable intrusion zones associated with security systems have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that sometimes motion detected by an A/V recording and communication device may be indicative of a threat, such as an intruder, and other times the motion may be benign, such as motion caused by an invited visitor, a parcel delivery carrier, a neighbor, an animal, or a passing vehicle. It would be advantageous, therefore, if the functionality of A/V recording and communication devices could be enhanced in one or more ways to distinguish between various types of motion within the field of view of the A/V recording and communication device. Such enhancements could increase the effectiveness of A/V recording and communication devices by providing a warning to the user when it is likely that detected motion is associated with a threat, while also possibly suppressing warnings to the user when it is unlikely that detected motion is associated with a threat. The user would thus be less likely to suffer alert fatigue due to persistent false alarms, thereby making it more likely that the user will respond to warnings that are associated with actual threats. The present embodiments provide these advantages and enhancements, as described below.

Another aspect of the present embodiments includes the realization that, when motion is detected by an A/V recording and communication device, a user may want a security system to perform one or more actions, and/or refrain from performing one or more actions, based on whether the motion was caused by a threat and/or if the motion was unlikely caused by a threat. However, security systems, other than those described by the current embodiments, may only be configured to activate an alarm when motion is detected, whether or not the motion was caused by a threat. In some circumstances, however, based on the location of where the motion is detected and/or based on the activation mode in which the security system is operating, the user of the security system may not want the security system to activate the alarm, as the motion may not be caused by a threat. For example, if the motion detected by the A/V recording and communication device occurred a great distance from the user's property, and/or the motion was detected during daylight hours when an invited visitor may enter the user's property, the user may not want the security system to activate the alarm, as the motion may not be caused by a threat. If the security system continuously activates the alarm based on motion that is not caused by a threat, the user may begin to ignore alerts that indicate that the security system has activated the alarm, which may cause the user to miss alerts of actual threats.

The current embodiments solve this problem by providing a user with the ability to configure a security system to perform one or more actions, and/or refrain from performing one or more actions, based on parameter(s) that the user sets for motion that is detected by an A/V recording and communication device. For example, the user may create intrusion zone(s) for the A/V recording and communication device. Each intrusion zone may be associated with a motion zone of the A/V recording and communication device, a conditional setting, an activation mode for the security system, and/or an action that the security system is to perform. Based on the A/V recording and communication device detecting motion within the intrusion zone, a network device may determine that the security system is operating in the activation mode and/or that the conditional setting is satisfied. In response, the network device may cause the security system to perform the action. As such, and as a result of using intrusion zones, the security system may perform a function, such as activating an alarm, at times when it is more likely that motion is caused by a threat. Additionally, the user may be provided with alerts that indicate actual threats, such that the user will not suffer from alert fatigue. Therefore, the user will more likely respond to warnings of actual threats detected by the security system. The present embodiments further provide these advantages and enhancements, as described below.

In a first aspect, a computer program product, embodied in code executable by a processor, which when executed causes the processor to perform operations comprising: causing a graphical user interface (GUI) to be displayed on a display, the GUI configured for creating an intrusion zone for an audio/video (A/V) recording and communication device, the intrusion zone being associated with a security system; causing one or more motion zones to be displayed on the GUI, the one or more motion zones being associated with a field of view of the A/V recording and communication device; receiving a first input selecting a motion zone from the one or more motion zones, at least a portion of the motion zone being associated with the intrusion zone; receiving a second input for setting a conditional setting for the intrusion zone; receiving a third input selecting an activation mode of the security system to associate with the intrusion zone; receiving a fourth input for saving the intrusion zone; and in response to the receiving of the fourth input, transmitting, to at least one of a network device and the A/V recording and communication device, a control signal that is configured to cause the at least one of the network device and the A/V recording and communication device to save the intrusion zone.

In an embodiment of the first aspect, the conditional setting comprises at least one of a time of day, a level of ambient light, a location of motion detection, a direction of movement, a speed of movement, a length of time that an object is within the motion zone, a level of reflecting light intensity, and a body posture of a person within the motion zone.

In another embodiment of the first aspect, the activation mode comprises at least one of an armed stay mode, an armed away mode, an armed vacation mode, a disarmed mode, and a custom armed mode.

In another embodiment of the first aspect, the operations further comprising: receiving a fifth input indicating at least one action to associate with the intrusion zone, the security system is to perform the at least one action based on the A/V recording and communication device detecting motion within the intrusion zone, the conditional setting being satisfied, and the security system operating in the activation mode.

In another embodiment of the first aspect, the at least one action comprises at least one of activating an alarm, outputting a warning sound, transmitting a user alert to a client device, and changing a power state of at least one automation device.

In another embodiment of the first aspect, the operations further comprising: receiving a fifth input indicating at least one action to associate with the intrusion zone, the A/V recording and communication device is to perform the at least one action based on the A/V recording and communication device detecting motion within the intrusion zone, the conditional setting being satisfied, and the security system operating in the activation mode.

In another embodiment of the first aspect, the at least one action comprises at least one of recording image data, activating a light, outputting a warning sound, transmitting a user alert to a client device, and transmitting a user alert to a network device.

In another embodiment of the first aspect, the intrusion zone is a first intrusion zone, the motion zone is a first motion zone, the conditional setting is a first conditional setting, the activation mode is a first activation mode, and the control signal is a first control signal, and the operations further comprise: receiving a fifth input selecting a second motion zone associated with the A/V recording and communication device, at least a portion of the second motion zone being associated with a second intrusion zone; receiving a sixth input for setting a second conditional setting for the second intrusion zone; receiving a seventh input selecting a second activation mode of the security system to associate with the second intrusion zone; receiving an eighth input for saving the second intrusion zone; and in response to the receiving of the eighth input, transmitting, to at least one of the network device and the A/V recording and communication device, a second control signal that is configured to cause the at least one of the network device and the A/V recording and communication device to save the second intrusion zone.

In another embodiment of the first aspect, the GUI includes a diagram of the field of view of the A/V recording and communication device, the diagram indicating the one or more motion zones within the field of view of the A/V recording and communication device.

In another embodiment of the first aspect, the one or more motion zones includes at least a first motion zone and a second motion zone, and the motion zone includes the first motion zone.

In another embodiment of the first aspect, the operations further comprising: receiving a fifth input indicating the at least the portion of the motion zone to associated with the intrusion zone.

In a second aspect, a method is implemented by a client device that includes a display, a communication module, and a processor, the method comprising: causing, by the processor, a graphical user interface (GUI) to be displayed on the display, the GUI configured for creating an intrusion zone for an audio/video (A/V) recording and communication device, the intrusion zone being associated with a security system; causing, by the processor, one or more motion zones to be displayed on the GUI, the one or more motion zones being associated with at least one of a field of view of a camera of the A/V recording and communication device and a field of view of a motion sensor of the A/V recording and communication device; receiving, by the processor, a first input selecting a motion zone from the one or more motion zones, at least a portion of the motion zone being associated with the intrusion zone; receiving, by the processor, a second input for setting a conditional setting for the intrusion zone; receiving, by the processor, a third input indicating at least one action that the security system is to perform based on the A/V recording and communication device detecting motion within the intrusion zone and the conditional setting being satisfied; receiving, by the processor, a fourth input for saving the intrusion zone; and in response to the receiving of the fourth input, transmitting, by the processor and using the communication module, a control signal to at least one of a network device and the A/V recording and communication device, the control signal is configured to cause the at least one of the network device and the A/V recording and communication device to store the intrusion zone.

In an embedment of the second aspect, the conditional setting comprises at least one of a time of day, a level of ambient light, a location of motion detection, a direction of movement, a speed of movement, a length of time that an object is within the motion zone, a level of reflecting light intensity, and a body posture of a person within the motion zone.

In another embodiment of the second aspect, the at least one action comprises at least one of activating an alarm, outputting a warning sound, transmitting a user alert to a client device, and changing a power state of at least one automation device, In another embodiment of the second aspect, the method further comprising: receiving, by the processor, a fifth input selecting an activation mode of the security system to associate with the intrusion zone, the security system is to perform the at least one action further based on the security system operating in the activation mode.

In another embodiment of the second aspect, the activation mode comprises at least one of an armed stay mode, an armed away mode, an armed vacation mode, a disarmed mode, and a custom armed mode.

In another embodiment of the second aspect, the at least one action is at least one first action, and the method further comprises: receiving, by the processor, a fifth input indicating at least one second action that the A/V recording and communication device is to perform based on the A/V recording and communication device detecting the motion within the intrusion zone and the conditional setting being satisfied.

In another embodiment of the second aspect, the at least one second action comprises at least one of recording image data, activating a light, outputting a warning sound, transmitting a user alert to a client device, and transmitting a user alert to a network device.

In another embodiment of the second aspect, the intrusion zone is a first intrusion zone, the motion zone is a first motion zone, the conditional setting is a first conditional setting, the at least one action is at least one first action, the motion is first motion, and the control signal is a first control signal, and the method further comprises: receiving, by the processor, a fifth input selecting a second motion zone associated with the A/V recording and communication device, at least a portion of the second motion zone being associated with a second intrusion zone; receiving, by the processor, a sixth input for setting a second conditional setting for the second intrusion zone; receiving, by the processor, a seventh input indicating at least one second action that the security system is to perform based on the A/V recording and communication device detecting second motion within the second intrusion zone and the second conditional setting being satisfied; receiving, by the processor, an eighth input for saving the second intrusion zone; and in response to the receiving of the eighth input, transmitting, by the processor and using the communication module, a second control signal to at least one of the network device and the A/V recording and communication device, the second control signal is configured to cause the at least one of the network device and the A/V recording and communication device to store the second intrusion zone.

In another embodiment of the second aspect, the GUI includes a diagram of the at least one of field of view of the camera and the field of view of the motion sensor, the diagram indicating the one or more motion zones within at least one of the field of view of the camera and the field of view of the motion sensor.

In another embodiment of the second aspect, the one or more motion zones includes at least a first motion zone and a second motion zone, and the motion zone includes the first motion zone.

In another embodiment of the second aspect, the method further comprising: receiving, by the processor, a fifth input indicating the at least the portion of the motion zone to associated with the intrusion zone.

In a third aspect, a computer program product, embodied in code executable by a processor, which when executed causes the processor to perform operations comprising: causing a graphical user interface (GUI) to be displayed on a display, the GUI configured for creating an intrusion zone for an audio/video (A/V) recording and communication device; receiving a first input selecting a motion zone associated with a field of view of the A/V recording and communication device, at least a portion of the motion zone being associated with the intrusion zone; receiving a second input for associating the intrusion zone with an activation mode of a security system; and transmitting, to at least one of a network device and the A/V recording and communication device, data associated with the intrusion zone.

In an embodiment of the third aspect, the operations further comprising: receiving a third input for setting a conditional setting for the intrusion zone.

In another embodiment of the third aspect, the conditional setting comprises at least one of a time of day, a level of ambient light, a location of motion detection, a direction of movement, a speed of movement, a length of time that an object is within the motion zone, a level of reflecting light intensity, and a body posture of a person within the motion zone.

In another embodiment of the third aspect, the activation mode comprises at least one of an armed stay mode, an armed away mode, an armed vacation mode, a disarmed mode, and a custom armed mode.

In another embodiment of the third aspect, the operations further comprising: receiving a third input indicating at least one action associated with the security system, the security system is to perform the at least one action based the A/V recording and communication device detecting motion within the intrusion zone while the security system is operating in the activation mode.

In another embodiment of the third aspect, the at least one action comprises at least one of activating an alarm, outputting a warning sound, transmitting a user alert to a client device, and changing a power state of at least one automation device.

In another embodiment of the third aspect, the operations further comprising: receiving a third input indicating at least one action associated with the intrusion zone, the A/V recording and communication device is to perform the at least one action based on the A/V recording and communication device detecting motion within the intrusion zone while the security system is operating in the activation mode.

In another embodiment of the third aspect, the at least one action comprises at least one of recording image data, activating a light, outputting a warning sound, transmitting a user alert to a client device, and transmitting a user alert to a network device.

In another embodiment of the third aspect, the GUI includes a diagram of the field of view of the A/V recording and communication device, the diagram indicating the one or more motion zones within the field of view of the A/V recording and communication device.

In another embodiment of the third aspect, the operations further comprising: causing at least a first motion zone and a second motion to be displayed on the GUI, the first motion zone and the second motion zone being associated with the field of view of the A/V recording and communication device, the receiving of the first input selecting the motion zone associated with the field of view of the A/V recording and communication device comprises receiving the first input selecting the first motion associated with the field of view of the A/V recording and communication device.

In another embodiment of the third aspect, the intrusion zone is a first intrusion zone, the motion zone is a first motion zone, the activation mode is a first activation mode, and the data is first data, and the operations further comprise: receiving a third input selecting a second motion zone associated with the field of view of the A/V recording and communication device, at least a portion of the second motion zone being associated with a second intrusion zone; receiving a fourth input for associating the second intrusion zone with a second activation mode of the security system;

and transmitting, to at least one of the network device and the A/V recording and communication device, second data associated with the second intrusion zone.

In another embodiment of the third aspect, the operations further comprising: receiving a third input indicating the at least the portion of the motion zone to associated with the intrusion zone.

In another embodiment of the third aspect, the operations further comprising: receiving a third input for saving the intrusion zone.

In a fourth aspect, a method is implemented by a client device that includes a display, a communication module, and a processor, the method comprising: causing, by the processor, a graphical user interface (GUI) to be displayed on the display, the GUI configured for creating an intrusion zone for an audio/video (A/V) recording and communication device; receiving, by the processor, a first input selecting a motion zone associated with a field of view of the A/V recording and communication device, at least a portion of the motion zone being associated with the intrusion zone; receiving, by the processor, a second input indicating at least one action that a security system is to perform based on the A/V recording and communication device detecting motion within the intrusion zone; and transmitting, by the processor and using the communication module, data associated with the intrusion zone to at least one of a network device and the A/V recording and communication device.

In an embodiment of the fourth aspect, the method further comprising: receiving, by the processor, a third input for setting a conditional setting for the intrusion zone.

In another embodiment of the fourth aspect, the conditional setting comprises at least one of a time of day, a level of ambient light, a location of motion detection, a direction of movement, a speed of movement, a length of time that an object is within the motion zone, a level of reflecting light intensity, and a body posture of a person within the motion zone, and the security system is to perform the at least one action further based on the conditional setting being satisfied.

In another embodiment of the fourth aspect, the at least one action comprises at least one of activating an alarm, outputting a warning sound, transmitting a user alert to a client device, and changing a power state of at least one automation device.

In another embodiment of the fourth aspect, the method further comprising: receiving, by the processor, a third input selecting an activation mode of the security system to associate with the intrusion zone, the security system is to perform the at least one action further based on the security system operating in the activation mode.

In another embodiment of the fourth aspect, the activation mode comprises at least one of an armed stay mode, an armed away mode, an armed vacation mode, a disarmed mode, and a custom armed mode.

In another embodiment of the fourth aspect, the at least one action is at least one first action, and the method further comprises: receiving, by the processor, a third input indicating at least one second action that the A/V recording and communication device is to perform based on the A/V recording and communication device detecting the motion within the intrusion zone while the security system operates in the activation mode.

In another embodiment of the fourth aspect, the at least one second action comprises at least one of recording image data, activating a light, outputting a warning sound, transmitting a user alert to a client device, and transmitting a user alert to a network device.

In another embodiment of the fourth aspect, the GUI includes a diagram of the field of view of the A/V recording and communication device, the diagram indicating the one or more motion zones within the field of view of the A/V recording and communication device.

In another embodiment of the fourth aspect, the method further comprising: causing, by the processor, at least a first motion zone and a second motion to be displayed on the GUI, the first motion zone and the second motion zone being associated with the field of view of the A/V recording and communication device, the receiving of the first input selecting the motion zone associated with the field of view of the A/V recording and communication device comprises receiving, by the processor, the first input selecting the first motion associated with the field of view of the A/V recording and communication device.

In another embodiment of the fourth aspect, the intrusion zone is a first intrusion zone, the motion zone is a first motion zone, the at least one action is at least one first action, the motion is first motion, and the data is first data, and the method further comprises: receiving, by the processor, a third input selecting a second motion zone associated with the field of view of the A/V recording and communication device, at least a portion of the second motion zone being associated with a second intrusion zone; receiving, by the processor, a fourth input indicating at least one second action that the security system is to perform based on the A/V recording and communication device detecting second motion within the second intrusion zone; and transmitting, by the processor and using the communication module, second data associated with the second intrusion zone to at least one of the network device and the A/V recording and communication device.

In another embodiment of the fourth aspect, the method further comprising: receiving, by the processor, a third input indicating the at least the portion of the motion zone to associated with the intrusion zone.

In another embodiment of the fourth aspect, the method further comprising: receiving, by the processor, a third input for saving the intrusion zone.

In a fifth aspect, a network device comprises: a communication module; one or more processors; and a non-transitory machine-readable memory storing a program, the program executable by at least one of the one or more processors, the program comprising instructions for: receiving, using the communication module, first data from a client device associated with an audio/video (A/V) recording and communication device, the first data including: a conditional setting for an intrusion zone associated with the A/V recording and communication device; and an activation mode of a security system; storing second data that associates the conditional setting and the activation mode with the intrusion zone; generating a control signal that is configured to cause the A/V recording and communication device to save the conditional setting for the intrusion zone; and transmitting, using the communication module, the control signal to the A/V recording and communication device.

In an embodiment of the fifth aspect, the conditional setting comprises at least one of a time of day, a level of ambient light, a location of motion detection, a direction of movement, a speed of movement, a length of time that an object is within the motion zone, a level of reflecting light intensity, and a body posture of a person within the motion zone.

In another embodiment of the fifth aspect, the activation mode comprises at least one of an armed stay mode, an armed away mode, an armed vacation mode, a disarmed mode, and a custom armed mode.

In another embodiment of the fifth aspect, the conditional setting is a first conditional setting, the intrusion zone is a first intrusion zone, the activation mode is a first activation mode, and the control signal is a first control signal, and the program further comprises instructions for: receiving, using the communication module, third data from the client device associated with the A/V recording and communication device, the third data including: a second conditional setting for a second intrusion zone associated with the A/V recording and communication device; and a second activation mode of the security system; storing fourth data that associates the second conditional setting and the second activation mode with the intrusion zone; generating a second control signal that is configured to cause the A/V recording and communication device to save the second conditional setting for the second intrusion zone; and transmitting, using the communication module, the second control signal to the A/V recording and communication device.

In another embodiment of the fifth aspect, the program further comprises instructions for: causing the security system to operate in the activation mode; receiving, using the communication module, motion data from the A/V recording and communication device, the motion data indicating that the A/V recording and communication device detected motion within the intrusion zone; based on the receiving of the motion data: determining that the security system is operating in the activation mode; and determining that the conditional setting for the intrusion zone is satisfied; and based on the determining that the security system is operating in the activation mode and the determining that the conditional setting for the intrusion zone is satisfied, causing an alarm of the security system to activate.

In another embodiment of the fifth aspect, the program further comprises instructions for: receiving, using the communication module, third data indicating at least action that the security system is to perform while operating in the activation mode, the security system is to perform the at least one action based on the A/V recording and communication device detecting motion within the intrusion zone and the conditional setting being satisfied.

In another embodiment of the fifth aspect, the at least one action comprises at least one of activating an alarm, outputting a warning sound, transmitting a user alert to a client device, and changing a power state of at least one automation device.

In another embodiment of the fifth aspect, the program further comprises instructions for: receiving, using the communication module, third data indicating at least action that the A/V recording and communication device is to perform based on the A/V recording and communication device detecting motion within the intrusion zone, the conditional setting being satisfied, and the security system operating in the activation mode, the control signal is further configured to cause the A/V recording and communication device to save the at least one action.

In another embodiment of the fifth aspect, the at least one action comprises at least one of recording image data, activating a light, outputting a warning sound, transmitting a user alert to a client device, and transmitting a user alert to a network device.

In a sixth aspect, a method for a network device communicatively coupled to an audio/video (A/V) recording and communication device, the network device including a processor and a communication module, the method comprising: receiving, by the processor and using the communication module, first data from a client device associated with the A/V recording and communication device, the first data including: a conditional setting for an intrusion zone associated with the A/V recording and communication device; and at least one action that a security system is to take based on the A/V recording and communication device detecting motion within the intrusion zone and the conditional setting being satisfied; storing, by the processor, second data that associates the conditional setting and the at least one action with the instruction zone; generating, by the processor, a control signal that is configured to cause the A/V recording and communication device to save the conditional setting for the intrusion zone; and transmitting, by the processor and using the communication module, the control signal to the A/V recording and communication device.

In an embodiment of the sixth aspect, the conditional setting comprises at least one of a time of day, a level of ambient light, a location of motion detection, a direction of movement, a speed of movement, a length of time that an object is within the motion zone, a level of reflecting light intensity, and a body posture of a person within the motion zone.

In another embodiment of the sixth aspect, the first data further includes an activation mode associated with the security system, and the security system is to take the at least one action further based on the security system operating in the activation mode.

In another embodiment of the sixth aspect, the activation mode comprises at least one of an armed stay mode, an armed away mode, an armed vacation mode, a disarmed mode, and a custom armed mode.

In another embodiment of the sixth aspect, the conditional setting is a first conditional setting, the intrusion zone is a first intrusion zone, the at least one action is at least one first action, the motion is first motion, and the control signal is a first control signal, and the method further comprises: receiving, by the processor and using the communication module, third data from the client device associated with the A/V recording and communication device, the third data including: a second conditional setting for a second intrusion zone associated with the A/V recording and communication device; and at least one second action that the security system is to take based on the A/V recording and communication device detecting second motion within the second intrusion zone and the second conditional setting being satisfied; storing, by the processor, fourth data that associates the second conditional setting and the at least one second action with the second instruction zone; generating, by the processor, a second control signal that is configured to cause the A/V recording and communication device to save the second conditional setting for the second intrusion zone; and transmitting, by the processor and using the communication module, the second control signal to the A/V recording and communication device.

In another embodiment of the sixth aspect, the method further comprising: receiving, by the processor and using the communication module, motion data from the A/V recording and communication device, the motion data indicating that the A/V recording and communication device detected the motion within the intrusion zone; based on the receiving of the motion data, determining, by the processor, that the conditional setting for the intrusion zone is satisfied; and based on the determining that the conditional setting for the intrusion zone is satisfied, causing, by the processor, the security system to perform the at least one action.

In another embodiment of the sixth aspect, the at least one action comprises at least one of activating an alarm, outputting a warning sound, transmitting a user alert to a client device, and changing a power state of at least one automation device.

In another embodiment of the sixth aspect, the at least one action is at least one first action, and the method further comprises: receiving, by the processor and using the communication module, third data indicating at least one second action that the A/V recording and communication device is to perform based on the A/V recording and communication device detecting the motion within the intrusion zone and the conditional setting being satisfied, the control signal is further configured to cause the A/V recording and communication device to save the at least one second action.

In another embodiment of the sixth aspect, the at least one second action comprises at least one of recording image data, activating a light, outputting a warning sound, transmitting a user alert to a client device, and transmitting a user alert to a network device.

In a seventh aspect, a network device comprises: a communication module; one or more processors; and a non-transitory machine-readable memory storing a program, the program executable by at least one of the one or more processors, the program comprising instructions for: receiving, using the communication module, first data from a client device associated with an audio/video (A/V) recording and communication device, the first data indicating: a conditional setting for an intrusion zone associated with the A/V recording and communication device; and an activation mode of a security system; and storing second data that associates the conditional setting and the activation mode with the intrusion zone.

In an embodiment of the seventh aspect, the program further comprises instructions for: generating a control signal that is configured to cause the A/V recording and communication device to save the conditional setting for the intrusion zone; and transmitting, using the communication module, the control signal to the A/V recording and communication device.

In another embodiment of the seventh aspect, the conditional setting comprises at least one of a time of day, a level of ambient light, a location of motion detection, a direction of movement, a speed of movement, a length of time that an object is within the motion zone, a level of reflecting light intensity, and a body posture of a person within the motion zone.

In another embodiment of the seventh aspect, the activation mode comprises at least one of an armed stay mode, an armed away mode, an armed vacation mode, a disarmed mode, and a custom armed mode.

In another embodiment of the seventh aspect, the conditional setting is a first conditional setting, the intrusion zone is a first intrusion zone, and the activation mode is a first activation mode, and the program further comprises instructions for: receiving, using the communication module, third data from the client device associated with the A/V recording and communication device, the third data including: a second conditional setting for a second intrusion zone associated with the A/V recording and communication device; and a second activation mode of the security system; and storing fourth data that associates the second conditional setting and the second activation mode with the intrusion zone.

In another embodiment of the seventh aspect, the program further comprises instructions for: causing the security system to operate in the activation mode; receiving, using the communication module, motion data from the A/V recording and communication device, the motion data indicating that the A/V recording and communication device detected motion within the intrusion zone; based on the receiving of the motion data: determining that the security system is operating in the activation mode; and determining that the conditional setting for the intrusion zone is satisfied; and based on the determining that the security system is operating in the activation mode and the determining that the conditional setting for the intrusion zone is satisfied, causing an alarm of the security system to activate.

In another embodiment of the seventh aspect, the program further comprises instructions for: receiving, using the communication module, third data indicating at least action that the security system is to perform while operating in the activation mode, the security system is to perform the at least one action based on the A/V recording and communication device detecting motion within the intrusion zone and the conditional setting being satisfied.

In another embodiment of the seventh aspect, the at least one action comprises at least one of activating an alarm, outputting a warning sound, transmitting a user alert to a client device, and changing a power state of at least one automation device.

In another embodiment of the seventh aspect, the program further comprises instructions for: receiving, using the communication module, third data indicating at least action that the A/V recording and communication device is to perform based on the A/V recording and communication device detecting motion within the intrusion zone, the conditional setting being satisfied, and the security system operating in the activation mode; and storing fourth data that associated the at least one action with the intrusion zone.

In another embodiment of the seventh aspect, the at least one action comprises at least one of recording image data, activating a light, outputting a warning sound, transmitting a user alert to a client device, and transmitting a user alert to a network device.

In an eighth aspect, a method for a network device communicatively coupled to an audio/video (A/V) recording and communication device, the network device including a processor and a communication module, the method comprising: receiving, by the processor and using the communication module, first data from a client device associated with the audio/video (A/V) recording and communication device, the first data indicating: a conditional setting for an intrusion zone associated with the A/V recording and communication device; and at least one action that a security system is to take based on the A/V recording and communication device detecting motion within the intrusion zone and the conditional setting being satisfied; and storing, by the processor, second data that associates the conditional setting and the at least one action with the intrusion zone.

In an embodiment of the eighth aspect, the method further comprising: generating, by the processor, a control signal that is configured to cause the A/V recording and communication device to save the conditional setting for the intrusion zone; and transmitting, by the processor and using the communication module, the control signal to the A/V recording and communication device.

In another embodiment of the eighth aspect, the conditional setting comprises at least one of a time of day, a level of ambient light, a location of motion detection, a direction of movement, a speed of movement, a length of time that an object is within the motion zone, a level of reflecting light intensity, and a body posture of a person within the motion zone.

In another embodiment of the eighth aspect, the first data further includes an activation mode associated with the security system, and the security system is to take the at least one action further based on the security system operating in the activation mode.

In another embodiment of the eighth aspect, the activation mode comprises at least one of an armed stay mode, an armed away mode, an armed vacation mode, a disarmed mode, and a custom armed mode.

In another embodiment of the eighth aspect, the conditional setting is a first conditional setting, the intrusion zone is a first intrusion zone, the at least one action is at least one first action, and the motion is first motion, and the method further comprises: receiving, by the processor and using the communication module, third data from the client device associated with the A/V recording and communication device, the third data including: a second conditional setting for a second intrusion zone associated with the A/V recording and communication device; and at least one second action that the security system is to take based on the A/V recording and communication device detecting second motion within the second intrusion zone and the second conditional setting being satisfied; and storing, by the processor, fourth data that associates the second conditional setting and the at least one second action with the second instruction zone.

In another embodiment of the eighth aspect, the method further comprising: receiving, by the processor and using the communication module, motion data from the A/V recording and communication device, the motion data indicating that the A/V recording and communication device detected the motion within the intrusion zone; based on the receiving of the motion data, determining, by the processor, that the conditional setting for the intrusion zone is satisfied; and based on the determining that the conditional setting for the intrusion zone is satisfied, causing, by the processor, the security system to perform the at least one action.

In another embodiment of the eighth aspect, the at least one action comprises at least one of activating an alarm, outputting a warning sound, transmitting a user alert to a client device, and changing a power state of at least one automation device.

In another embodiment of the eighth aspect, the at least one action is at least one first action, and the method further comprises: receiving, by the processor and using the communication module, third data indicating at least one second action that the A/V recording and communication device is to perform based on the A/V recording and communication device detecting the motion within the intrusion zone and the conditional setting being satisfied; generating, by the processor, a control signal that is configured to cause the A/V recording and communication device to perform the at least one second action based on the A/V recording and communication device detecting the motion within the intrusion zone and the conditional setting being satisfied; and transmitting, by the processor and using the communication module, the control signal to the A/V recording and communication device.

In another embodiment of the eighth aspect, the at least one second action comprises at least one of recording image data, activating a light, outputting a warning sound, transmitting a user alert to a client device, and transmitting a user alert to a network device.

In a ninth aspect, a network device comprising: a communication module; one or more processors; and a non-transitory machine-readable memory storing a program, the program executable by at least one of the one or more processors, the program comprising instructions for: storing data associated with an intrusion zone for an audio/video (A/V) recording and communication device, the data indicating at least: a conditional setting associated with the intrusion zone; and an activation mode for a security system; causing the security system to operate in the activation mode; receiving, using the communication module, motion data from the A/V recording and communication device, the motion data indicating that the A/V recording and communication device detected motion within the intrusion zone; based on the receiving of the motion data: determining that the security system is operating in the activation mode; and determining that the conditional setting for the intrusion zone is satisfied; and based on the determining that the security system is operating in the activation mode and the determining that the conditional setting for the intrusion zone is satisfied, causing an alarm of the security system to activate.

In an embodiment of the ninth aspect, the program further comprises instructions for: receiving, using the communication module, the data from a client device associated with the A/V recording and communication device.

In another embodiment of the ninth aspect, the program further comprises instructions for: generating a user alert that indicates that the A/V recording and communication device detected the motion within the intrusion zone; and transmitting, using the communication module, the user alert to a client device associated with the A/V recording and communication device.

In another embodiment of the ninth aspect, the conditional setting comprises at least one of a time of day, a level of ambient light, a location of motion detection, a direction of movement, a speed of movement, a length of time that an object is within the motion zone, a level of reflecting light intensity, and a body posture of a person within the motion zone.

In another embodiment of the ninth aspect, the activation mode comprises at least one of an armed stay mode, an armed away mode, an armed vacation mode, a disarmed mode, and a custom armed mode.

In another embodiment of the ninth aspect, the data is first data, the intrusion zone is a first intrusion zone, the conditional setting is a first conditional setting, and the activation mode is a first activation mode, and the program further comprises instructions for: storing second data associated with a second intrusion zone for the A/V recording and communication device, the second data indicating at least: a second conditional setting associated with the intrusion zone; and a second activation mode for the security system.

In another embodiment of the ninth aspect, the motion data is first motion data, the motion is first motion, and the intrusion zone is a first intrusion zone, and the program further comprises instructions for: prior to the receiving of the first motion data, receiving, using the communication module, second motion data from the A/V recording and communication device, the second motion data indicating that the A/V recording and communication device detected second motion within a second intrusion zone; determining that the A/V recording and communication device detected the second motion in the second motion zone; and based on the determining that the A/V recording and communication device detected the second motion in the second motion zone, refraining from causing the alarm of the security system to activate.

In another embodiment of the ninth aspect, the motion data is first motion data and the motion is first motion, and the program further comprises instructions for: prior to the receiving of the first motion data, receiving, using the communication module, second motion data from the A/V recording and communication device, the second motion data indicating that the A/V recording and communication device detected second motion within the intrusion zone; based on the receiving of the second motion data: determining that the security system is operating in the activation mode; and determining that the conditional setting for the intrusion zone is not satisfied; and based on the determining that the conditional setting for the intrusion zone is not satisfied, refraining from causing the alarm of the security system to activate.

In a tenth aspect, a method for a network device communicatively coupled to an audio/video (A/V) recording and communication device, the network device including a processor and a communication module, the method comprising: storing, by the processor, data associated with an intrusion zone for the A/V recording and communication device, the data indicating at least: a conditional setting associated with the intrusion zone; and at least one action that a security system is to perform based on the A/V recording and communication device detecting motion within the intrusion zone and the conditional setting being satisfied; receiving, by the processor and using the communication module, motion data from the A/V recording and communication device, the motion data indicating that the A/V recording and communication device detected the motion within the intrusion zone; based on the receiving of the motion data, determining, by the processor, that the conditional setting for the intrusion zone is satisfied; based on the determining that the conditional setting for the intrusion zone is satisfied, causing, by the processor, the security system to perform the at least one action.

In an embodiment of the tenth aspect, the at least one action comprises at least one of activating an alarm, outputting a warning sound, transmitting a user alert to a client device, and changing a power state of at least one automation device In another embodiment of the tenth aspect, the method further comprising: receiving, by the processor and using the communication module, the data from a client device associated with the A/V recording and communication device.

In another embodiment of the tenth aspect, the method further comprising: generating, by the processor, a user alert that indicates that the A/V recording and communication device detected the motion within the intrusion zone; and transmitting, by the processor and using the communication module, the user alert to a client device associated with the A/V recording and communication device.

In another embodiment of the tenth aspect, the conditional setting comprises at least one of a time of day, a level of ambient light, a location of motion detection, a direction of movement, a speed of movement, a length of time that an object is within the motion zone, a level of reflecting light intensity, and a body posture of a person within the motion zone.

In another embodiment of the tenth aspect, the data further indicates an activation mode associated with the security system, and the security system is configured to perform the at least one action further based on the security system operating in the activation mode.

In another embodiment of the tenth aspect, the activation mode comprises at least one of an armed stay mode, an armed away mode, an armed vacation mode, a disarmed mode, and a custom armed mode.

In another embodiment of the tenth aspect, the data is first data, the intrusion zone is a first intrusion zone, the conditional setting is a first conditional setting, the activation mode is a first activation mode, the at least one action is at least one first action, and the motion is first motion, and the method further comprises: storing, by the processor, second data associated with a second intrusion zone for the A/V recording and communication device, the second data indicating at least: a second conditional setting associated with the second intrusion zone; and at least one second action that the security system is to perform based on the A/V recording and communication device detecting second motion within the second intrusion zone and the second conditional setting being satisfied.

In another embodiment of the tenth aspect, the motion data is first motion data, the motion is first motion, and the intrusion zone is a first intrusion zone, and the method further comprises: prior to the receiving of the first motion data, receiving, by the processor and using the communication module, second motion data from the A/V recording and communication device, the second motion data indicating that the A/V recording and communication device detected second motion within a second intrusion zone; determining, by the processor, that the A/V recording and communication device detected the second motion in the second intrusion zone; and based on the determining that the A/V recording and communication device detected the second motion in the second motion zone, refraining, by the processor, from causing the security system to perform the at least one action.

In another embodiment of the tenth aspect, the motion data is first motion data and the motion is first motion, and the method further comprises: prior to the receiving of the first motion data, receiving, by the processor and using the communication module, second motion data from the A/V recording and communication device, the second motion data indicating that the A/V recording and communication device detected second motion within the intrusion zone; based on the receiving of the second motion data, determining, by the processor, that the conditional setting for the intrusion zone is not satisfied; and based on the determining that the conditional setting for the intrusion zone is not satisfied, refraining, by the processor, from causing the security system to perform the at least one action.

In an eleventh aspect, a network device comprises: a communication module; one or more processors; and a non-transitory machine-readable memory storing a program, the program executable by at least one of the one or more processors, the program comprising instructions for: creating an intrusion zone for an audio/video (A/V) recording and communication device, the intrusion zone being associated with a motion zone for the A/V recording and communication device and an activation mode of a security system; receiving, using the communication module, motion data from the A/V recording and communication device, the motion data indicating that the A/V recording and communication device detected motion within the intrusion zone; based on the receiving of the motion data, determining that the security system is operating in the activation mode; and based on the determining that the security system is operating in the activation mode, causing an alarm of the security system to activate.

In an embodiment of the eleventh aspect, the program further comprises instructions for: causing the security system to operate in the activation mode.

In another embodiment of the eleventh aspect, the program further comprises instructions for: receiving, using the communication module, data from a client device associated with the A/V recording and communication device, the data indicating at least: the motion zone to associate with the intrusion zone; and the activation mode for the security system, the creating of the intrusion zone is based on the receiving of the data.

In another embodiment of the eleventh aspect, the program further comprises instructions for: generating a user alert that indicates that the A/V recording and communication device detected the motion within the intrusion zone; and transmitting, using the communication module, the user alert to a client device associated with the A/V recording and communication device.

In another embodiment of the eleventh aspect, the intrusion zone is further associated with a conditional setting, and the program further comprises instructions for: based on the receiving of the motion data, determining that the conditional setting is satisfied, the causing the alarm of the security system to activate is further based on the determining that the conditional setting is satisfied.

In another embodiment of the eleventh aspect, the conditional setting comprises at least one of a time of day, a level of ambient light, a location of motion detection, a direction of movement, a speed of movement, a length of time that an object is within the motion zone, a level of reflecting light intensity, and a body posture of a person within the motion zone.

In another embodiment of the eleventh aspect, the activation mode comprises at least one of an armed stay mode, an armed away mode, an armed vacation mode, a disarmed mode, and a custom armed mode.

In another embodiment of the eleventh aspect, the intrusion zone is a first intrusion zone, the motion zone is a first motion zone, and the activation mode is a first activation mode, and the program further comprises instructions for: creating a second intrusion zone for the A/V recording and communication device, the second intrusion zone being associated with a second motion zone for the A/V recording and communication device and a second activation mode of the security system.

In another embodiment of the eleventh aspect, the intrusion zone is a first intrusion zone, the motion data is first motion data, and the motion is first motion, and the program further comprises instructions for: prior to the receiving of the first motion data, receiving, using the communication module, second motion data from the A/V recording and communication device, the second motion data indicating that the A/V recording and communication device detected second motion within a second intrusion zone; determining that the A/V recording and communication device detected the second motion in the second motion zone; and based on the determining that A/V recording and communication device detected the second motion in the second motion zone, refraining from causing the alarm of the security system to activate.

In another embodiment of the eleventh aspect, the activation mode is a first activation mode, the motion data is first motion data, and the motion is first motion, and the program further comprises instructions for: prior to the receiving of the first motion data, receiving, using the communication module, second motion data from the A/V recording and communication device, the second motion data indicating that the A/V recording and communication device detected second motion within the intrusion zone; based on the receiving of the second motion data, determining that the security system is operating in a second activation mode; and based on the determining that the security system is operating in the second activation mode, refraining from causing the alarm of the security system to activate.

In a twelfth aspect, a method for a network device communicatively coupled to an audio/video (A/V) recording and communication device, the network device including a processor and a communication module, the method comprising: creating, by the processor, an intrusion zone for the A/V recording and communication device, the intrusion zone being associated with: a motion zone for the A/V recording and communication device; and at least one action that a security system is to perform; receiving, by the processor and using the communication module, motion data from the A/V recording and communication device, the motion data indicating that the A/V recording and communication device detected motion within the intrusion zone; and based on the receiving of the motion data, causing, by the processor, the security system to perform the at least one action.

In an embodiment of the twelfth aspect, the method further comprising: receiving, by the processor and using the communication module, data from a client device associated with the A/V recording and communication device, the data indicating at least: the motion zone to associate with the A/V recording and communication device; and the at least one action that the security system is to perform, the creating of the intrusion zone is based on the receiving of the data.

In another embodiment of the twelfth aspect, the method further comprising: generating, by the processor, a user alert that indicates that the A/V recording and communication device detected the motion within the intrusion zone; and transmitting, by the processor and using the communication module, the user alert to a client device associated with the A/V recording and communication device.

In another embodiment of the twelfth aspect, the intrusion zone is further associated with a conditional setting, and the method further comprises: based on the receiving of the motion data, determining, by the processor, that the conditional setting is satisfied, the causing the security system to perform that least one action is further based on the determining that the conditional setting is satisfied.

In another embodiment of the twelfth aspect, the conditional setting comprises at least one of a time of day, a level of ambient light, a location of motion detection, a direction of movement, a speed of movement, a length of time that an object is within the motion zone, a level of reflecting light intensity, and a body posture of a person within the motion zone.

In another embodiment of the twelfth aspect, the intrusion zone is further associated with an activation mode of the security system, and the method further comprises: based on the receiving of the motion data, determining, by the processor, that the security system is operating in the activation mode, the causing the security system to perform that least one action is further based on the determining that the security system is operating in the activation mode.

In another embodiment of the twelfth aspect, the activation mode comprises at least one of an armed stay mode, an armed away mode, an armed vacation mode, a disarmed mode, and a custom armed mode.

In another embodiment of the twelfth aspect, the intrusion zone is a first intrusion zone, the motion zone is a first motion zone, and the at least one action is at least one first action, and the method further comprises: creating, by the processor, a second intrusion zone for the A/V recording and communication device, the second intrusion zone being associated with: a second motion zone for the A/V recording and communication device; and at least one second action that the security system is to perform.

In another embodiment of the twelfth aspect, the intrusion zone is a first intrusion zone, the motion data is first motion data, and the motion is first motion, and the method further comprises: prior to the receiving of the first motion data, receiving, by the processor and using the communication module, second motion data from the A/V recording and communication device, the second motion data indicating that the A/V recording and communication device detected second motion within a second intrusion zone; determining, by the processor, that the A/V recording and communication device detected the second motion within the second intrusion zone; and based on the determining that the A/V recording and communication device detected the second motion within the second intrusion zone, refraining, by the processor, from causing the security system to perform the at least one action.

In a thirteenth aspect, an audio/video (A/V) recording and communication device comprises: a camera; a communication module; one or more processors; and a non-transitory machine-readable memory storing a program, the program executable by at least one of the one or more processors, the program comprising instructions for: receiving, using the communication module, data from a network device associated with a security system, the data indicating: a conditional setting for an intrusion zone associated with the A/V recording and communication device; and an activation mode associated with the security system; receiving, using the communication module and from the network device, an indication that the security system is operating in the activation mode; while the security system is operating in the activation mode, detecting, using at least one of the camera and a motion sensor, motion within the intrusion zone; based on the detecting of the motion within the intrusion zone, determining that the conditional setting for the intrusion zone is satisfied; based on the determining that the conditional setting for the intrusion zone is satisfied, generating a user alert indicating that that the A/V recording and communication device detected the motion within the intrusion zone; and transmitting, using the communication module, the user alert to at least one of the network device and a client device associated with the A/V recording and communication device.

In an embodiment of the thirteenth aspect, the conditional setting comprises at least one of a time of day, a level of ambient light, a location of motion detection, a direction of movement, a speed of movement, a length of time that an object is within the motion zone, a level of reflecting light intensity, and a body posture of a person within the motion zone.

In another embodiment of the thirteenth aspect, the activation mode comprises at least one of an armed stay mode, an armed away mode, an armed vacation mode, a disarmed mode, and a custom armed mode.

In another embodiment of the thirteenth aspect, the A/V recording and communication device detects motion within at least a first motion zone and a second motion zone, and the intrusion zone is associated with the first motion zone.

In another embodiment of the thirteenth aspect, the data further indicates at least one action to be performed by the A/V recording and communication device based on the A/V recording and communication device detecting the motion within the intrusion zone and the conditional setting being satisfied, and the program further comprises instructions for: based on the determining that the conditional setting for the intrusion zone is satisfied, causing the A/V recording and communication device to perform the at least one action.

In another embodiment of the thirteenth aspect, the at least one action comprises at least one of recording image data using the camera, activating a light, and outputting a warning sound.

In another embodiment of the thirteenth aspect, the motion is first motion and the user alert is a first user alert, and the program further comprises instructions for: while the security system is operating in the activation mode, detecting, using the at least one of the camera and the motion sensor, second motion within the intrusion zone; based on the detecting of the second motion within the intrusion zone, determining that the conditional setting for the intrusion zone is not satisfied; and based on the determining that the conditional setting for the intrusion zone is not satisfied, refraining from generating a second user alert.

In another embodiment of the thirteenth aspect, the motion is first motion, the intrusion zone is a first intrusion zone, and the user alert is a first user alert, and the program further comprises instructions for: while the security system is operating in the activation mode, detecting, using the at least one of the camera and the motion sensor, second motion within a second intrusion zone; and based on the detecting of the second motion within the second intrusion zone, refraining from generating a second user alert.

In another embodiment of the thirteenth aspect, the activation mode is a first activation mode, the motion is first motion, and the user alert is a first user alert, and the program further comprises instructions for: receiving, using the communication module and from the network device, an indication that the security system is operating in a second activation mode; while the security system is operating in the second activation mode, detecting, using the at least one of the camera and the motion sensor, second motion within the intrusion zone; and based on the security system operating in the second activation mode, refraining from generating a second user alert.

In a fourteenth aspect, a method for an audio/video (A/V) recording and communication device, the A/V recording and communication device including a camera, a communication module, and a processor, the method comprising: receiving, by the processor and using the communication module, data from a network device associated with a security system, the data indicating: a conditional setting for an intrusion zone associated with the A/V recording and communication device; an activation mode associated with the security system; and at least one action to be performed by the A/V recording and communication device; receiving, by the processor and using the communication module, from the network device, an indication that the security system is operating in the activation mode; while the security system is operating the activation mode, detecting, by the processor and using at least one of the camera and a motion sensor, motion within the intrusion zone; based on the detecting of the motion within the intrusion zone, determining, by the processor, that the conditional setting for the intrusion zone is satisfied; and based on the determining that the conditional setting for the intrusion zone is satisfied, causing, by the processor, the A/V recording and communication device to perform the at least one action.

In an embodiment of the fourteenth aspect, the at least one action comprises at least one of recording image data using the camera, activating a light, outputting a warning sound, transmitting a user alert to a client device, and transmitting a user alert to a network device.

In another embodiment of the fourteenth aspect, the conditional setting comprises at least one of a time of day, a level of ambient light, a location of motion detection, a direction of movement, a speed of movement, a length of time that an object is within the motion zone, a level of reflecting light intensity, and a body posture of a person within the motion zone.

In another embodiment of the fourteenth aspect, the activation mode comprises at least one of an armed stay mode, an armed away mode, an armed vacation mode, a disarmed mode, and a custom armed mode.

In another embodiment of the fourteenth aspect, the A/V recording and communication device detects motion within at least a first motion zone and a second motion zone, and the intrusion zone is associated with the first motion zone.

In another embodiment of the fourteenth aspect, the motion is first motion, and the method further comprises: while the security system is operating in the activation mode, detecting, by the processor and using the at least one of the camera and the motion sensor, second motion within the intrusion zone; based on the detecting of the second motion within the intrusion zone, determining, by the processor, that the conditional setting for the intrusion zone is not satisfied; and based on the determining that the conditional setting for the intrusion zone is not satisfied, refraining, by the processor, from causing the A/V recording and communication device to perform the at least one action.

In another embodiment of the fourteenth aspect, the intrusion zone is a first intrusion zone and the motion is first motion, and the method further comprises: while the security system is operating in the activation mode, detecting, by the processor and using the at least one of the camera and the motion sensor, second motion within a second intrusion zone; and based on the detecting of the second motion within the second intrusion zone, refraining, by the processor, from causing the A/V recording and communication device to perform the at least one action.

In another embodiment of the fourteenth aspect, the activation mode is a first activation mode and the motion is first motion, and the method further comprises: receiving, by the processor and using the communication module, from the network device, an indication that the security system is operating in a second activation mode; while the security system is operating in the second activation mode, detecting, by the processor and using the at least one of the camera and the motion sensor, second motion within the intrusion zone; and based on the security system operating in the second activation mode, refraining, by the processor, from causing the A/V recording and communication device to perform the at least one action.

In a fifteenth aspect, an audio/video (A/V) recording and communication device comprises: a camera; a communication module; one or more processors; and a non-transitory machine-readable memory storing a program, the program executable by at least one of the one or more processors, the program comprising instructions for: receiving, using the communication module, updated motion settings from a network device, the updated motion settings including an intrusion zone for the A/V recording and communication device, the intrusion zone being associated with a motion zone for the A/V recording and communication device and an activation mode of a security system; in response to receiving the updated motion settings, updating existing motion settings of the A/V recording and communication device to the updated motion settings; detecting, using at least one of the camera and a motion sensor and based on the updated motion settings, motion within the intrusion zone; based on the detecting of the motion within the intrusion zone, determining that the security system is operating in the activation mode; and based on the determining that the security system is operating in the activation mode, transmitting, using the communication module, a user alert to at least one of the network device and a client device associated with the A/V recording and communication device.

In an embodiment of the fifteenth aspect, the intrusion zone is further associated with a conditional setting, and the program further comprises instructions for: based on the detecting of the motion within the intrusion zone, determining that the conditional setting for the intrusion zone is satisfied, the transmitting of the user alert is further based on the determining that the conditional setting for the intrusion zone is satisfied.

In another embodiment of the fifteenth aspect, the conditional setting comprises at least one of a time of day, a level of ambient light, a location of motion detection, a direction of movement, a speed of movement, a length of time that an object is within the motion zone, a level of reflecting light intensity, and a body posture of a person within the motion zone.

In another embodiment of the fifteenth aspect, the activation mode comprises at least one of an armed stay mode, an armed away mode, an armed vacation mode, a disarmed mode, and a custom armed mode.

In another embodiment of the fifteenth aspect, the A/V recording and communication device detects motion within at least a first motion zone and a second motion zone, and the intrusion zone is associated with the first motion zone.

In another embodiment of the fifteenth aspect, the updated settings further include at least one action to be performed by the A/V recording and communication device based on the A/V recording and communication device detecting the motion within the intrusion zone while the security system is operating in the activation mode, and the program further comprises instructions for: based on the determining that the security system is operating in the activation mode, causing the A/V recording and communication device to perform the at least one action.

In another embodiment of the fifteenth aspect, the at least one action comprises at least one of recording image data using the camera, activating a light, and outputting a warning sound.

In another embodiment of the fifteenth aspect, the motion is first motion, the intrusion zone is a first intrusion zone, and the user alert is a first user alert, and the program further comprises instructions for: detecting, using the at least one of the camera and the motion sensor, second motion within a second intrusion zone; and based on the detecting of the second motion within the second intrusion zone, refraining from transmitting a second user alert.

In another embodiment of the fifteenth aspect, the motion is first motion, the activation mode is a first activation mode, and the user alert is a first user alert, and the program further comprises instructions for: detecting, using at least one of the camera and the motion sensor, second motion within the intrusion zone; based on the detecting of the second motion within the intrusion zone, determining that the security system is operating in a second activation mode; and based on the determining that the security system is operating in the second activation mode, refraining from transmitting a second user alert.

In a sixteenth aspect, a method for an audio/video (A/V) recording and communication device, the A/V recording and communication device including a camera and a processor, the method comprising: updating, by the processor, motion settings of the A/V recording and communication device to include an intrusion zone, the intrusion zone being associated with: a motion zone of the A/V recording and communication device; an activation mode of a security system; and at least one action; detecting, by the processor and using at least one of the camera and a motion sensor, motion within the intrusion zone; based on the detecting of the motion within the intrusion zone, determining, by the processor, that the security system is operating in the activation mode; and based on the determining that the security system is operating in the activation mode, causing, by the processor, the A/V recording and communication device to perform the at least one action.

In an embodiment of the sixteenth aspect, the at least one action comprises at least one of recording image data using the camera, activating a light, outputting a warning sound, transmitting a user alert to a client device, and transmitting a user alert to a network device.

In another embodiment of the sixteenth aspect, the intrusion zone is further associated with a conditional setting, and the method further comprises: based on the detecting of the motion within the intrusion zone, determining, by the processor, that the conditional setting for the intrusion zone is satisfied, the causing of the A/V recording and communication device to perform the at least one action is further based on the determining that the conditional setting for the intrusion zone is satisfied.

In another embodiment of the sixteenth aspect, the conditional setting comprises at least one of a time of day, a level of ambient light, a location of motion detection, a direction of movement, a speed of movement, a length of time that an object is within the motion zone, a level of reflecting light intensity, and a body posture of a person within the motion zone.

In another embodiment of the sixteenth aspect, the activation mode comprises at least one of an armed stay mode, an armed away mode, an armed vacation mode, a disarmed mode, and a custom armed mode.

In another embodiment of the sixteenth aspect, the A/V recording and communication device detects motion within at least a first motion zone and a second motion zone, and the intrusion zone is associated with the first motion zone.

In another embodiment of the sixteenth aspect, the motion is first motion and the intrusion zone is a first intrusion zone, and the method further comprises: detecting, by the processor and using the at least one of the camera and the motion sensor, second motion within a second intrusion zone; and based on the detecting of the second motion within the second intrusion zone, refraining, by the processor, from causing the A/V recording and communication device to perform the at least one action.

In another embodiment of the sixteenth aspect, the activation mode is a first activation mode and the motion is first motion, and the method further comprises: detecting, by the processor and using the at least one of the camera and the motion sensor, second motion within the intrusion zone; based on the detecting of the second motion within the intrusion zone, determining, by the processor, that the security system is operating in a second activation mode and based on the security system operating in the second activation mode, refraining, by the processor, from causing the A/V recording and communication device to perform the at least one action.

BRIEF DESCRIPTION OF THE DRAWINGS

The various embodiments of the present customizable intrusion zones associated with security systems now will be discussed in detail with an emphasis on highlighting the advantageous features. These embodiments depict the novel and non-obvious customizable intrusion zones associated with security systems shown in the accompanying drawings, which are for illustrative purposes only. These drawings include the following figures, in which like numerals indicate like parts.

DETAILED DESCRIPTION

Figure 1:
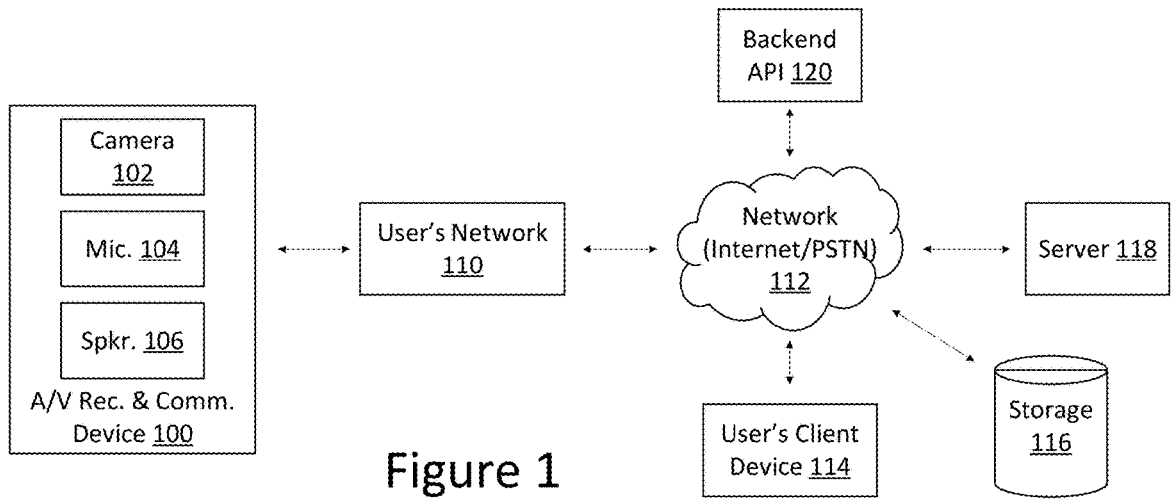
FIG. 1 is a functional block diagram illustrating a system for streaming and storing A/V content captured by an audio/video (A/V) recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

As described herein, receiving may include obtaining, receiving, and/or retrieving. For example, by describing that a first device receives data (e.g., image data, audio data, other data, signals, information, etc.), the first device may obtain the data, receive the data, and/or retrieve the data (e.g., from a local storage, from a second device, from a backend device, etc.). In some examples, the first device may receive, obtain, and/or retrieve the data based on sending a request for the data to the second device. Additionally, or alternatively, in some examples, the device may receive, obtain, and/or retrieve the data without sending a request for the data to the second device. For example, the second device may transmit the data to the first device in response to receiving, obtaining, retrieving, generating, creating, and/or storing the data by the second device.

In some embodiments, this disclosure may include the language, for example, "at least one of [element A] and [element B]". This language may refer to one or more of the elements. For example, "at least one of A and B" may refer to "A", "B", or "A and B". In other words, "at least one of A and B" may refer to "at least one of A and at least one of B," or "at least of either A or B." Additionally, this disclosure may include the language, for example, "[first element], [second element], and/or [third element]." This language may refer to one or more of the elements. For example, "A, B, and/or C" may refer to "A", "B", "C", "A and B" "A and C", "B and C", or "A, B, and C".

The embodiments of the present customizable intrusion zones for audio/video (A/V) recording and communication devices, which may be associated with a security system, are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) recording and communication device 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image-display resolution of 720p or better. While not shown, the A/V recording and communication device 100 may also include other hardware and/or components, such as a housing, a communication module (which may facilitate wired and/or wireless communication with other devices), one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the home network 110 and the network 112 (Internet/PSTN). The user's client device 114 may comprise, for example, a mobile telephone (may also be referred to as a cellular telephone), such as a smartphone, a personal digital assistant (PDA), or another communication and/or computing device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the home network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE, Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell).

In response to the detection of the visitor, the A/V recording and communication device 100 sends an alert to the user's client device 114 (FIG. 1) via the user's home network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
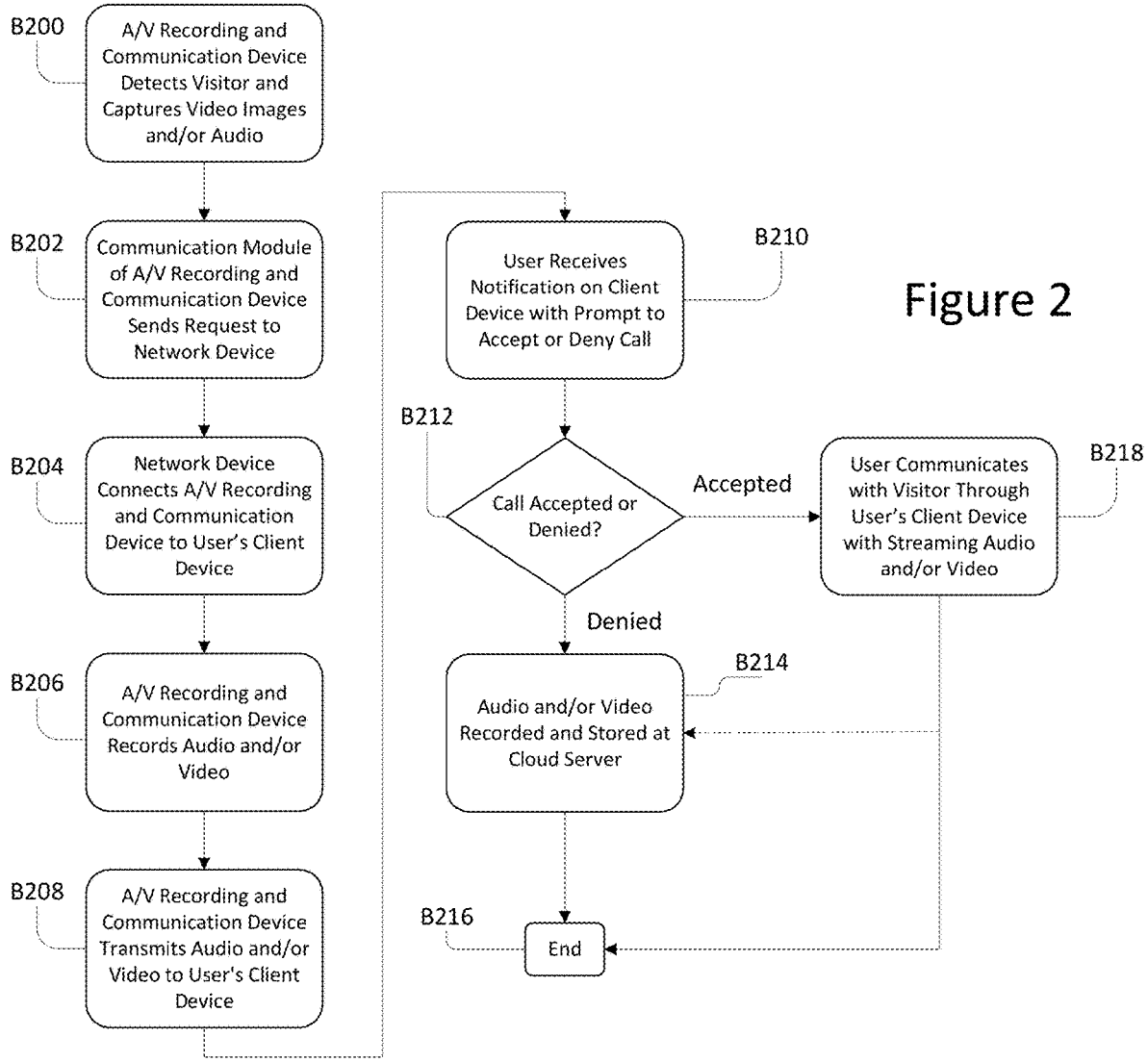
FIG. 2 is a flowchart illustrating a process for streaming and storing A/V content from an A/V recording and communication device according to various aspects of the present disclosure.

FIG. 2 is a flowchart illustrating a process for streaming and storing A/V content from the A/V recording and communication device 100 according to various aspects of the present disclosure. At block B200, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B202, a communication module of the A/V recording and communication device 100 sends a request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other device/sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 3:
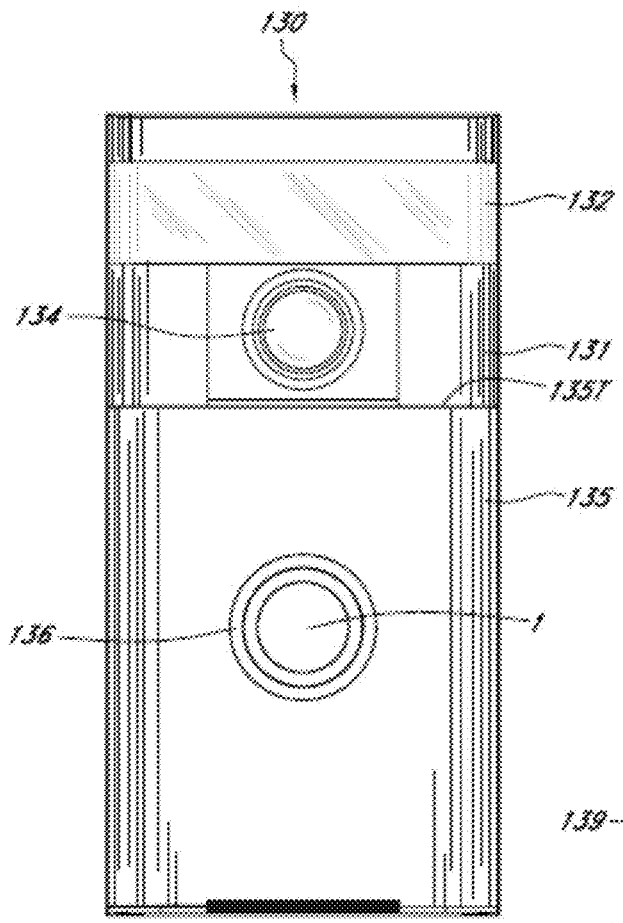
FIG. 3 is a front view of an A/V recording and communication device according to various aspects of the present disclosure.
Figure 4:
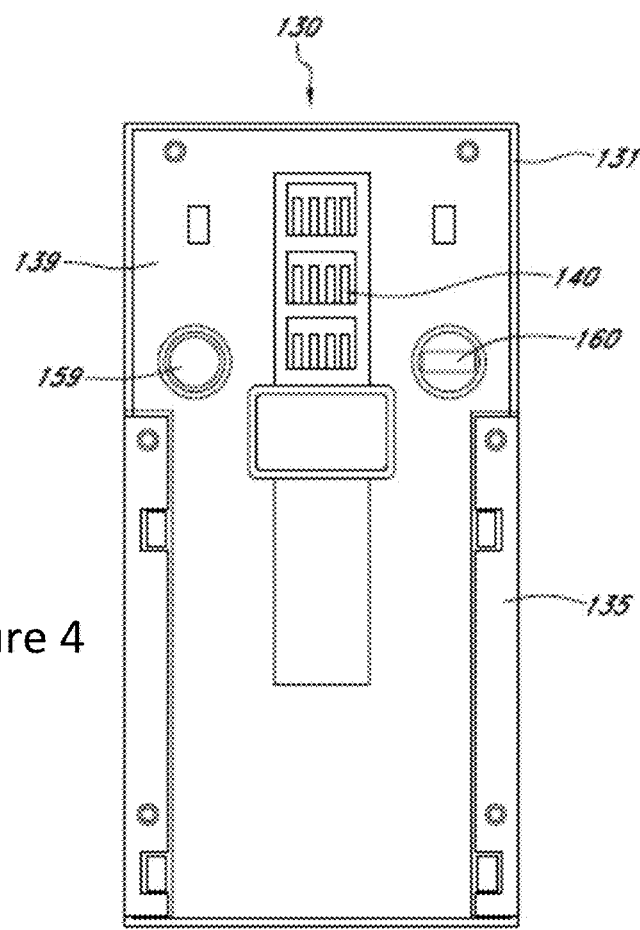
FIG. 4 is a rear view of the A/V recording and communication device of FIG. 3.
Figure 5:
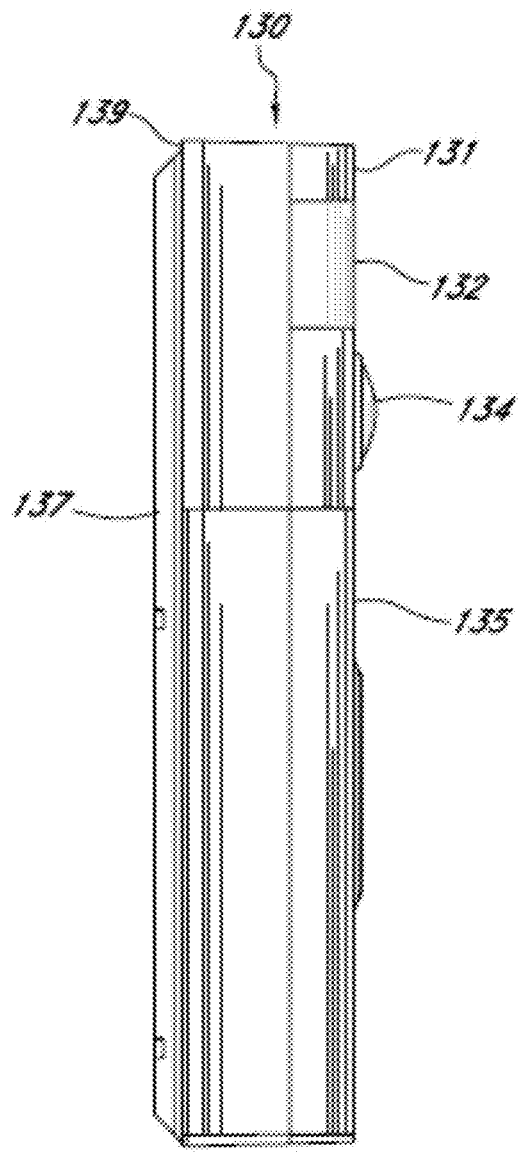
FIG. 5 is a left side view of the A/V recording and communication device of FIG. 3 attached to a mounting bracket according to various aspects of the present disclosure.

FIGS. 3-5 illustrate an audio/video (A/V) recording and communication doorbell 130 (alternatively referred to as the "doorbell 130") according to an aspect of the present embodiments. The A/V recording and communication doorbell 130 may be used in any of the processes described herein. FIG. 3 is a front view, FIG. 4 is a rear view, and FIG. 5 is a left side view of the doorbell 130 coupled with a mounting bracket 137. The doorbell 130 includes a faceplate 135 mounted to a back plate 139 (FIG. 4). With reference to FIG. 5, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 3, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 3 and 5, the doorbell 130 further includes an enclosure 131 that engages the faceplate 135. In the illustrated embodiment, the enclosure 131 abuts an upper edge 135T (FIG. 3) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 4 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 4, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 5 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 5, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 6:
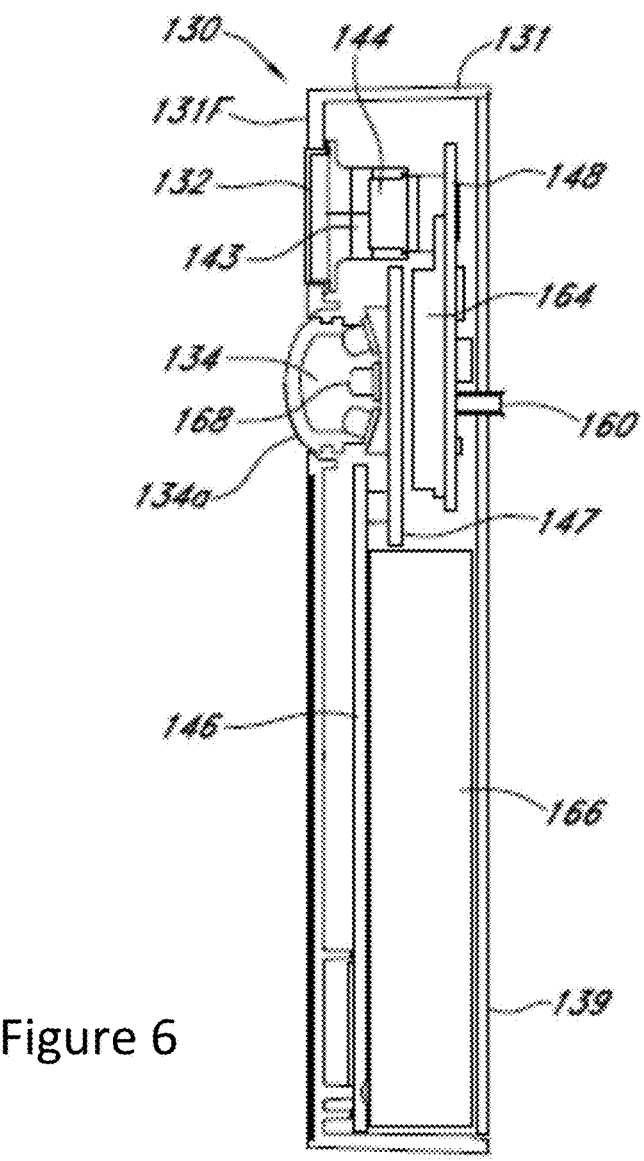
FIG. 6 is cross-sectional right side view of the A/V recording and communication device of FIG. 3.

FIG. 6 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 6, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160.

With continued reference to FIG. 6, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 6, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. In some embodiments, the doorbell 130 may comprise three PIR sensors 144, as further described below, but in other embodiments any number of PIR sensors 144 may be provided. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 7:
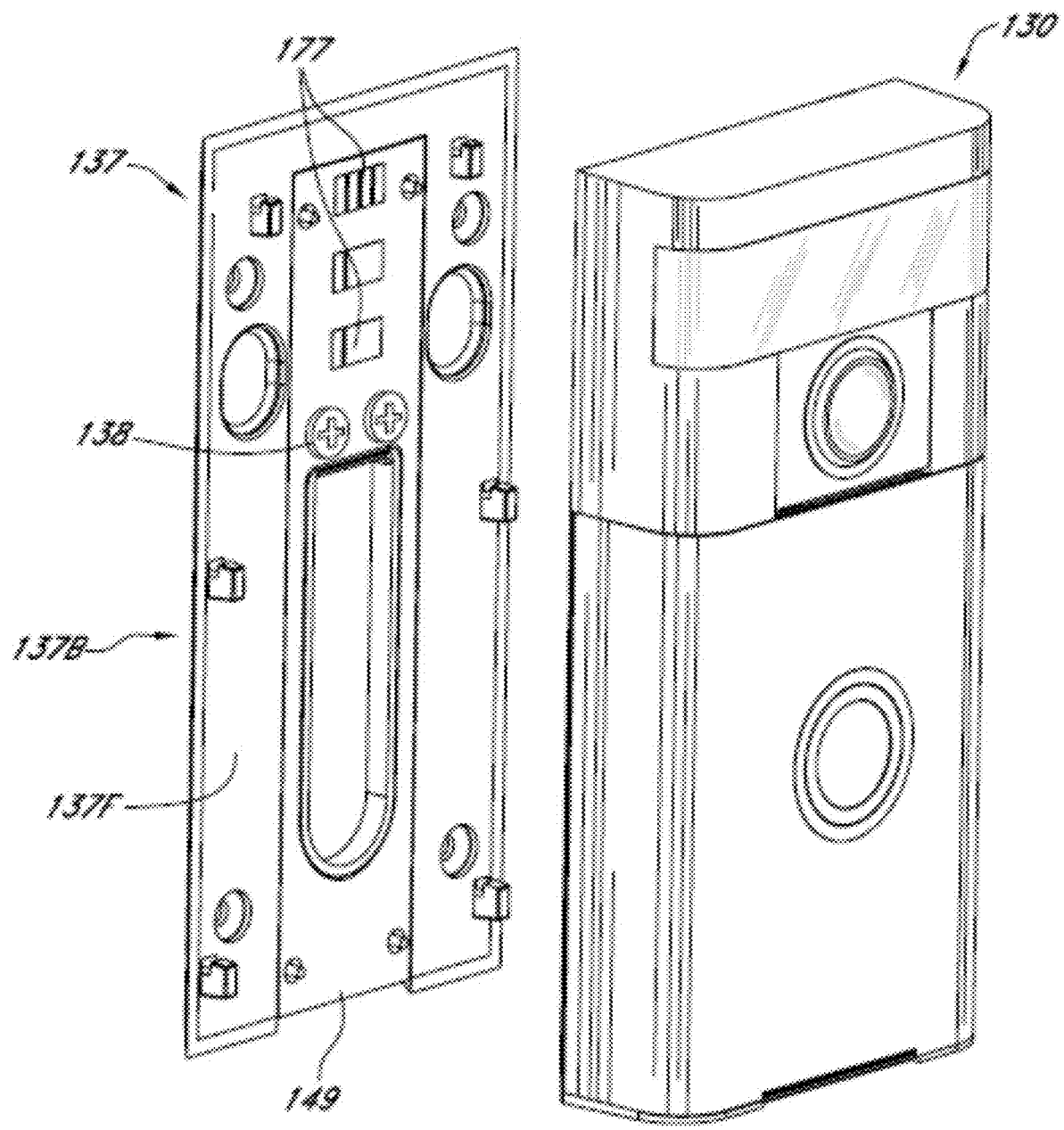
FIG. 7 is an exploded view of the A/V recording and communication device and the mounting bracket of FIG. 5.

FIG. 7 is an exploded view of the doorbell 130 and the mounting bracket 137 according to an aspect of the present embodiments. The mounting bracket 137 is configured to be mounted to a mounting surface (not shown) of a structure, such as a home or an office. FIG. 7 shows the front side 137F of the mounting bracket 137. The mounting bracket 137 is configured to be mounted to the mounting surface such that the back side 137B thereof faces the mounting surface. In certain embodiments the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 7, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 8:
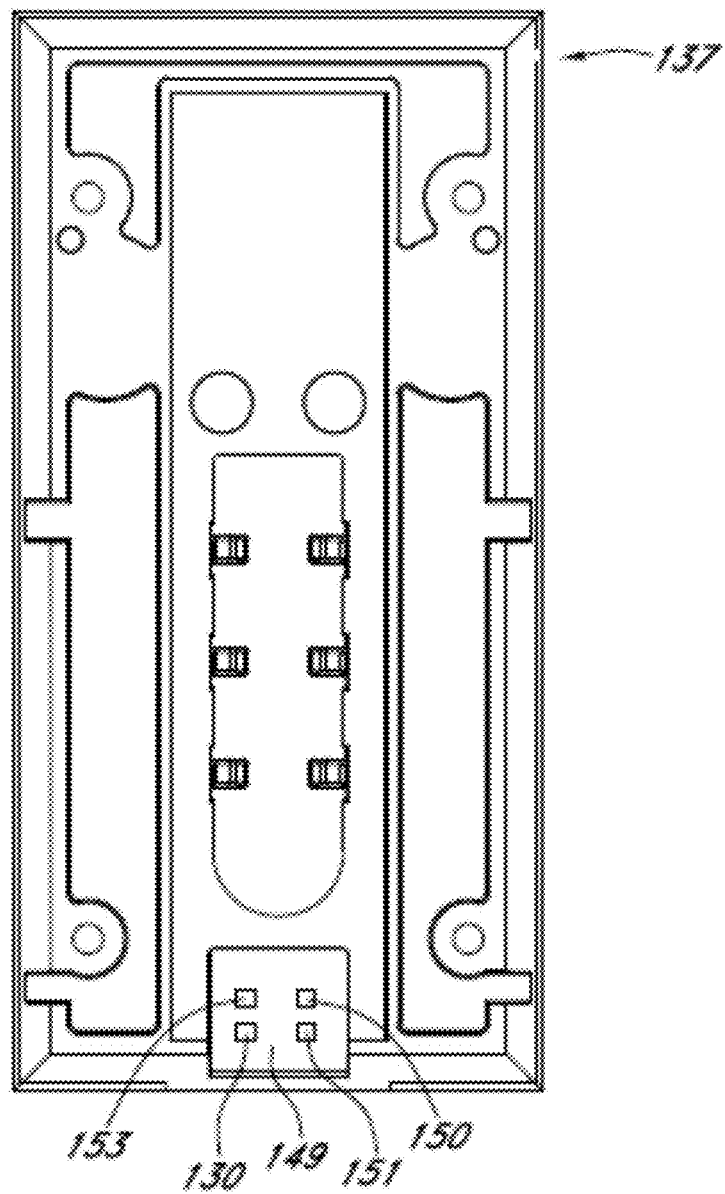
FIG. 8 is a rear view of the mounting bracket of FIG. 5.

With reference to FIGS. 7 and 8 (which is a rear view of the mounting bracket 137), the mounting bracket 137 further comprises a bracket PCB 149. With reference to FIG. 8, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 9:
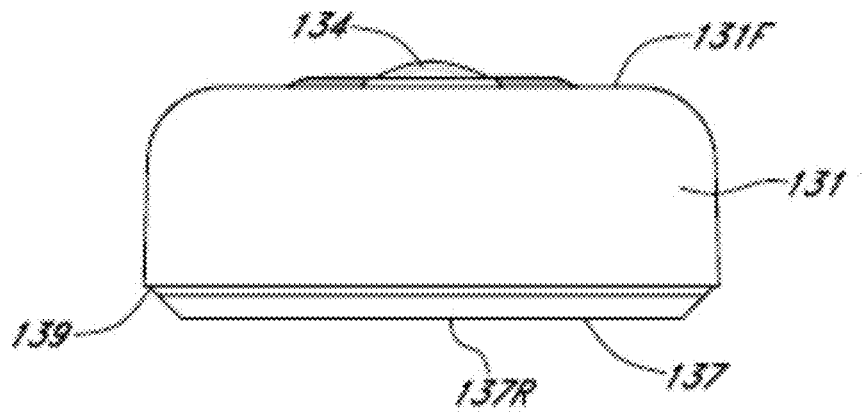
FIGS. 9 and 10 are top and bottom views, respectively, of the A/V recording and communication device and the mounting bracket of FIG. 5.
Figure 10:
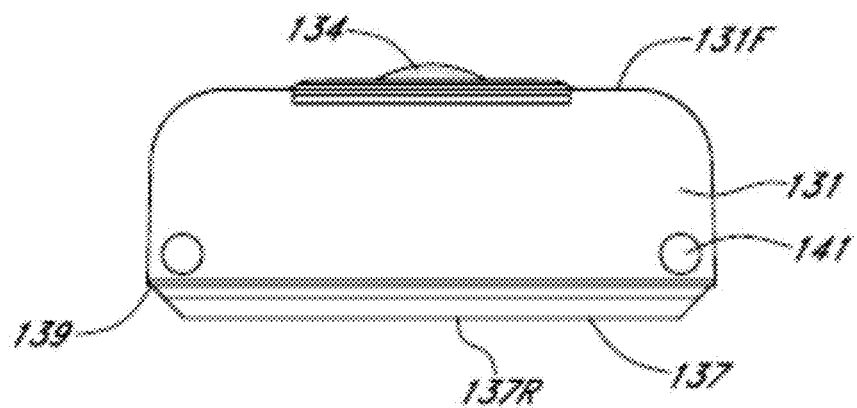

FIGS. 9 and 10 are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 10, the lower end of the enclosure 131 may include security screw apertures 141 configured to receive screws or other fasteners.

Figure 11:
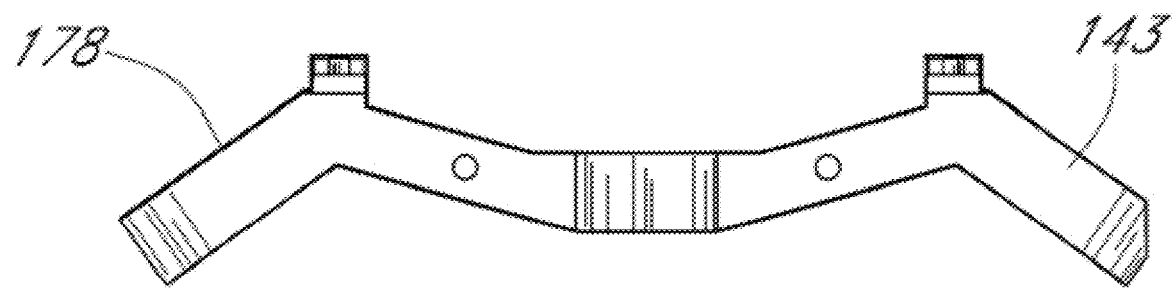
FIGS. 11 and 12 are top and front views, respectively, of a passive infrared sensor holder of the A/V recording and communication device of FIG. 3.

FIG. 11 is a top view of the PIR sensor holder 143. The PIR sensor holder 143 may comprise any suitable material, including, without limitation, metals, metal alloys, or plastics. The PIR sensor holder 143 is configured to mount the PIR sensors 144 behind the lens 132 such that the PIR sensors 144 face out through the lens 132 at varying angles, thereby creating a wide field of view for the PIR sensors 144, and dividing the field of view into zones, as further described below. With further reference to FIG. 11, the PIR sensor holder 143 includes one or more faces 178 within or on which the PIR sensors 144 may be mounted. In the illustrated embodiment, the PIR sensor holder 143 includes three faces 178, with each of two outer faces 178 angled at 55° with respect to a center one of the faces 178. In alternative embodiments, the angle formed by adjacent ones of the faces 178 may be increased or decreased as desired to alter the field of view of the PIR sensors 144.

Figure 12:
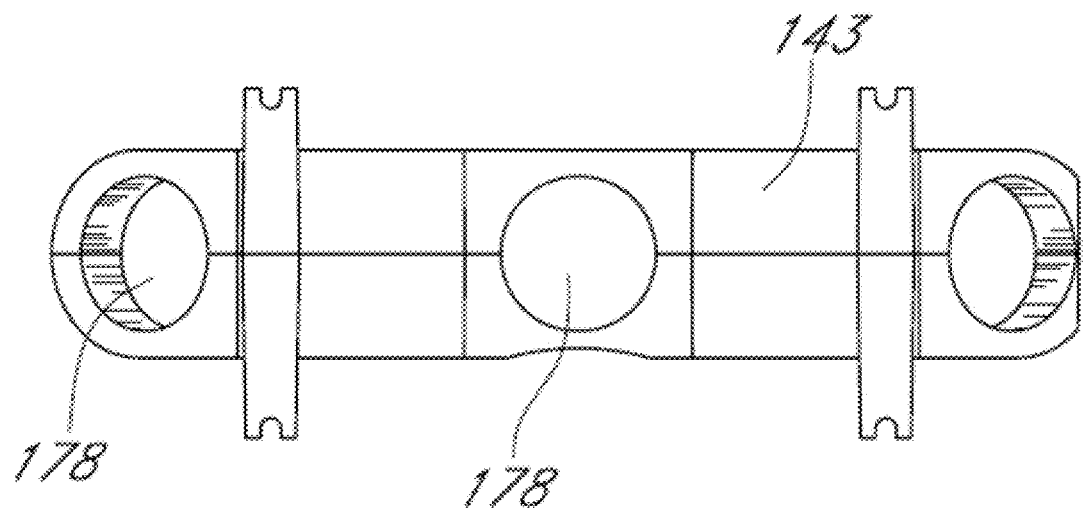

FIG. 12 is a front view of the PIR sensor holder 143. In the illustrated embodiment, each of the faces 178 includes a through hole 180 in which the PIR sensors 144 may be mounted. First and second brackets 182, spaced from one another, extend transversely across the PIR sensor holder 143. Each of the brackets 182 includes notches 184 at either end. The brackets 182 may be used to secure the PIR sensor holder 143 within the doorbell 130. In alternative embodiments, the through holes 180 in the faces 178 may be omitted. For example, the PIR sensors 144 may be mounted directly to the faces 178 without the through holes 180. Generally, the faces 178 may comprise any structure configured to locate and secure the PIR sensors 144 in place.

Figure 13:
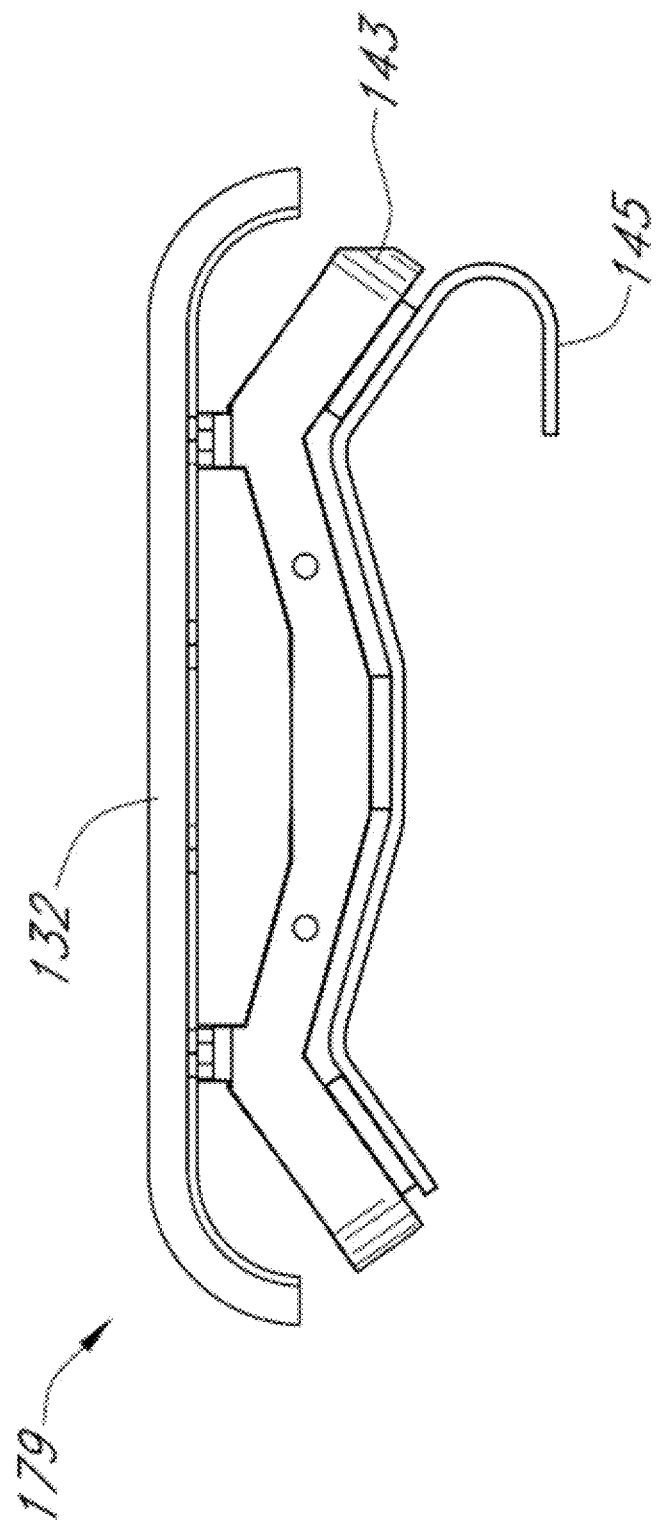
FIGS. 13 and 14 are top and front views, respectively, of a passive infrared sensor holder assembly of the A/V recording and communication device of FIG. 3.
Figure 14:
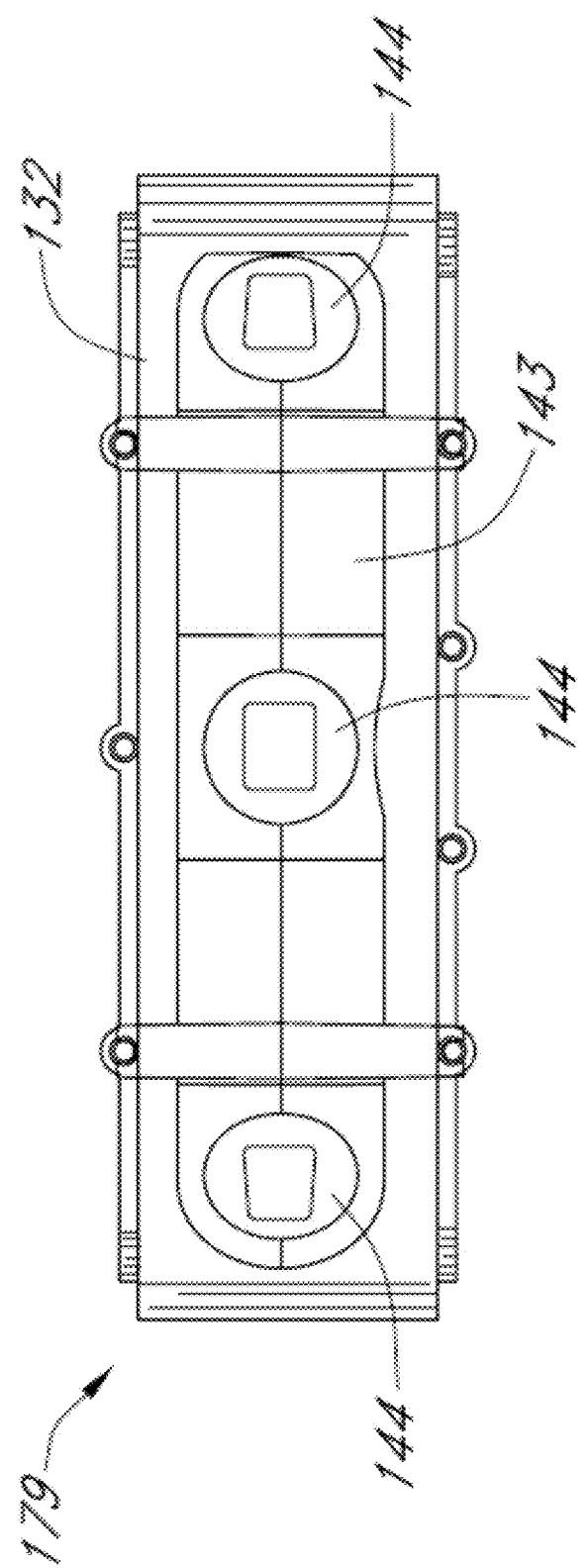

FIGS. 13 and 14 are top and front views, respectively, of a PIR sensor assembly 179, including the PIR sensor holder 143, the lens 132, and a flexible power circuit 145. The PIR sensor holder 143 may be secured to a rear face 132R of the lens 132, as shown, with the brackets 182 abutting the rear face 132R of the lens 132. The flexible power circuit 145, which may be any material or component capable of delivering power and/or data to and from the PIR sensors 144, is secured to a rear face 143R of the PIR sensor holder 143, and may be contoured to match the angular shape of the PIR sensor holder 143. The flexible power circuit 145 may connect to, draw power from, and/or transmit data to and/or from, the power PCB 148 (FIG. 6).

Figure 15:
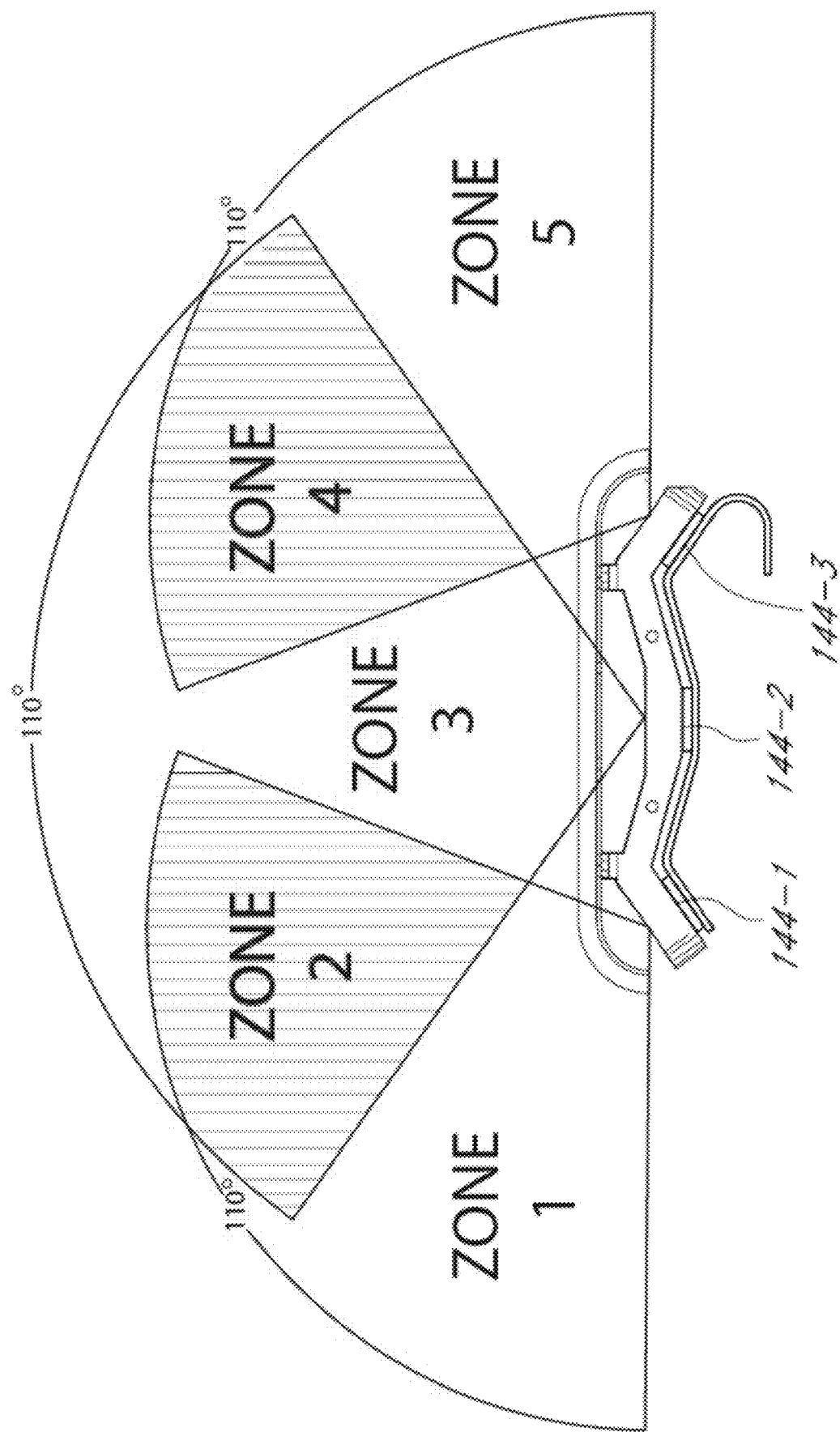
FIG. 15 is a top view of the passive infrared sensor assembly of FIG. 11 and a field of view thereof according to an aspect of the present disclosure.

FIG. 15 is a top view of the PIR sensor assembly 179 illustrating the fields of view of the PIR sensors 144. Each PIR sensor 144 includes a field of view, referred to as a "zone," that traces an angle extending outward from the respective PIR sensor 144. Zone 1 is the area that is visible only to passive infrared sensor 144-1. Zone 2 is the area that is visible only to the PIR sensors 144-1 and 144-2. Zone 3 is the area that is visible only to passive infrared sensor 144-2. Zone 4 is the area that is visible only to the PIR sensors 144-2 and 144-3. Zone 5 is the area that is visible only to passive infrared sensor 144-3. The doorbell 130 may be capable of determining the direction that an object is moving based upon which zones are triggered in a time sequence. In the illustrated embodiment, each zone extends across an angle of 110°. In alternative embodiments, each zone may extend across a different angle, such as one greater than or less than 110°.

Figure 16:
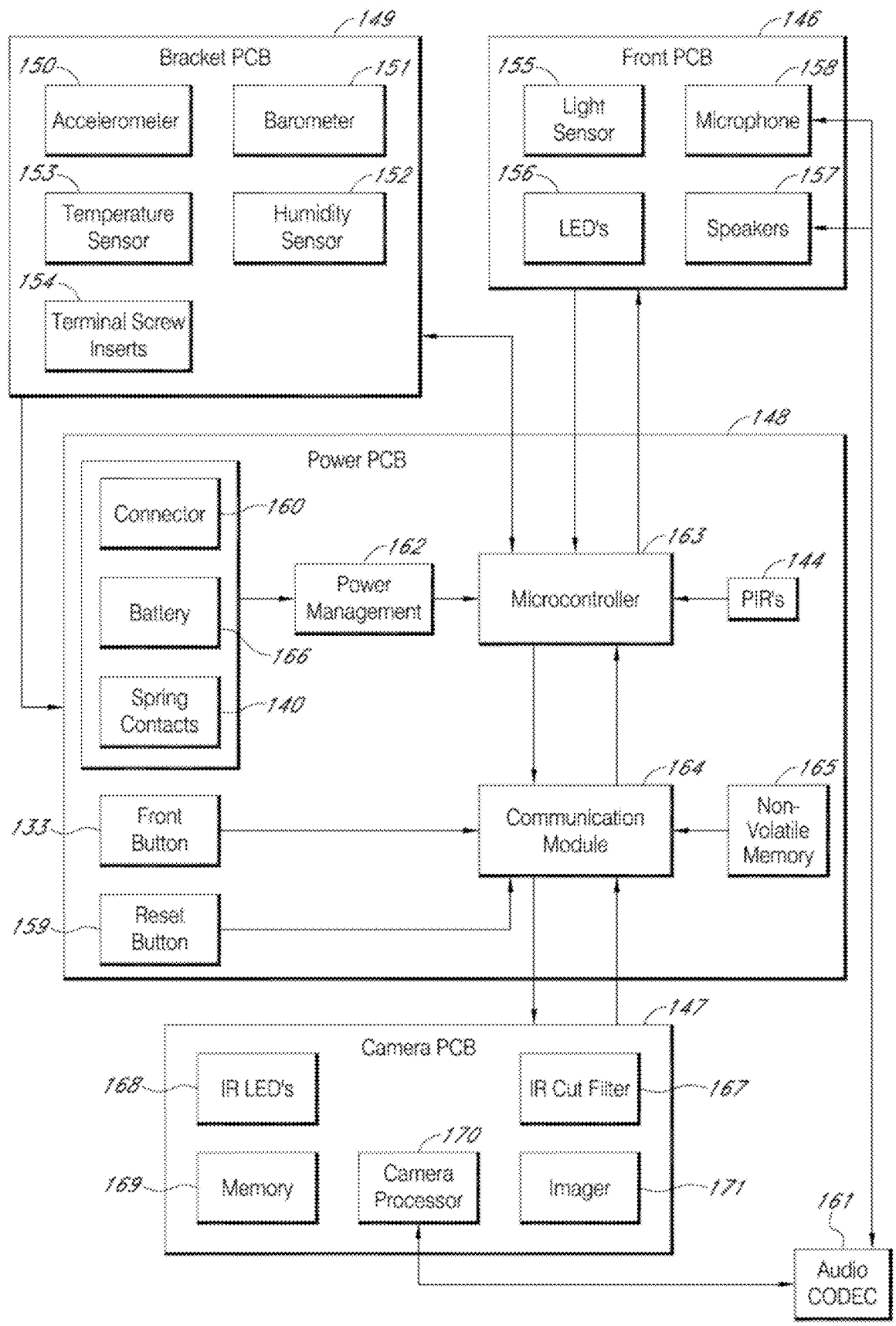
FIG. 16 a functional block diagram of the components of the A/V recording and communication device of FIG. 3.

FIG. 16 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 16, the bracket PCB 149 may further comprise terminal screw inserts 154, which may be configured to receive the terminal screws 138 and transmit power to the electrical contacts 177 on the mounting bracket 137 (FIG. 7). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 16, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electromechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 3). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 16, the power PCB 148 may comprise a power management module 162, a microcontroller 163 (may also be referred to as "processor," "CPU," or "controller"), the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. The power management module 162 may also serve as a conduit for data between the connector 160 and the microcontroller 163. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160.

With further reference to FIG. 16, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 16, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 16, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 720p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

Figure 17:
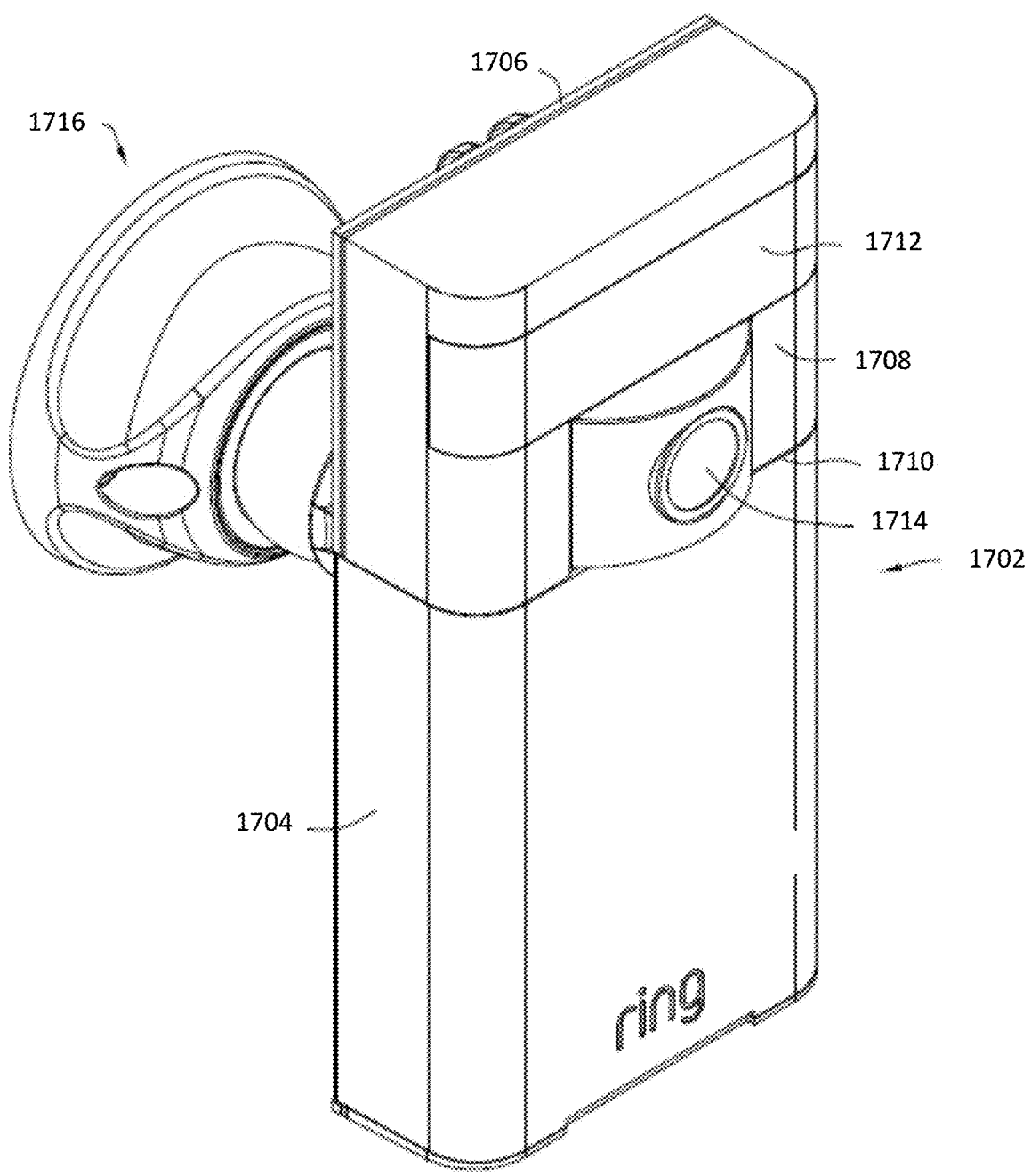
FIG. 17 is an upper front perspective view of an example A/V recording and communication security camera according to various aspects of the present disclosure.
Figure 18:
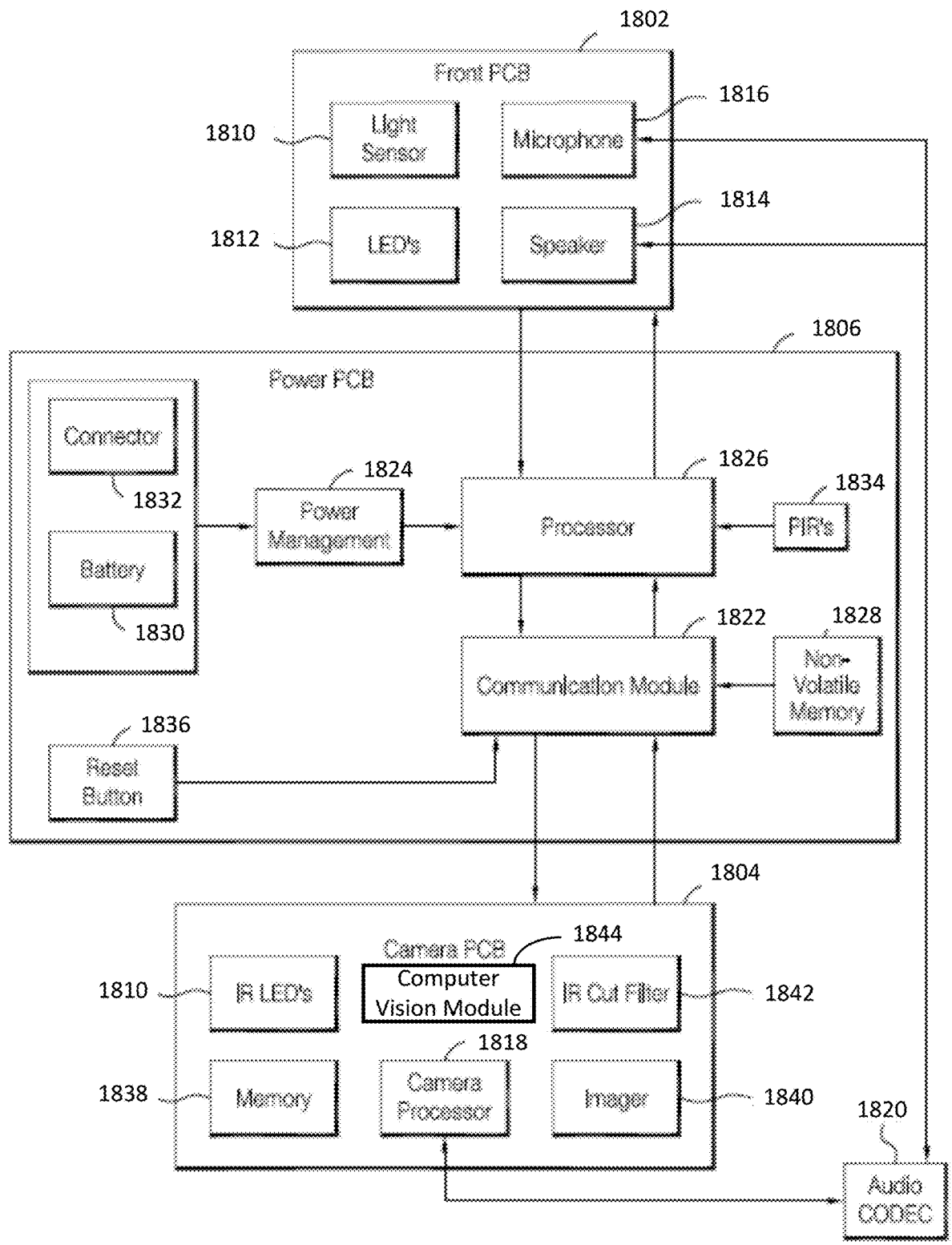
FIG. 18 is a functional block diagram of example components of the A/V recording and communication security camera of FIG. 17.

FIGS. 17 and 18 illustrate an example A/V recording and communication security camera according to various aspects of the present embodiments. With reference to FIG. 17, the security camera 1702, similar to the video doorbell 130, includes a faceplate 1704 that is mounted to a back plate 1706 and an enclosure 1708 that engages the faceplate 1704. Collectively, the faceplate 1704, the back plate 1706, and the enclosure 1708 form a housing that contains and protects the inner components of the security camera 1702. However, unlike the video doorbell 130, the security camera 1702 does not include any front button 133 for activating the doorbell. The faceplate 1704 may comprise any suitable material, including, without limitation, metals, such as brushed aluminum or stainless steel, metal alloys, or plastics. The faceplate 1704 protects the internal contents of the security camera 1702 and serves as an exterior front surface of the security camera 1702.

With continued reference to FIG. 17, the enclosure 1708 engages the faceplate 1704 and abuts an upper edge 1710 of the faceplate 1704. As discussed above with reference to FIG. 3, in alternative embodiments, one or more gaps between the enclosure 1708 and the faceplate 1704 may facilitate the passage of sound and/or light through the security camera 1702. The enclosure 1708 may comprise any suitable material, but in some embodiments the material of the enclosure 1708 preferably permits infrared light to pass through from inside the security camera 1702 to the environment and vice versa. The security camera 1702 further includes a lens 1712. Again, similar to the video doorbell 130, in some embodiments, the lens may comprise a Fresnel lens, which may be patterned to deflect incoming light into one or more infrared sensors located within the security camera 1702. The security camera 1702 further includes a camera 1714, which captures video data when activated, as described above and below.

With further reference to FIG. 17, the enclosure 1708 may extend from the front of the security camera 1702 around to the back thereof and may fit snugly around a lip (not shown) of the back plate 1706. The back plate 1706 may comprise any suitable material, including, without limitation, metals, such as brushed aluminum or stainless steel, metal alloys, or plastics. The back plate 1706 protects the internal contents of the security camera 1702 and serves as an exterior rear surface of the security camera 1702. The faceplate 1704 may extend from the front of the security camera 1702 and at least partially wrap around the back plate 1706, thereby allowing a coupled connection between the faceplate 1704 and the back plate 1706. The back plate 1706 may have indentations (not shown) in its structure to facilitate the coupling.

With continued reference to FIG. 17, the security camera 1702 further comprises a mounting apparatus 1716. The mounting apparatus 1716 facilitates mounting the security camera 1702 to a surface, such as an interior or exterior wall of a building, such as a home or office. The faceplate 1704 may extend from the bottom of the security camera 1702 up to just below the camera 1714, and connect to the back plate 1706 as described above. The lens 1712 may extend and curl partially around the side of the security camera 1702. The enclosure 1708 may extend and curl around the side and top of the security camera 1702, and may be coupled to the back plate 1706 as described above. The camera 1714 may protrude from the enclosure 1708, thereby giving it a wider field of view. The mounting apparatus 1716 may couple with the back plate 1706, thereby creating an assembly including the security camera 1702 and the mounting apparatus 1716. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

FIG. 18 is a functional block diagram of the components of the A/V recording and communication security camera of FIG. 17. With reference to FIG. 18, the interior of the wireless security camera 1702 comprises a plurality of printed circuit boards, including a front PCB 1802, a camera PCB 1804, and a power PCB 1806, each of which is described below. The camera PCB 1804 comprises various components that enable the functionality of the camera 1714 of the security camera 1702, as described below. Infrared light-emitting components, such as infrared LED's 1808, are coupled to the camera PCB 1804 and may be triggered to activate when a light sensor detects a low level of ambient light. When activated, the infrared LED's 1808 may emit infrared light through the enclosure 1708 and/or the camera 1714 out into the ambient environment. The camera 1714, which may be configured to detect infrared light, may then capture the light emitted by the infrared LED's 1808 as it reflects off objects within the camera's 1714 field of view, so that the security camera 1702 may clearly capture images at night (may be referred to as "night vision").

The front PCB 1802 comprises various components that enable the functionality of the audio and light components, including a light sensor 1810, LED's 1812, one or more speakers 1814, and a microphone 1816. The light sensor 1810 may be one or more sensors capable of detecting the level of ambient light of the surrounding environment in which the security camera 1702 may be located. The speakers 1814 may be any electromechanical device capable of producing sound in response to an electrical signal input. The microphone 1816 may be an acoustic-to-electric transducer or sensor capable of converting sound waves into an electrical signal. The front PCB 1802 and all components thereof may be electrically coupled to the power PCB 1806, thereby allowing data and/or power to be transferred to and from the power PCB 1806 and the front PCB 1802.

The speakers 1814 and the microphone 1816 may be coupled to a camera processor 1818 on the camera PCB 1804 through an audio CODEC 1820. For example, the transfer of digital audio from the user's client device 114 and the speakers 1814 and the microphone 1816 may be compressed and decompressed using the audio CODEC 1820, coupled to the camera processor 1818. Once compressed by audio CODEC 1820, digital audio data may be sent through the communication module 1822 to the network 112, routed by one or more servers 118, and delivered to the user's client device 114. When the user speaks, after being transferred through the network 112, digital audio data is decompressed by audio CODEC 1820 and emitted to the visitor via the speakers 1814.

With continued reference to FIG. 18, the power PCB 1806 comprises various components that enable the functionality of the power and device-control components, including a power management module 1824, a processor 1826 a communication module 1822, and power PCB non-volatile memory 1828. In certain embodiments, the power management module 1824 may comprise an integrated circuit capable of arbitrating between multiple voltage rails, thereby selecting the source of power for the security camera 1702. The battery 1830 and/or the connector 1832 may each provide power to the power management module 1824. The power management module 1824 (which may be similar to connector 1832) may have separate power rails dedicated to the battery 1830 and the connector 1832. The power management module 1824 may control charging of the battery 1830 when the connector 1832 is connected to an external source of power, and may also serve as a conduit for data between the connector 1832 and the processor 1826.

With further reference to FIG. 18, in certain embodiments the processor 1826 may comprise an integrated circuit including a processor core, memory, and programmable input/output peripherals. The processor 1826 may receive input signals, such as data and/or power, from the PIR sensors 1834, the power management module 1824, the light sensor 1810, the microphone 1816, and/or the communication module 1822, and may perform various functions as further described below. When the processor 1826 is triggered by the PIR sensors 1834, the processor 1826 may be triggered to perform one or more functions, such as initiating recording of video images via the camera 1714. When the light sensor 1810 detects a low level of ambient light, the light sensor 1810 may trigger the processor 1826 to enable "night vision," as further described below. The processor 1826 may also act as a conduit for data communicated between various components and the communication module 1822.

With further reference to FIG. 18, the security camera 1702 further comprises a communication module 1822 coupled to the power PCB 1806. The communication module 1822 facilitates communication with devices in one or more remote locations, as further described below. The communication module 1822 may comprise an integrated circuit including a processor core, memory, and programmable input/output peripherals. The communication module 1822 may also be configured to transmit data wirelessly to a remote network device, such as the user's client device 114, the remote storage device 116, and/or the remote server 118, and may include one or more transceivers (not shown). The wireless communication may comprise one or more wireless networks, such as, without limitation, Wi-Fi, cellular, Bluetooth, and/or satellite networks. The communication module 1822 may receive inputs, such as power and/or data, from the camera PCB 1804, the processor 1826, the reset button 1836 (which may be similar to the reset button 408), and/or the power PCB non-volatile memory 1828. When the reset button 1836 is pressed, the communication module 1822 may be triggered to erase any data stored at the power PCB non-volatile memory 1828 and/or at the camera PCB memory 1838. The communication module 1822 may also act as a conduit for data communicated between various components and the processor 1826. The power PCB non-volatile memory 1828 may comprise flash memory configured to store and/or transmit data. For example, in certain embodiments the power PCB non-volatile memory 1828 may comprise serial peripheral interface (SPI) flash memory.

With continued reference to FIG. 18, the power PCB 1806 further comprises the connector 1832 described above and a battery 1830. The connector 1832 may protrude outward from the power PCB 1806 and extend through a hole in the back plate 1706. The battery 1830, which may be a rechargeable battery, may provide power to the components of the security camera 1702.

With continued reference to FIG. 18, the power PCB 1806 further comprises passive infrared (PIR) sensors 1834, which may be secured on or within a PIR sensor holder (not shown) that resides behind the lens 1712 (FIG. 17). The PIR sensors 1834 may be any type of sensor capable of detecting and communicating the presence of a heat source within their field of view. Further, alternative embodiments may comprise one or more motion sensors either in place of or in addition to the PIR sensors 1834. The motion sensors may be configured to detect motion using any methodology, such as a methodology that does not rely on detecting the presence of a heat source within a field of view.

With further reference to FIG. 18, the camera PCB 1804 may comprise components that facilitate the operation of the camera 1714. For example, an imager 1840 may comprise a video recording sensor and/or a camera chip. In one aspect of the present disclosure, the imager 1840 may comprise a complementary metal-oxide semiconductor (CMOS) array, and may be capable of recording high definition (e.g., 1822p or better) video files. A camera processor 1818 may comprise an encoding and compression chip. In some embodiments, the camera processor 1818 may comprise a bridge processor. The camera processor 1818 may process video recorded by the imager 1840 and audio recorded by the microphone 1816, and may transform this data into a form suitable for wireless transfer by the communication module 1822 to a network. The camera PCB memory 1838 may comprise volatile memory that may be used when data is being buffered or encoded by the camera processor 1818. For example, in certain embodiments the camera PCB memory 1838 may comprise synchronous dynamic random access memory (SD RAM). IR LED's 1808 may comprise light-emitting diodes capable of radiating infrared light. IR cut filter 1842 may comprise a system that, when triggered, configures the imager 1840 to see primarily infrared light as opposed to visible light. When the light sensor 1810 detects a low level of ambient light (which may comprise a level that impedes the performance of the imager 1840 in the visible spectrum), the IR LED's 1808 may shine infrared light through the security camera 1702 enclosure out to the environment, and the IR cut filter 1842 may enable the imager 1840 to see this infrared light as it is reflected or refracted off of objects within the field of view of the security camera 1702. This process may provide the security camera 1702 with the "night vision" function mentioned above.

The camera PCB 1804 further includes a computer vision module 1844. Functionality of the computer vision module 1844 is described in greater detail below.

Figure 19:
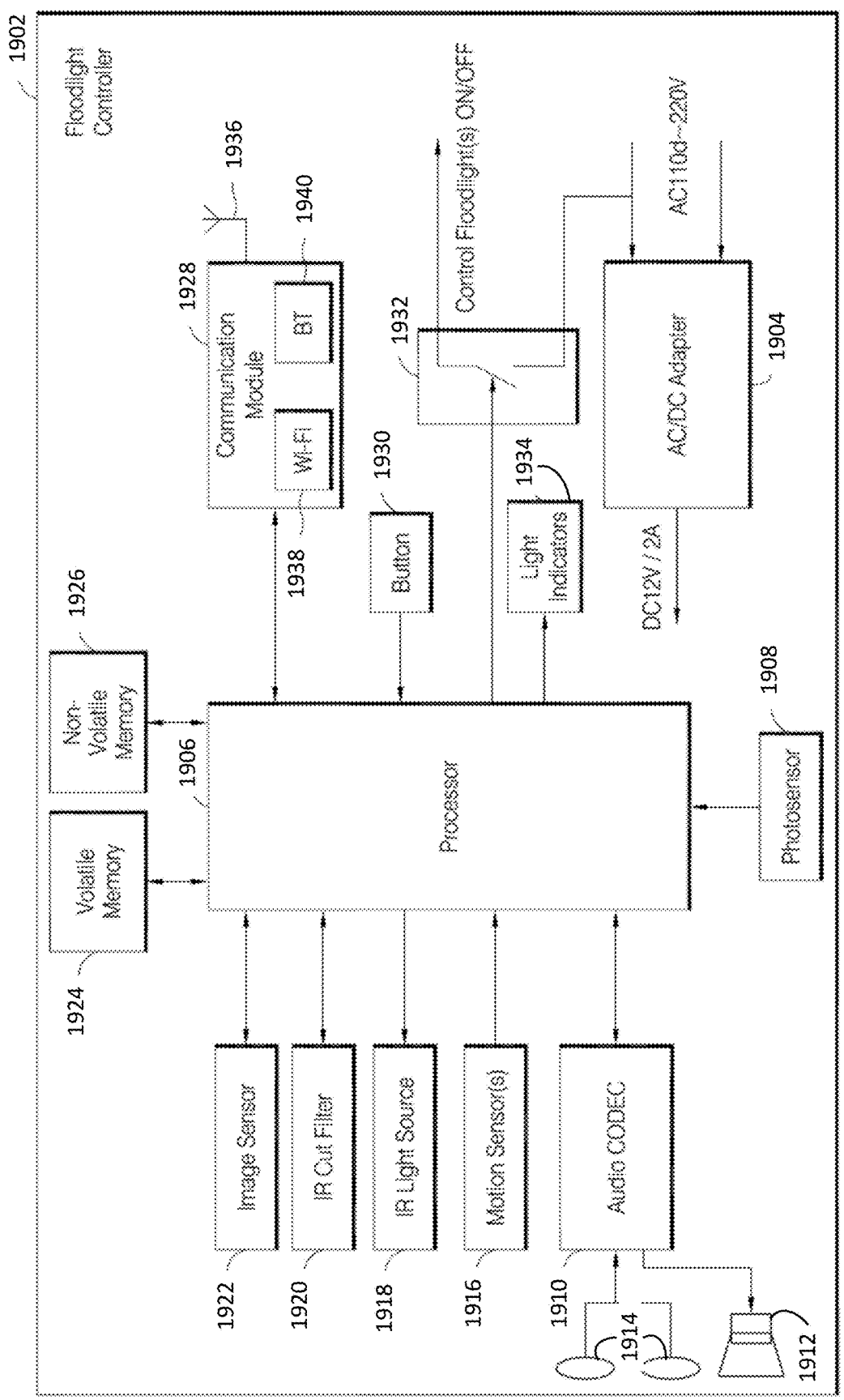
FIG. 19 is a functional block diagram of example components of a floodlight controller with A/V recording and communication features according to various aspects of the present disclosure.
Figure 20:
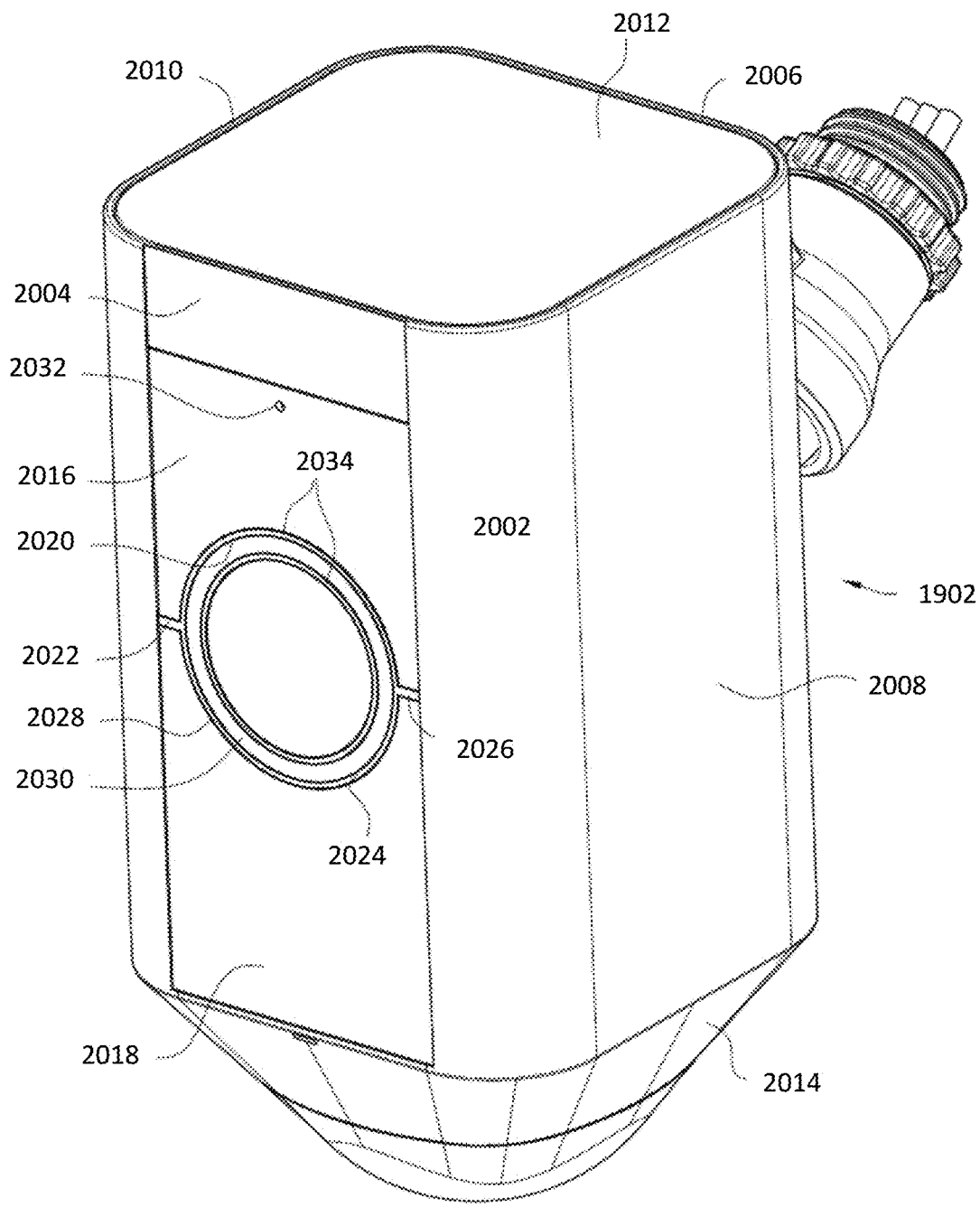
FIG. 20 is an upper front perspective view of an example floodlight controller with A/V recording and communication features according to various aspects of the present disclosure.
Figure 21:
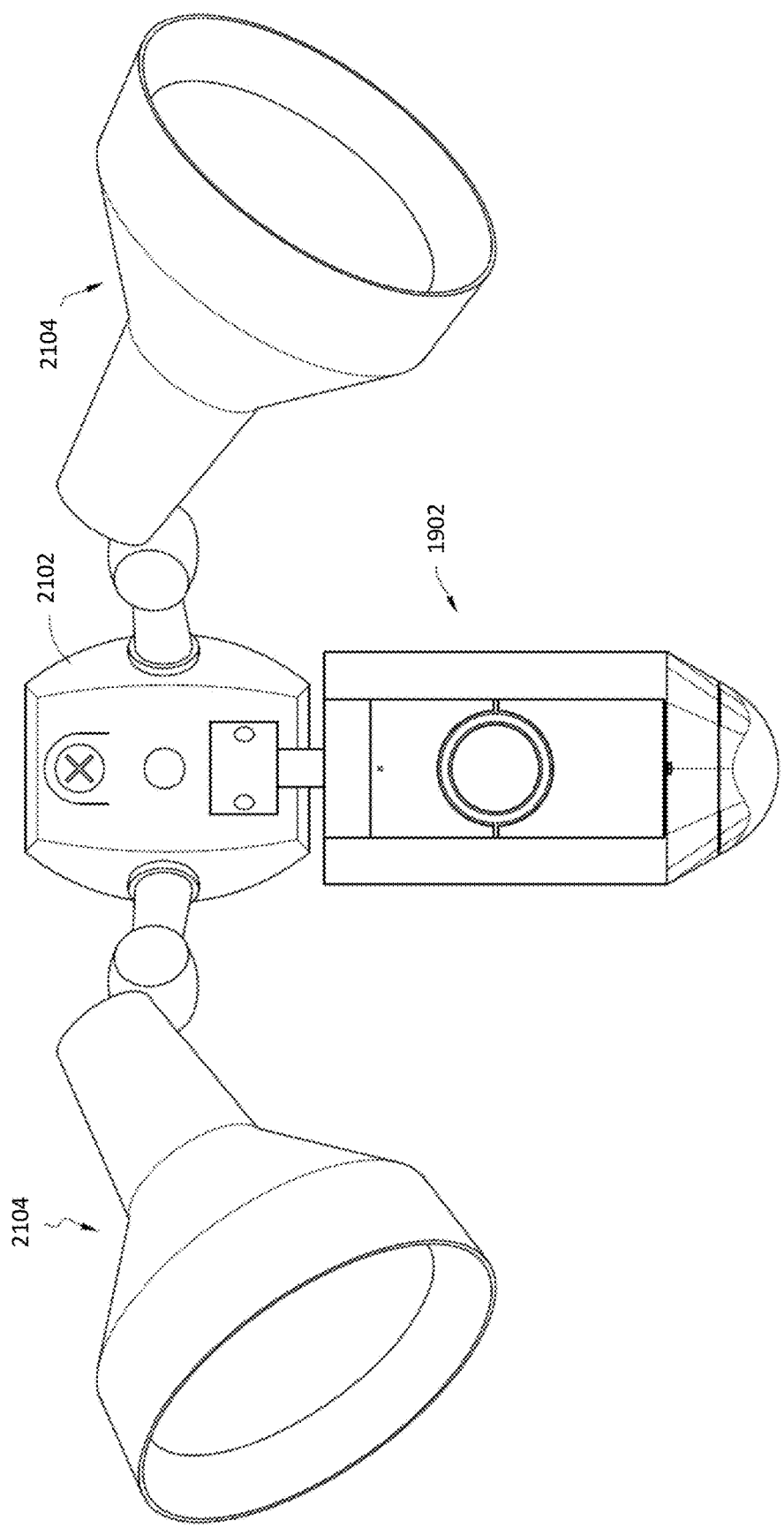
FIG. 21 is a front elevation view of the example floodlight controller with A/V recording and communication features of FIG. 20 in combination with a floodlight device according to various aspects of the present disclosure.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication floodlight controllers instead of, or in addition to, one or more A/V recording and communication doorbells. FIGS. 19-21 illustrate an example A/V recording and communication floodlight controller according to various aspects of the present embodiments. FIG. 19 is a functional block diagram illustrating various components of the floodlight controller 1902 and their relationships to one another. For example, the floodlight controller 1902 comprises an AC/DC adapter 1904. The floodlight controller 1902 is thus configured to be connected to a source of external AC (alternating-current) power, such as a household AC power supply (may also be referred to as AC mains). The AC power may have a voltage in the range of 110-220 VAC, for example. The incoming AC power may be received by the AC/DC adapter 1904, which may convert the incoming AC power to DC (direct-current) and may step down the voltage from 110-220 VAC to a lower output voltage of about 12 VDC and an output current of about 2 A, for example. In various embodiments, the output of the AC/DC adapter 1904 may be in a range of from about 9 V to about 15 V, for example, and in a range of from about 0.5 A to about 5 A, for example. These voltages and currents are only examples provided for illustration and are not limiting in any way.

With further reference to FIG. 19, the floodlight controller 1902 further comprises other components, including a processor 1906 (may also be referred to as a controller), a photosensor 1908, an audio CODEC (coder-decoder) 1910, at least one speaker 1912 (which may be similar to speaker 106), the at least one microphone 1914 (which may be similar to microphone 104), at least one motion sensor 1916, an infrared (IR) light source 1918, an IR cut filter 1920, an image sensor 1922 (may be a component of the camera 102, and may be referred to interchangeably as the camera 102), volatile memory 1924, non-volatile memory 1926, a communication module 1928, a button 1930, a switch 1932 for controlling one or more floodlights, and a plurality of light indicators 1934. Each of these components is described in detail below.

With further reference to FIG. 19, the processor 1906 may perform data processing and various other functions, as described below. The processor 1906 may comprise an integrated circuit including a processor core, the volatile memory 1924, the non-volatile memory 1926, and/or programmable input/output peripherals (not shown). The volatile memory 1924 may comprise, for example, DDR3 SDRAM (double data rate type three synchronous dynamic random-access memory). The non-volatile memory 1926 may comprise, for example, NAND flash memory. In the embodiment illustrated in FIG. 19, the volatile memory 1924 and the non-volatile memory 1926 are illustrated outside the box representing the processor 1906. The embodiment illustrated in FIG. 19 is, however, merely an example, and in some embodiments the volatile memory 1924 and/or the non-volatile memory 1926 may be physically incorporated with the processor 1906, such as on the same chip. The volatile memory 1924 and/or the non-volatile memory 1926, regardless of their physical location, may be shared by one or more other components (in addition to the processor 1906) of the present floodlight controller 1902.

With further reference to FIG. 19, the image sensor 1922 (camera 102), the IR light source 1918, the IR cut filter 1920, and the photosensor 1908 are all operatively coupled to the processor 1906. As described in detail below, the IR light source 1918 and the IR cut filter 1920 facilitate "night vision" functionality of the image sensor 1922. For example, the photosensor 1908 is configured to detect the level of ambient light about the floodlight controller 1902. The processor 1906 uses the input from the photosensor 1908 to control the states of the IR light source 1918 and the IR cut filter 1920 to activate and deactivate night vision, as described below. In some embodiments, the image sensor 1922 may comprise a video recording sensor or a camera chip. In some embodiments, the IR light source 1918 may comprise one or more IR light-emitting diodes (LEDs).

With further reference to FIG. 19, the at least one speaker 1912 and the at least one microphone 1914 are operatively coupled to the audio CODEC 1910, which is operatively coupled to the processor 1906. The transfer of digital audio between the user and a visitor (or intruder) may be compressed and decompressed using the audio CODEC 1910, as described below. The motion sensor(s) 1916 is also operatively coupled to the processor 1906. The motion sensor(s) 1916 may comprise, for example, passive infrared (PIR) sensors, or any other type of sensor capable of detecting and communicating to the processor 1906 the presence and/or motion of an object within its field of view. When the processor 1906 is triggered by the motion sensor(s) 1916, the processor 1906 may perform one or more functions, as described below.

With further reference to FIG. 19, the communication module 1928 is operatively coupled to the processor 1906. The communication module 1928, which includes at least one antenna 1936, is configured to handle communication links between the floodlight controller 1902 and other, external devices or receivers, and to route incoming/outgoing data appropriately. For example, inbound data from the antenna(s) 1936 may be routed through the communication module 1928 before being directed to the processor 1906, and outbound data from the processor 1906 may be routed through the communication module 1928 before being directed to the antenna(s) 1936. The communication module 1928 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, Bluetooth, or any other protocol and/or technology. In the illustrated embodiment, the communication module 1928 includes a Wi-Fi chip 1938 and a Bluetooth chip 1940, but these components are merely examples and are not limiting. Further, while the Wi-Fi chip 1938 and the Bluetooth chip 1940 are illustrated within the box representing the communication module 1928, the embodiment illustrated in FIG. 19 is merely an example, and in some embodiments the Wi-Fi chip 1938 and/or the Bluetooth chip 1940 are not necessarily physically incorporated with the communication module 1928.

In some embodiments, the communication module 1928 may further comprise a wireless repeater (not shown, may also be referred to as a wireless range extender). The wireless repeater is configured to receive a wireless signal from a wireless router (or another network device) in the user's network 110 and rebroadcast the signal. Wireless devices that are not within the broadcast range of the wireless router, or that only weakly receive the wireless signal from the wireless router, may receive the rebroadcast signal from the wireless repeater of the communication module 1928, and may thus connect to the user's network 110 through the floodlight controller 1902. In some embodiments, the wireless repeater may include one or more transceiver modules (not shown) capable of transmitting and receiving data, and using, for example, one or more protocols and/or technologies, such as Wi-Fi (IEEE 1902.11), WiMAX (IEEE 1902.16), or any other protocol and/or technology.

With further reference to FIG. 19, when a visitor (or intruder) who is present in the area about the floodlight controller 1902 speaks, audio from the visitor (or intruder) is received by the microphones 1914 and compressed by the audio CODEC 1910. Digital audio data is then sent through the communication module 1928 to the network 112 (FIG. 1) via the user's network 110, routed by the server 118 and/or the API 120, and delivered to the user's client device 114. When the user speaks, after being transferred through the network 112, the user's network 110, and the communication module 1928, the digital audio data from the user is decompressed by the audio CODEC 1910 and emitted to the visitor through the speaker 1912, which may be driven by a speaker driver (not shown).

With further reference to FIG. 19, the button 1930 is operatively coupled to the processor 1906. The button 1930 may have one or more functions, such as changing an operating mode of the floodlight controller 1902 and/or triggering a reset of the floodlight controller 1902. For example, when the button 1930 is pressed and released, it may cause the communication module 1928 of the floodlight controller 1902 to enter access point (AP) mode, which may facilitate connecting the floodlight controller 1902 to the user's network 110. Alternatively, or in addition, when the button 1930 is pressed and held down for at least a threshold amount of time, it may trigger the erasing of any data stored at the volatile memory 1924 and/or at the non-volatile memory 1926, and/or may trigger a reboot of the processor 1906.

With reference to FIG. 20, the floodlight controller 1902 comprises a housing 2002 for containing and protecting the interior components of the floodlight controller 1902. The housing 2002 includes a front wall 2004, a rear wall 2006, opposing side walls 2008, 2010, an upper wall 2012, and a tapered lower portion 2014. The front wall 2004 includes a central opening that receives an upper shield 2016 and a lower grill 2018. In the illustrated embodiment, front surfaces of the upper shield 2016 and the lower grill 2018 are substantially flush with a front surface of the front wall 2004, but in alternative embodiments these surfaces may not be flush with one another. The upper shield 2016 is substantially rectangular, and includes a semicircular indentation 2020 along its lower edge 2022. The lower grill 2018 is substantially rectangular, and includes a semicircular indentation 2024 along its upper edge 2026. Together, the semicircular indentations 2020, 2024 in the upper shield 2016 and the lower grill 2018 form a circular opening 2028 that accommodates a light pipe 2030. A cover extends across and closes an outer open end of the light pipe 2030. The upper shield 2016, the lower grill 2018, the light pipe 2030, and the cover are all described in further detail below. The camera (not shown) is located in the circular opening 2028 formed by the upper shield 2016 and the lower grill 2018, behind the cover, and is surrounded by the light pipe 2030.

With reference to FIG. 19, the floodlight controller 1902 further comprises the microphones 1914. In the illustrated embodiment, a first one of the microphones 1914 is located along the front of the floodlight controller 1902 behind the upper shield 2016 (FIG. 20) and a second one of the microphones 1914 is located along the left side of the floodlight controller 1902 behind the left-side wall 2010 (FIG. 20) of the housing 2002. Including two microphones that are spaced from one another and located on different sides of the floodlight controller 1902 provides the illustrated embodiment of the floodlight controller 1902 with advantageous noise cancelling and/or echo cancelling for clearer audio. The illustrated embodiment is, however, just one example and is not limiting. Alternative embodiments may only include one microphone 1914, or include two microphones 1914 in different locations than as illustrated in FIG. 19.

With reference to FIG. 20, the upper shield 2016 may include a first microphone opening 2032 located in front of the first microphone 1914 to facilitate the passage of sound through the upper shield 2016 so that sounds from the area about the floodlight controller 1902 may reach the first microphone 1914. The left-side wall 2010 of the housing 2002 may include a second microphone opening (not shown) located in front of the second microphone 1914 that facilitates the passage of sound through the left-side wall 2010 of the housing 2002 so that sounds from the area about the floodlight controller 1902 may reach the second microphone 1914.

With further reference to FIG. 20, the floodlight controller 1902 may further comprise a light barrier 2034 surrounding inner and outer surfaces of the light pipe 2030. The light barrier 2034 may comprise a substantially opaque material that prevents the light generated by the light indicators 1934 from bleeding into the interior spaces of the floodlight controller 1902 around the light pipe 2030. The light barrier 2034 may comprise a resilient material, such as a plastic, which may also advantageously provide moisture sealing at the junctures between the light pipe 2030 and the upper shield 2016 and the lower grill 2018. Portions of the light barrier 2034 may also extend between the junctures between the upper shield 2016 and the lower grill 2018.

With further reference to FIG. 19, the floodlight controller 1902 further comprises connecting hardware configured for connecting the floodlight controller 1902 to a floodlight device 2102 (FIG. 21) and a power source (not shown). The floodlight controller 1902 further comprises a plurality of wires for connecting the floodlight controller 1902 to the power supply and to the floodlight(s) 2104 (FIG. 21) of the floodlight device 2102 (for enabling the floodlight controller 1902 to turn the floodlight(s) 2104 on and off). In the illustrated embodiment, three wires may be used, but the illustrated embodiment is merely one example and is not limiting. In alternative embodiments, any number of wires may be provided.

Some of the present embodiments may comprise computer vision for one or more aspects, such as object and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that may interface with other thought processes and elicit appropriate action. This image understanding may be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data may take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes may be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that may be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Typical functions and components (e.g., hardware) found in many computer vision systems are described in the following paragraphs. The present embodiments may include at least some of these aspects. For example, embodiments of the present A/V recording and communication doorbell 130 may include a computer vision module (not shown). In addition, embodiments of the present security camera 1702 may include a computer vision module 1844. The computer vision module 1844 may include any of the components (e.g., hardware) and/or functionality described herein with respect to computer vision, including, without limitation, one or more cameras, sensors, and/or processors. In some of the present embodiments, with reference to FIGS. 3-16, the microphone 158, the camera 134, and/or the imager 171 may be components of the computer vision module.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but may also be related to various physical measures, such as depth, absorption or reflectance of sonic or electromagnetic waves, or nuclear magnetic resonance.

Pre-processing—Before a computer vision method may be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information may be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition identifies facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms probes a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms may be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It may also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors may be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital images or scanned images, for example. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that may be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers may be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras (e.g., security camera 1702 of FIGS. 17-18, the floodlight controller 1902 of FIGS. 19-21, etc.) instead of, or in addition to, one or more A/V recording and communication doorbells. An example A/V recording and communication security camera may include substantially all of the structure and functionality of the doorbell 130, but without the front button 133, the button actuator, and/or the light pipe 136. An example A/V recording and communication security camera may further omit other components, such as, for example, the bracket PCB 149 and its components.

As described above, the present embodiments advantageously leverage the functionality of A/V recording and communication devices to selectively monitor one or more intrusion zones. For example, an A/V recording and communication device may be configured to detect motion within its field of view and determine whether at least one conditional setting is satisfied. In various embodiments, conditional settings may include (but are not limited to) a time of day, a level of ambient light, a direction of movement, a speed of movement, a length of time an object is within an intrusion zone, a level of reflecting light intensity, and/or a body posture of a person within an intrusion zone. In some embodiments, when motion is detected in the intrusion zone while the at least one conditional setting is satisfied, an intrusion action may be determined and executed. By selectively monitoring intrusions using conditional settings, A/V recording and communication device resources may be preserved, and unwarranted intrusion alerts may be avoided.

In certain embodiments according to the present disclosure, the user may remotely modify settings of an A/V recording and communication device, such as (but not limited to) the A/V recording and communication device 100 (FIG. 1), the A/V recording and communication doorbell 130 (FIGS. 3-16), the security camera 1702 (FIG. 17-18), and/or the floodlight controller 1902 (FIGS. 19-21). For example, the user may toggle one or more zones (areas of the fields of view of the passive infrared sensors 144, FIG. 15) ON and OFF. In another example, the user may increase and decrease the range (or sensitivity) of the passive infrared sensors. Changes to the settings of the A/V recording and communication device may affect the notifications that the user receives from the A/V recording and communication device. For example, the user may turn off selected zones and/or decrease the range of the passive infrared sensors to reduce "false alarm" alerts, such as those generated by passing cars.

As discussed above, one aspect of the present embodiments includes the realization that sometimes motion detected by an A/V recording and communication device may be indicative of a threat, such as an intruder, and other times the motion may be benign, such as motion caused by an invited visitor, a parcel delivery carrier, a neighbor, an animal, or a passing vehicle. It would be advantageous, therefore, if the functionality of A/V recording and communication devices could be enhanced in one or more ways to distinguish between various types of motion within the field of view of the A/V recording and communication device. Such enhancements could increase the effectiveness of A/V recording and communication devices by providing a warning to the user when it is likely that detected motion is associated with a threat, while also possibly suppressing warnings to the user when it is unlikely that detected motion is associated with a threat. The user would thus be less likely to suffer alert fatigue due to persistent false alarms, thereby making it more likely that the user will respond to warnings that are associated with actual threats. The present embodiments provide these advantages and enhancements, as described below.

Another aspect of the present embodiments includes the realization that, when motion is detected by an A/V recording and communication device, a user may want a security system to perform one or more actions, and/or refrain from performing one or more actions, based on whether the motion was caused by a threat and/or if the motion was unlikely caused by a threat. However, security systems, other than those described by the current embodiments, may only be configured to activate an alarm when motion is detected, whether or not the motion was caused by a threat. In some circumstances, however, based on the location of where the motion is detected and/or based on the activation mode in which the security system is operating, the user of the security system may not want the security system to activate the alarm, as the motion may not be caused by a threat. For example, if the motion detected by the A/V recording and communication device occurred a great distance from the user's property, and/or the motion was detected during daylight hours when an invited visitor may enter the user's property, the user may not want the security system to activate the alarm, as the motion may not be caused by a threat. If the security system continuously activates the alarm based on motion that is not caused by a threat, the user may begin to ignore alerts that indicate that the security system has activated the alarm, which may cause the user to miss alerts of actual threats.

The current embodiments solve this problem by providing a user with the ability to configure a security system to perform one or more actions, and/or refrain from performing one or more actions, based on parameter(s) that the user sets for motion that is detected by an A/V recording and communication device. For example, the user may create intrusion zone(s) for the A/V recording and communication device. Each intrusion zone may be associated with a motion zone of the A/V recording and communication device, a conditional setting, an activation mode for the security system, and/or an action that the security system is to perform. Based on the A/V recording and communication device detecting motion within the intrusion zone, a network device may determine that the security system is operating in the activation mode and that the conditional setting is satisfied. In response, the network device may cause the security system to perform the action. As such, and as a result of using intrusion zones, the security system may perform a function, such as activating an alarm, at times when it is more likely that motion is caused by a threat. Additionally, the user may be provided with alerts that indicate actual threats, such that the user will not suffer from alert fatigue. Therefore, the user will more likely respond to warnings of actual threats detected by the security system. The present embodiments further provide these advantages and enhancements, as described below.

Figure 22:
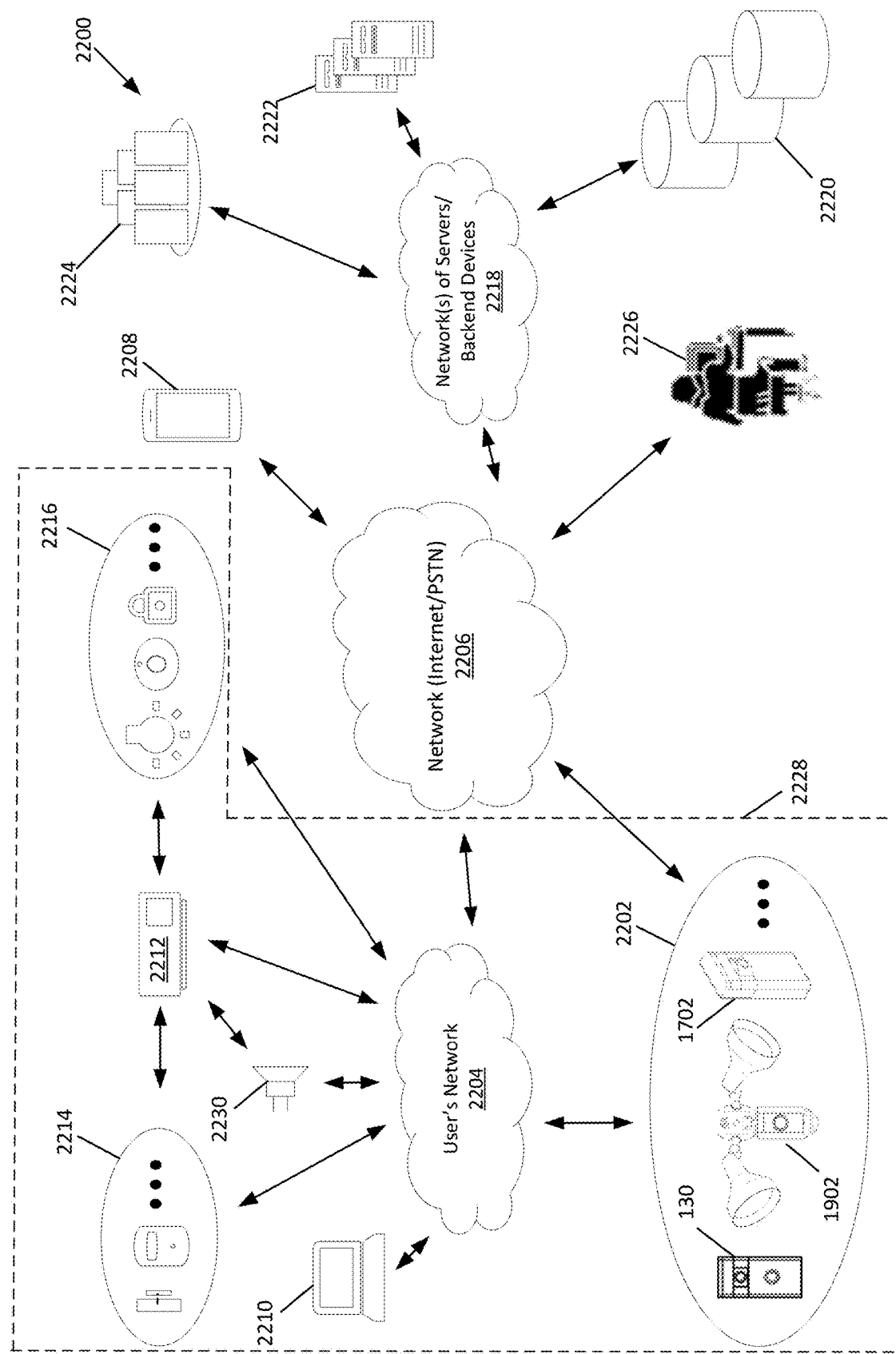
FIG. 22 is a functional block diagram illustrating an example system for communicating in a network according to various aspects of the present disclosure.

FIG. 22 is a functional block diagram illustrating a system 2200 for communicating in a network according to various aspects of the present disclosure. The system 2200 may include one or more A/V recording and communication devices 2202 configured to access a user's network 2204 (which may correspond to the user's network 110) to connect to a network (Internet/PSTN) 2206 (in some embodiments, the devices 2202 may be configured to connect directly to the network (Internet/PSTN) 2206, such as over a cellular connection). The one or more A/V recording and communication devices 2202 may include any or all of the components and/or functionality of the A/V recording and communication device 100 (FIGS. 1-2), the A/V recording and communication doorbell 130 (FIGS. 3-16), the security camera 1702 (FIGS. 17-18), and/or the floodlight controller 1902 (FIGS. 19-21).

The user's network 2204 may include any or all of the components and/or functionality of the user's network 110 described herein.

The system 2200 may further include a smart-home hub device 2212 (which may alternatively be referred to herein as the hub device 2212) connected to the user's network 2204. The smart-home hub device 2212 (also known as a home automation hub, gateway device, etc.), may comprise any device that facilitates communication with and control of the sensors 2214, automation devices 2216, and/or the one or more A/V recording and communication devices 2202. For example, the smart-home hub device 2212 may be a component of a home automation system installed at a property. In some embodiments, the A/V recording and communication devices 2202, the sensors 2214, and/or the automation devices 2216 may communicate with the smart-home hub device 2212 directly and/or indirectly via the user's network 2204 and/or the network (Internet/PSTN) 2206. In some of the present embodiments, the A/V recording and communication devices 2202, the sensors 2214, and/or the automation devices 2216 may, in addition to or in lieu of communicating with the smart-home hub device 2212, communicate with the client devices 2208, 2210 and/or one or more of the components of the network of servers/backend devices 2218 directly and/or indirectly via the user's network 2204 and/or the network (Internet/PSTN) 2206.

Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. Smart home devices (e.g., the hub device 2212, the sensors 2214, the automation devices 2216, the A/V recording and communication devices 2202, etc.), when remotely monitored and controlled via the network (Internet/PSTN) 2206, may be considered to be components of the Internet of Things. Smart home systems may include switches and/or sensors (e.g., the sensors 2214) connected to a central hub such as the smart-home hub device 2212, sometimes called a gateway, from which the system may be controlled with a user interface. The user interface may include any or all of a wall-mounted terminal (e.g., a keypad, a touchscreen, etc.), software installed on the client devices 2208, 2210 (e.g., a mobile application), a tablet computer or a web interface, often but not always via Internet cloud services. The home automation system may use one or more communication protocols, including either or both of wired and wireless protocols, including but not limited to Wi-Fi, X10, Ethernet, RS-485, 6LoWPAN, Bluetooth LE (BTLE), ZigBee, and Z-Wave.

The one or more sensors 2214 may include, for example, at least one of a door sensor, a window sensor, a contact sensor, a tilt sensor, a temperature sensor, a carbon monoxide sensor, a smoke detector, a light sensor, a glass break sensor, a motion sensor, and/or other sensors that may provide the user/owner of a security system 2228 a notification of a security event at his or her property.

The one or more automation devices 2216 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, and/or other automation devices.

As described herein, in some of the present embodiments, some or all of the user's network 2204, the client devices 2208, 2210, the A/V recording and communication device 2202, the smart-home hub device 2212, the sensors 2214, the automation devices 2216, and an alarm 2230 may be referred to as the security system 2228, which may be installed at a property or premises.

With further reference to FIG. 22, the system 2200 may also include various backend devices such as (but not limited to) storage devices 2220, backend server 2222, and backend APIs 2224 that may be in network communication (e.g., over the user's network 2204 and/or the network (Internet/PSTN) 2206) with the A/V recording and communication devices 2202, the hub device 2212, the client devices 2208, 2210, the sensors 2214, and/or the automation devices 2216. In some embodiments, the storage devices 2220 may be a separate device from the backend server 2222 (as illustrated) or may be an integral component of the backend server 2222. The storage devices 2220 may be similar in structure and/or function to the storage device 228 (FIG. 1). In addition, in some embodiments, the backend server 2222 and backend APIs 2224 may be similar in structure and/or function to the server 120 and the backend API 122 (FIG. 1), respectively.

With further reference to FIG. 22, the system 2200 may also include a security monitoring service 2226. The security monitoring service 2226 may be operated by the same company that manufactures, sells, and/or distributes the A/V recording and communication devices 2202, the hub device 2212, the sensors 2214, and/or the automation devices 2216. In other embodiments, the security monitoring service 2226 may be operated by a third-party company (e.g., a different company than the one that manufactured, sold, and/or distributed the A/V recording and communication devices 2202, the hub device 2212, the sensors 2214, and/or the automation devices 2216). In any of the present embodiments, the security monitoring service 2226 may have control of at least some of the features and components of the security system 2228 (e.g., the security monitoring service 2226 may be able to arm and/or disarm the security system 2228, lock and/or unlock doors, activate and/or deactivate one or more of the sensors 2214 and/or the automation devices 2216, etc.). For example, the security monitoring service 2226 may operate and control their own client devices and/or network of servers/backend devices for monitoring and/or controlling security systems 2228. In such an example, the A/V recording and communication devices 2202, the hub device 2212, the sensors 2214, and/or the automation devices 2216 may communicate with the client devices and/or one or more components of the network of servers/backend devices of the security monitoring service 2226 over the network (Internet/PSTN) 2206 (in some embodiments, via one or more of the components of the network of backend servers/backend devices 2218).

The system 2200 may also include one or more client devices 2208, 2210, which in various embodiments may be configured to be in network communication and/or associated with the A/V recording and communication device 2202. The client devices 2208, 2210 may comprise, for example, a mobile phone such as a smartphone, or a computing device such as a tablet computer, a laptop computer, a desktop computer, etc. The client devices 2208, 2210 may include any or all of the components and/or functionality of the client device 100 (FIG. 1) and/or the client device 800 (FIG. 48) described herein. In some embodiments, one or more of the client devices 2208, 2210 may not be associated with the A/V recording and communication device 2202.

With further reference to FIG. 22, the security system 2228 may include an alarm 2230 that outputs sound, such as when the security system 2228 is triggered. In some examples, the alarm 2230 may be separate from the other components of the security system 2228. In some examples, the alarm 22230 may include a component (e.g., installed within) of the hub device 2212.

Figure 23:
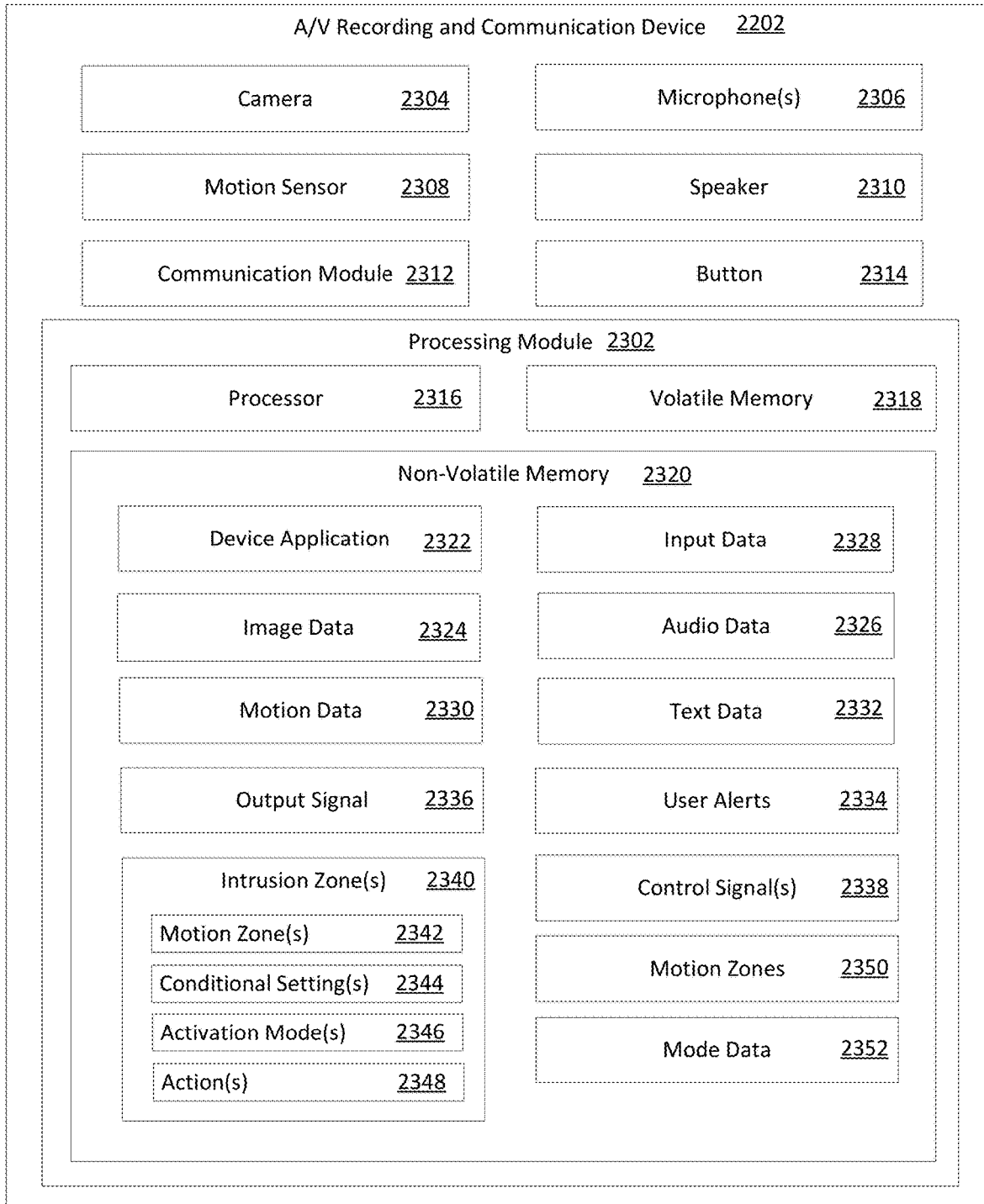
FIG. 23 is a functional block diagram illustrating one example embodiment of an A/V recording and communication device according to various aspects of the present disclosure.

FIG. 23 is a functional block diagram illustrating an embodiment of an A/V recording and communication device 2202 according to various aspects of the present disclosure. In some embodiments, the A/V recording and communication device 2202 may represent, and further include one or more of the components from, the A/V recording and communication doorbell 130, the A/V recording and communication security camera 1702, and/or the floodlight controller 1902. Additionally, in some embodiments, the A/V recording and communication device 2202 may omit one or more of the components shown in FIG. 23 and/or may include one or more additional components not shown in FIG. 23.

The A/V recording and communication device 2202 may comprise a processing module 2302 that is operatively connected to a camera 2304, microphone(s) 2306, a motion sensor 2308, a speaker 2310, a communication module 2312, and a button 2314 (in embodiments where the A/V recording and communication device 2202 is a doorbell, such as the A/V recording and communication doorbell 130). The processing module 2302 may comprise a processor 2316, volatile memory 2318, and non-volatile memory 2320, which includes a device application 2322. In various embodiments, the device application 2322 may configure the processor 2316 to capture image data 2324 using the camera 2304, audio data 2326 using the microphone(s) 2306, input data 2328 using the button 2314 (and/or the camera 2304 and/or the motion sensor 2308, depending on the embodiment), and/or motion data 2330 using the camera 2304 and/or the motion sensor 2308. In some embodiments, the device application 2322 may also configure the processor 2316 to generate text data 2332 describing the image data 2324, the audio data 2326, and/or the input data 2328, such as in the form of metadata, for example.

In addition, the device application 2322 may configure the processor 2316 to transmit the image data 2324, the audio data 2326, the motion data 2330, the input data 2328, the text data 2332, and/or a user alert 2334 to the client devices 2208, 2210, the hub device 2212, and/or the backend server 2222 using the communication module 2312. In various embodiments, the device application 2322 may also configure the processor 2316 to generate and transmit an output signal 2336 that may include the image data 2324, the audio data 2326, the text data 2332, the input data 2328, and/or the motion data 2330. In some of the present embodiments, the output signal 2336 may be transmitted to the backend server 2222 and/or the hub device 2212 using the communication module 2312, and the backend server 2222 and/or the hub device 2212 may transmit (or forward) the output signal 2336 to the client devices 2208, 2210 and/or the backend server 2222 may transmit the output signal 2336 to the hub device 2212. In other embodiments, the output signal 2336 may be transmitted directly to the client devices 2208, 2210 and/or the hub device 2212.

In further reference to FIG. 23, the image data 2324 may comprise image sensor data such as (but not limited to) exposure values and data regarding pixel values for a particular sized grid. The image data 2324 may include still images, live video, and/or pre-recorded images and/or video. The image data 2324 may be recorded by the camera 2304 in a field of view of the camera 2304.

In further reference to FIG. 23, the motion data 2330 may comprise motion sensor data generated in response to motion events. For example, the motion data 2330 may include an amount or level of a data type generated by the motion sensor 2308 (e.g., the voltage level output by the motion sensor 2308 when the motion sensor 2308 is a PIR type motion sensor (e.g., PIRs 144)). In some of the present embodiments, such as those where the A/V recording and communication device 2202 does not include the motion sensor 2308, the motion data 2330 may be generated by the camera 2304. In such embodiments, based on a frame by frame comparison of changes in the pixels from the image data 2324, it may be determined that motion is present.

The input data 2328 may include that data generated in response to an input to the button 2314. The button 2314 (which may include similar design and functionality to that of the front button 133 (FIG. 3)) may receive an input (e.g., a press, a touch, a series of touches and/or presses, etc.) and may generate the input data 2328 in response that is indicative of the type of input. In embodiments where the A/V recording and communication device 2202 is not a doorbell, the A/V recording and communication device 2202 may not include the button 2314, and in such embodiments, the A/V recording and communication device 2202 may not generate the input data 2328 and/or the input data 2328 may be generated by another component of the A/V recording and communication device 2202 (e.g., the camera 2304).

With further reference to FIG. 23, a user alert 2334 may be generated by the processor 2316 and transmitted, using the communication module 2312, to the client devices 2208, 2210, the hub device 2212, and/or the backend server 2222. For example, in response to detecting motion using the camera 2304 and/or the motion sensor 2308, the A/V recording and communication device 2202 may generate and transmit the user alert 2334. In some of the present embodiments, the user alert 2334 may include at least the image data 2324, the audio data 2326, the text data 2332, and/or the motion data 2330. Upon receiving the user alert 2334, the user of the client device 2208, 2210 may be able to share the user alert 2334 (or at least some of the contents of the user alert 2334, such as the image data 2324) with a geographic area network.

As described herein, at least some of the processes of the hub device 2212, the backend server 2222, and/or the client device 2208, 2210 may be executed by the A/V recording and communication device 2202. For example, the device application 2322 may configure the processor 2316 to receive, using the communication module 2312, control signals 2338 from the client device 2208, 2210, the hub device 2212, and/or the backend server 2222, where the control signal 2338 are configured to cause the A/V recording and communication device 2202 to save intrusion zone(s) 2340 and/or monitor intrusion zone(s) 2340. For example, the control signals 2338 may include, and/or the processor 2316 of the A/V recording and communication device 2202 may separately receive, using the communication module 2312, data representing the intrusion zone(s) 2340.

As described above, the A/V recording and communication device 2202 may monitor one or more intrusion zone(s) 2340 to determine when motion is detected within the one or more intrusion zone(s) 2340. As shown, each intrusion zone 2340 may include and/or be associated with motion zone(s) 2342, conditional setting(s) 2344, activation mode(s) 2346, and/or action(s) 2348. The motion zone(s) 2342 may include one or more of the motion zones 2350 associated with a field of view of the A/V recording and communication device 2202, which are illustrated in FIGS. 27-33. For example, and without limitation, the A/V recording and communication device 2202 may include five separate motion zones 2350. As such, an intrusion zone 2340 may be associated with one of the five motion zones 2350, such as the third motion zone 2350 (which is represented by motion zone 2342). Conditional setting(s) 2344 may include, but are not limited to, a time of day, a level of ambient light, a direction of movement, a speed of movement, a length of time an object is within an intrusion zone, a level of reflecting light intensity, and/or a body posture of a person within an intrusion zone.

Activation mode(s) 2346 may include one or more activation modes associated with the security system 2228. The one or more activation modes associated with the security system 2228 may include, but are not limited to, an armed stay mode, an armed away mode, an armed vacation mode, a disarmed mode, and a custom armed mode. For example, in the armed stay mode, the sensors 2214 inside the property (e.g., the motion sensors) may be disarmed, while the sensors 2214 (e.g., the door sensors, the window sensors, etc.) outside and along a perimeter of the property and/or the A/V recording and communication devices 2202 may be armed. Additionally, during the armed stay mode, at least one of the automation devices 2216 (e.g., an exterior automation system) may be activated between certain hours, such as, but not limited to, 6:00 p.m. and 4:00 a.m.

In the armed away mode, the sensors 2214 inside the property, the sensors 2214 outside and along the perimeter of the property, and/or the A/V recording and communication devices 2202 may be armed. Additionally, during the armed away mode, at least one of the automation devices 2216 (e.g., an interior and/or exterior automation system) may be activated between certain hours, such as, but not limited to, 6:00 p.m. and 4:00 a.m. In the armed vacation mode, the sensors 2214, the automation devices 2216, and/or the first A/V recording and communication devices 2202 may be armed and disarmed similar to the armed away mode, however, any alerts and security events may additionally or alternatively be sent to neighbors and/or law enforcement.

In the disarmed mode, all of the sensors 2214 and/or the automation devices 2216 may be disarmed. However, in the disarmed mode, one or more A/V recording and communication devices 2202 (e.g., security cameras 1702, floodlight cameras 1902, video doorbells 130, etc.) may be in an active state for detecting motion and/or recording image data 2324 in the field of view of the one or more first A/V recording and communication devices 2202. In the custom mode, the user/owner of the security system 2228 may configure each of the sensors 2214, the automation devices 2216, and/or the A/V recording and communication devices 2202. For example, in the custom mode, "Summer," the user/owner may arm each of the door sensors but disable the window sensors (e.g., where windows may be left open for air flow). In addition, the user/owner may activate each of the A/V recording and communication devices 2202 in the back yard to record image data 1224 between 8:00 am and 5:00 p.m. (e.g., because the kids may regularly play in the back yard during the Summer months).

The action(s) 2348 may include one or more actions that the A/V recording and communication device 2202 is to perform and/or one or actions that the security system 2228 (e.g., the hub device 2212, the backend server 2222, etc.) is to perform based on the A/V recording and communication device 2202 detecting motion within the intrusion zone 2340, the conditional setting(s) 2344 being satisfied, and/or the security system 2228 operating in the activation mode(s) 2346. For example, the one or more actions that the A/V recording and communication device 2202 is to perform may include, but are not limited to, recording image data 2324 using the camera 2304, activating a light (e.g., floodlight(s) 2104, a light of a lighting automation system of the automation devices 1116, etc.), outputting a warning sound using the speaker 2310 and/or a siren, and/or transmitting a user alert 2334 to at least one of the client device 2208, 2210, the hub device 2212, and the backend server 2222. The one or more actions that the security system 2228 is to perform may include, but are not limited to, activating the alarm 2230 of the security system 2228, outputting a warning sound (e.g., using the speaker of the hub device 2212), transmitting a user alert 2334 to the client device 2208, 2210 and/or the security monitoring server 2226, and/or changing a state of at least one automation device 2216 (e.g., locking a lock, powering on a light, locking a window, etc.).

The device application 2322 may configure the processor 2316 to monitor the intrusion zone(s) 2340. For example, to monitor an intrusion zone 2340, the processor 2316 of the A/V recording and communication device 2202 may detect, using the motion data 2330 and/or the image data 2324, motion within the intrusion zone 2340. In response, the processor 2316 of the A/V recording and communication device 2202 may determine whether the conditional setting(s) 2344 associated with the intrusion zone 2340 are satisfied. If the processor 2316 of the A/V recording and communication device 2202 determines that the conditional setting(s) 2344 associated with the intrusion zone 2340 are not satisfied, then the processor 2316 of the A/V recording and communication device 2202 may refrain from performing the action(s) 2348. However, if the processor 2316 of the A/V recording and communication device 2202 determines that the conditional setting(s) 2344 associated with the intrusion zone 2340 are satisfied, then the processor 2316 of the A/V recording and communication device 2202 may determine if the security system 2228 is operating in one of the activation mode(s) 2346 associated with the intrusion zone 2340.

In some examples, to determine if the security system 2228 is operating in one of the activation mode(s) 2346, the processor 2316 of the A/V recording and communication device 2202 may receive, using the communication module 2312, mode data 2352 from the client device 2208, 2210, the hub device 2212, and/or the backend server 2222. The mode data 2352 may indicate the current activation mode in which the security system 2228 is operating. In some examples, the processor 2316 of the A/V recording and communication device 2202 may receive the mode data 2352 in response to transmitting, using the communication module 2312, a request for the mode data 2352 to the client device 2208, 2210, the hub device 2212, and/or the backend server 2222. In some examples, the processor 2316 of the A/V recording and communication device 2202 may receive the mode data 2352 each time the security system 2228 switches from an activation mode to a new activation mode.

In either of the examples above, the processor 2316 of the A/V recording and communication device 2202 may use the current activation mode, as indicated by the mode data 2352, to determine whether the security system 2228 is operating in one of the activation mode(s) 2346 associated with the intrusion zone 2340. If the processor 2316 of the A/V recording and communication device 2202 determines that the security system 2228 is not operating in one of the activation mode(s) 2346, then the processor 2316 of the A/V recording and communication device 2202 may refrain from performing the action(s) 2348. However, if the processor 2316 of the A/V recording and communication device 2202 determines that the security system 2228 is operating in one of the activation mode(s) 2346, then the processor 2316 of the A/V recording and communication device 2202 may cause the A/V recording and communication device 2202 to perform one or more of the action(s) 2348.

In some of the present embodiments, one or more of the intrusion zone(s) 2340 may not include motion zone(s)

2342, conditional setting(s) 2344, and/or activation mode(s) 2346. For example, to monitor an intrusion zone 2340 that includes motion zone(s) 2342 and activation mode(s) 2346, the processor 2316 of the A/V recording and communication device 2202 may detect, using the motion data 2330 and/or the image data 2324, motion within the intrusion zone 2340. In response, the processor 2316 of the A/V recording and communication device 2202 may determine whether the security system 2228 is operating in one of the activation mode(s) 2346. If the processor 2316 of the A/V recording and communication device 2202 determines that the security system 2228 is not operating in one of the activation mode(s) 2346, then the processor 2316 of the A/V recording and communication device 2202 may refrain from performing the action(s) 2348 associated with the intrusion zone 2340. However, if the processor 2316 of the A/V recording and communication device 2202 determines that the security system 2228 is operating in one of the activation mode(s) 2346, then the processor 2316 of the A/V recording and communication device 2202 may cause the A/V recording and communication device 2202 to perform one or more of the action(s) 2348 associated with the intrusion zone 2340.

Figure 24:
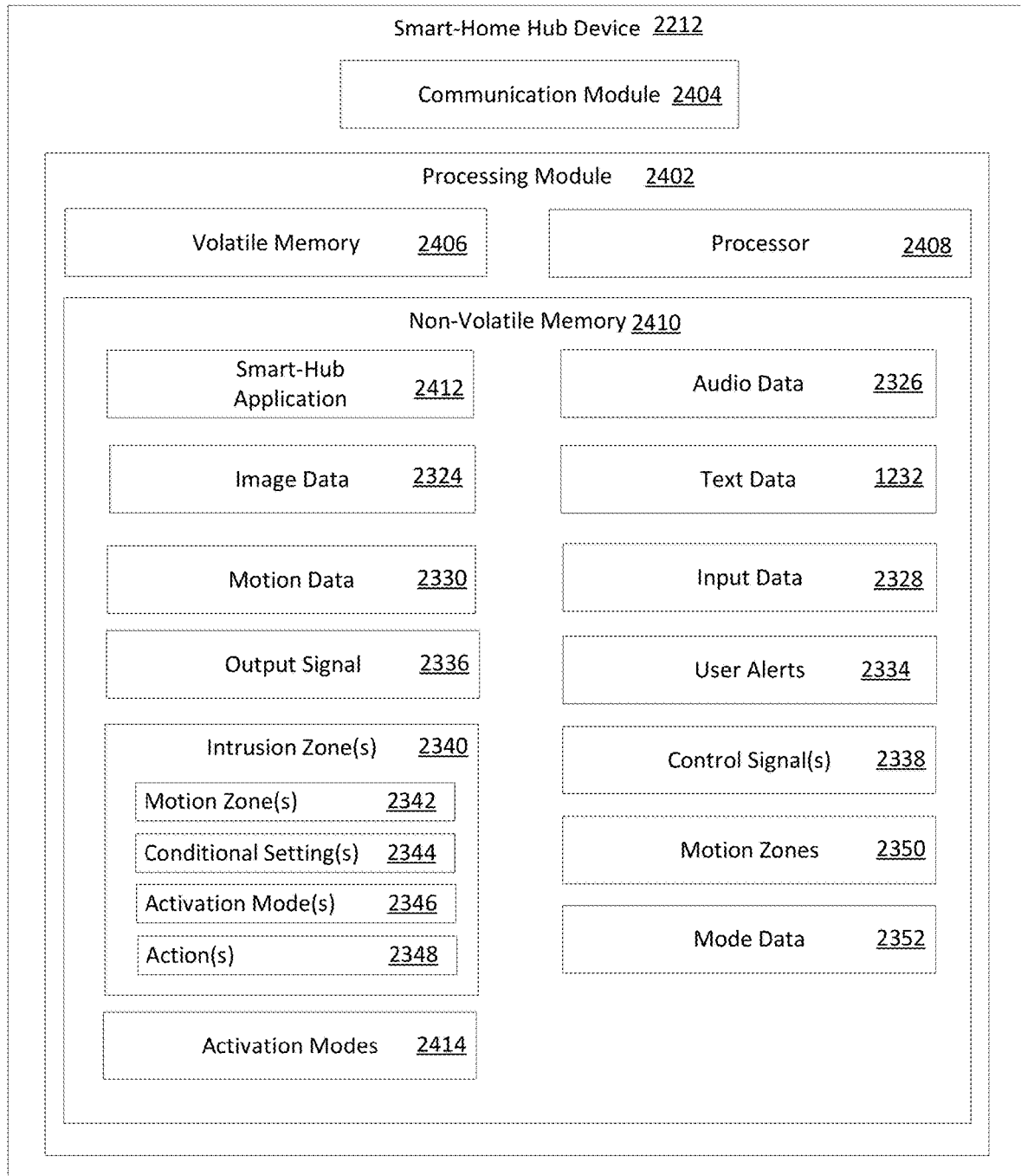
FIG. 24 is a functional block diagram illustrating one example embodiment of a hub device according to various aspects of the present disclosure.

FIG. 24 is a functional block diagram illustrating an example of the smart-home hub device 2212 (alternatively referred to herein as the hub device 2212) according to various aspects of the present disclosure. The hub device 2212 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 2206 for enabling remote control of the hub device 2212), and/or another similar device. The hub device 2212 may comprise a processing module 2402 that is operatively connected to a communication module 2404. In some examples, the hub device 2212 may comprise one or more of a camera (not shown), a microphone (not shown), a speaker (not shown), and the alarm 2230. The processing module 2402 may comprise volatile memory 2406, a processor 2408, and non-volatile memory 2410, which includes a smart-home hub application 2412.

In various embodiments, the smart-home hub application 2412 may configure the processor 2408 to receive sensor data from the sensors 2214 and/or the automation devices 2216. For example, the sensor data may include a current state (e.g., opened/closed for door and window sensors, motion detected for motion sensors, living room lights on/off for a lighting automation system, etc.) of each of the sensors 2214 and/or the automation devices 2216. In some examples, the sensor data may be received in response to sensor triggers. The sensor triggers may be a door opening/closing, a window opening/closing, lights being turned on/off, blinds being opened/closed, etc. As such, the sensor data may include the current state of the sensors 2214 and/or the automation devices 2216 as well as any updates to the current state based on sensor triggers.

With further reference to FIG. 24, the smart-home hub application 2412 may configure the processor 2408 to receive the audio data 2326, the text data 2332, the image data 2324, the motion data 2330, the input data 2328, and/or the user alerts 2334 from the A/V recording and communication device 2202 (in some embodiments, via the backend server 2222 and/or the client devices 2208, 2210) using the communication module 2404. For example, the hub device 2212 may receive and/or retrieve (e.g., after receiving a signal from the A/V recording and communication device 2202 that the A/V recording and communication device 2202 has been activated) the image data 2324, the input data 2328, and/or the motion data 2330 from the A/V recording and communication device 2202 and/or the backend server 2222 in response to motion being detected by the A/V recording and communication device 2202. Additionally, the smart-home hub application 2412 may configure the processor 2408 to transmit, using the communication module 2404, the audio data 2326, the text data 2332, the image data 2324, the motion data 2330, the input data 2328, and/or the user alerts 2334 to the client devices 2208, 2210 and/or the backend server 2222.

Additionally, the smart-home hub application 2412 may configure the processor 2408 to receive, using the communication module 2404, the control signal(s) 2338, the mode data 2352, and/or the data representing the intrusion zone(s) 2340 (which may be included in the control signal(s) 2338) from the A/V recording and communication device 2202, the client device 2208, 2210, and/or the backend server 2222. Furthermore, the smart-home hub application 2412 may configure the processor 2408 to transmit, using the communication module 2404, the control signal(s) 2338, the mode data 2352, and/or the data representing the intrusion zone(s) 2340 (which may be included in the control signal(s) 2338) to the A/V recording and communication device 2202, the client device 2208, 2210, and/or the backend server 2222.

As described herein, at least some of the processes of the A/V recording and communication device 2202, the backend server 2222, and/or the client device 2208, 2210 may be executed by the hub device 2212. For example, the smart-hub application 2412 may configure the processor 2408 to monitor the intrusion zone(s) 2340 associated with the A/V recording and communication device 2202 using the motion data 2330 and/or the image data 2324. Based on determining that motion is detected in an intrusion zone 2340, one or more of the conditional setting(s) 2344 is satisfied, and/or the security system 2228 is operating in one of the activation mode(s) 2346, the smart-hub application 2412 may configure the processor 2408 to perform one or more of the actions(s) 2348. For example, the processor 2408 of the hub device 2212 may activate the alarm 2230 of the security system 2228, output a warning sound (e.g., using the speaker of the hub device 2212), transmit a user alert 2334 to the client device 2208, 2210, the security monitoring server 2226, and/or the backend server 2222, and/or change a state of at least one automation device 2216.

In some embodiments, the smart-hub application 2412 may further configure the processor 2408 to cause the security system 2228 to switch between activation modes 2414, which are described above. In some examples, the processor 2408 of the hub device 2212 may cause the security system 2228 to switch from a first activation mode 2414 to a second activation mode 2414 in response to receiving, using the communication module 2404, a control signal 233 from the client device 2208, 2210 and/or the backend server 2222. In some examples, the processor 2408 of the hub device 2212 may cause the security system 2228 to switch from a first activation mode 2414 to a second activation mode 2414 in response to receiving input using an input device (e.g., keypad, display, etc.) associated with the hub device 2212 (not shown).

Figure 25:
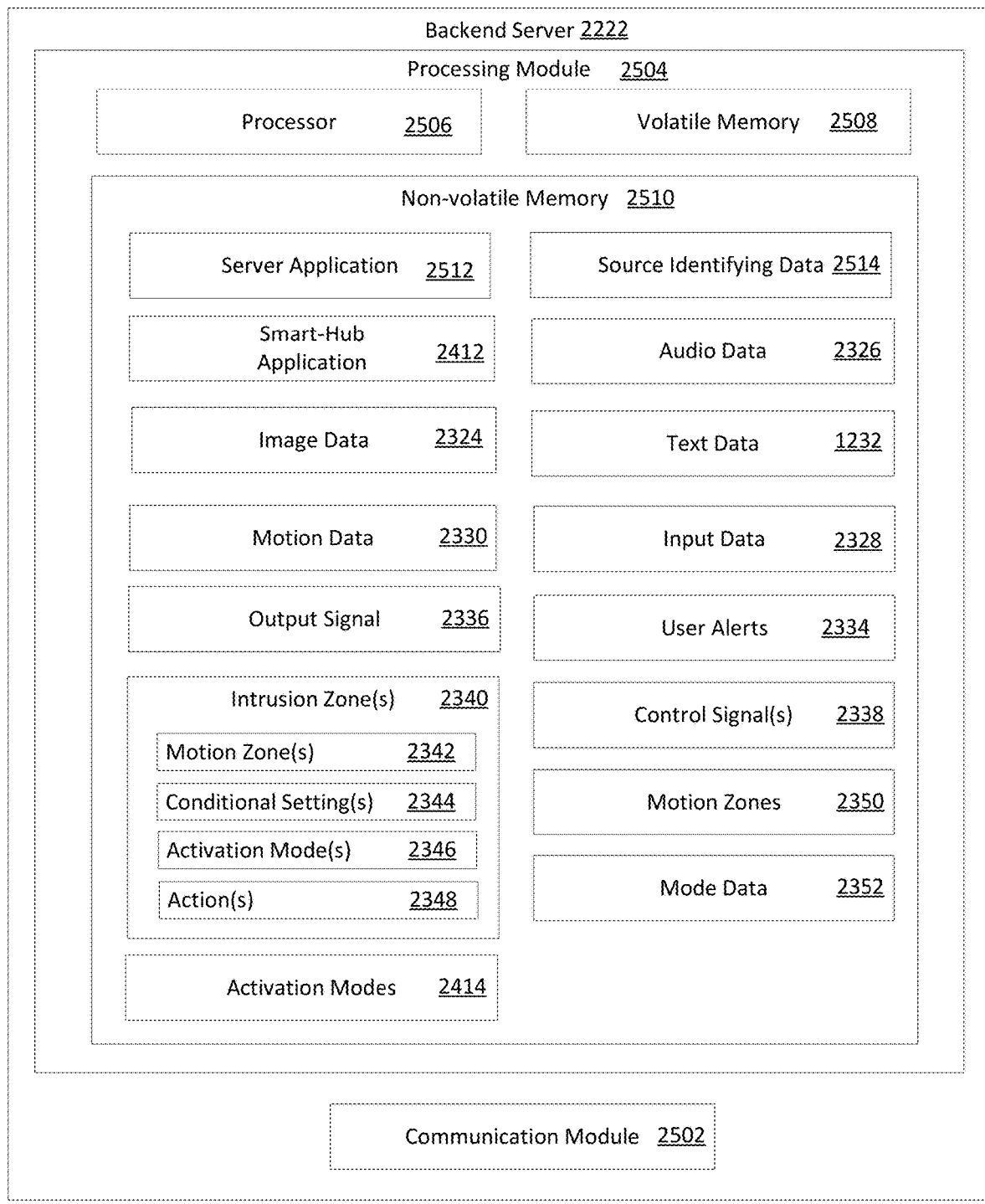
FIG. 25 is a functional block diagram illustrating one example embodiment of a backend server according to various aspects of the present disclosure.

FIG. 25 is a functional block diagram illustrating one embodiment of the backend server 2222 according to various aspects of the present disclosure. The backend server 2222 may comprise a communication module 2502 and a processing module 2504, which includes a processor 2506, volatile memory 2508, and non-volatile memory 2510. The communication module 2502 may allow the backend server 2222 to access and communicate with devices connected to the network (Internet/PSTN) 2206 (e.g., the A/V recording and communication device 2202, the hub device 2212, the client devices 2208, 2210, and/or a device controlled by the security monitoring service 2226). The non-volatile memory 2510 may include a server application 2512 that configures the processor 2506 to receive and/or retrieve, using the communication module 2502, the audio data 2326, the text data 2332, the input data 2328, the user alerts 2334, the image data 2324, and/or the motion data 2330 from the A/V recording and communication device 2202 (e.g., in the output signal 2336) and/or the hub device 2212. The server application 2512 may also configure the processor 2506 to transmit (and/or forward) the audio data 2326, the text data 2332, the input data 2328, the user alerts 2334, the image data 2324, and/or the motion data 2330 to the client devices 2208, 2210 and/or the hub device 2212 using the communication module 2502.

Additionally, the server application 2512 may configure the processor 2506 to receive, using the communication module 2502, the control signal(s) 2338, the mode data 2352, and/or the data representing the intrusion zone(s) 2340 (which may be included in the control signal(s) 2338) from the A/V recording and communication device 2202, client device 2208, 2210, and/or the hub device 2212. The server application 2512 may also configure the processor 2506 to transmit, using the communication module 2502, the control signal(s) 2338, the mode data 2352, and/or the data representing the intrusion zone(s) 2340 (which may be included in the control signal(s) 2338) to the A/V recording and communication device 2202, client device 2208, 2210, and/or the hub device 2212.

In further reference to FIG. 25, the non-volatile memory 2510 may also include source identifying data 2514 that may be used to identify the A/V recording and communication device 2202, the hub device 2212, the client devices 2208, 2210, and/or the security system 2228. In addition, the source identifying data 2514 may be used by the processor 2506 of the backend server 2222 to determine that the client devices 2208, 2210 is associated with the A/V recording and communication device 2202 and the hub device 2212 (and, in some examples, the security system 2228).

In some embodiments, the server application 2512 may further configure the processor 2506 to generate and transmit a report signal (not shown) to a third-party client device (not shown) using the communication module 2502, which may be associated with a law enforcement agency or the security monitoring service, for example. The report signal, which may be the user alert 2334, in some examples, may include the image data 2324, the audio data 2326, and/or the text data 2332. In such embodiments, an operator of the third-party client device may be able to view the image data 2324 and/or the text data 2332 to help in monitoring the security system 2228.

As described herein, at least some of the processes of the A/V recording and communication device 2202, the hub device 2212, and/or the client device 2208, 2210 may be executed by the backend server 2222. For example, the server application 2512 may configure the processor 2506 to monitor the intrusion zone(s) 2340 associated with the A/V recording and communication device 2202 using at least the motion data 2330 and/or the image data 2324. Based on determining that motion is detected in an intrusion zone 2340, one or more of the conditional setting(s) 2344 is satisfied, and/or the security system 2228 is operating in one of the activation mode(s) 2346, the server application 2512 configure the processor 2506 to perform one or more of the actions(s) 2348. For example, the processor 2506 of the backend server 2222 may activate the alarm 2230 of the security system 2228, cause a warning sound to be output, transmit a user alert 2334 to the client device 2208, 2210 and/or the security monitoring server 2226, and/or cause a state of at least one automation device 2216 to change.

In some examples, the processor 2506 of the backend server 2222 may perform one or more of the action(s) 2230 by transmitting, using the communication module 2502, control signal(s) 2338 to the hub device 2212. In response to receiving the control signal(s) 2338, the processor 2408 of the hub device 2212 may perform the one or more of the action(s) 2348. For example, to activate the alarm 2230 of the security system 2228, the processor 2506 of the backend server 222 may generate a control signal 2338 that is configured to cause the alarm 2230 to be activated. The processor 2506 of the backend server 2222 may then transmit, using the communication module 2502, the control signal 2338 to the hub device 2212. In response to receiving the control signal 2338, the processor 2408 of the hub device 2212 may activate the alarm 2230.

Figure 26:
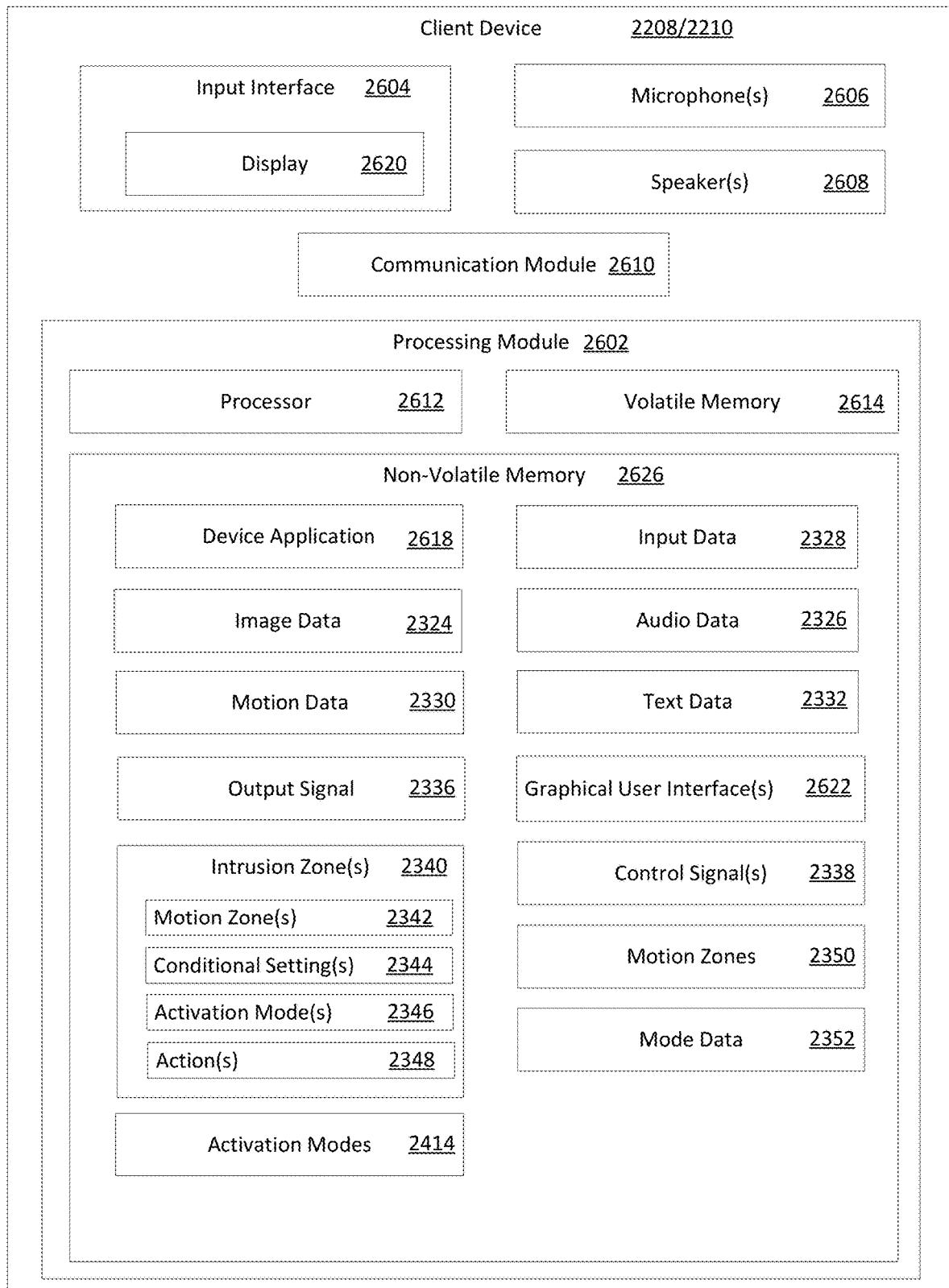
FIG. 26 is a functional block diagram illustrating one example embodiment of a client device according to various aspects of the present disclosure.

FIG. 26 is a functional block diagram illustrating one embodiment of a client device 2208, 2210 according to various aspects of the present disclosure. The client device 2208, 2210 may comprise a processing module 2602 that is operatively connected to an input interface 2604, microphone(s) 2606, speaker(s) 2608, and a communication module 2610. The client device 2208, 2210 may further comprise a camera (not shown) operatively connected to the processing module 2602. The processing module 2602 may comprise a processor 2612, volatile memory 2614, and non-volatile memory 2616, which includes a device application 2618. In various embodiments, the device application 2618 may configure the processor 2612 to receive input(s) to the input interface 2604, for example.

In addition, the device application 2618 may configure the processor 2612 to receive, using the communication module 2610, the input data 2328, the image data 2324, the audio data 2326, the output signal 2336, and/or the user alerts 2334 from one or more of the A/V recording and communication device 2202, the hub device 2212, or the backend server 2222. Furthermore, the device application 2618 may configure the processor 2612 to transmit, using the communication module 2610, the input data 2328, the image data 2324, the audio data 2326, the output signal 2336, the user alerts 2334 and/or control signals 2338 to one or more of the hub device 2212 or the backend server 2222.

With further reference to FIG. 26, the input interface 2604 may include a display 2620. The display 2620 may include a touchscreen, such that the user of the client device 2208, 2210 may provide inputs directly to the display 2620. In some embodiments, the client device 2208, 2210 may not include a touchscreen. In such embodiments, the user may provide an input using any input device, such as, without limitation, a mouse, a trackball, a touchpad, a joystick, a pointing stick, a stylus, etc.

In some examples, based at least in part on receiving a user alert 2334, the device application 2618 may configure the processor 2612 to cause the display 2620 to display the user alert 2334. While displaying the user alert 2334, the user interface 2604 may receive input from the user to answer the user alert 2334. In response, the device application 2618 may configure the processor 2612 to display the received image data 2324 using the display 2620. Additionally, the device application 2618 may configure the processor 2612 to output audio represented by the audio data 2326 using the speaker 2608.

In some examples, the device application 2618 may further configure the processor 2612 to display graphical user interface(s) (GUI(s)) 2622 using the display 2620. The GUI(s) 2622 may allow the user to create intrusions zones for A/V recording and communication devices, such as the intrusion zone(s) 2340 for the A/V recording and communication device 2202. For example, to create an intrusion zone 2340, the GUI(s) 2622 may allow the user to select one or more motion zones 2342 to associate with the intrusion zone 2340, which is illustrated in the examples of FIGS. 27-33. In addition, in some embodiments, to create an intrusion zone 2340, the user may create a custom intrusion zone that may not include or be defined by an existing motion zone 2342 (e.g., the user may create a polygon shape, a square, a rectangle, a triangle, a circle, or another shape that within the GUI(s) 2622 that define the intrusion zone 2340. In some embodiments, the motion zones 2342 may be customized by the user, and the intrusion zones 2340 may include one or more of the motion zones 2342. As such, in some embodiments, a portion of the field of view of the camera 2304 and/or the field of view of the motion sensor 2308 may include a motion zone 2342 and not include an intrusion zone 2340, and/or a portion of the field of view of the camera 2304 and/or the field of view of the motion sensor 2308 may not include a motion zone 2342 and may include an intrusion zone 2340. Additionally, GUI(s) 2622 may allow the user to select one or more conditional settings 2344 to associate with the intrusion zone 2340. Furthermore, the GUI(s) 2622 may allow the user to select one or more activation modes 2346 to associate with the intrusion zone 2340. Moreover, the GUI(s) 2622 may allow the user to select one or more actions 2348 to associate with the intrusion zone 2340.

After receiving the selections, the processor 2612 of the client device 2208, 2210 may receive, using the input interface 2604, input associated with saving the intrusion zone 2340. In response, the processor 2612 of the client device 2208, 2210 may generate a control signal 2338 that is configured to cause the A/V recording and communication device 2202, the hub device 2212, and/or the backend server 2222 to save the intrusion zone 2340 and/or monitor the intrusion zone 2340. The processor 2612 of the client device 2208, 2210 may then transmit, using the communication module 2610, the control signal 2338, along with data representing the intrusion zone 2340 (which may be part of the control signal 2338) to the A/V recording and communication device 2202, the hub device 2212, and/or the backend server 2222.

Figure 27:
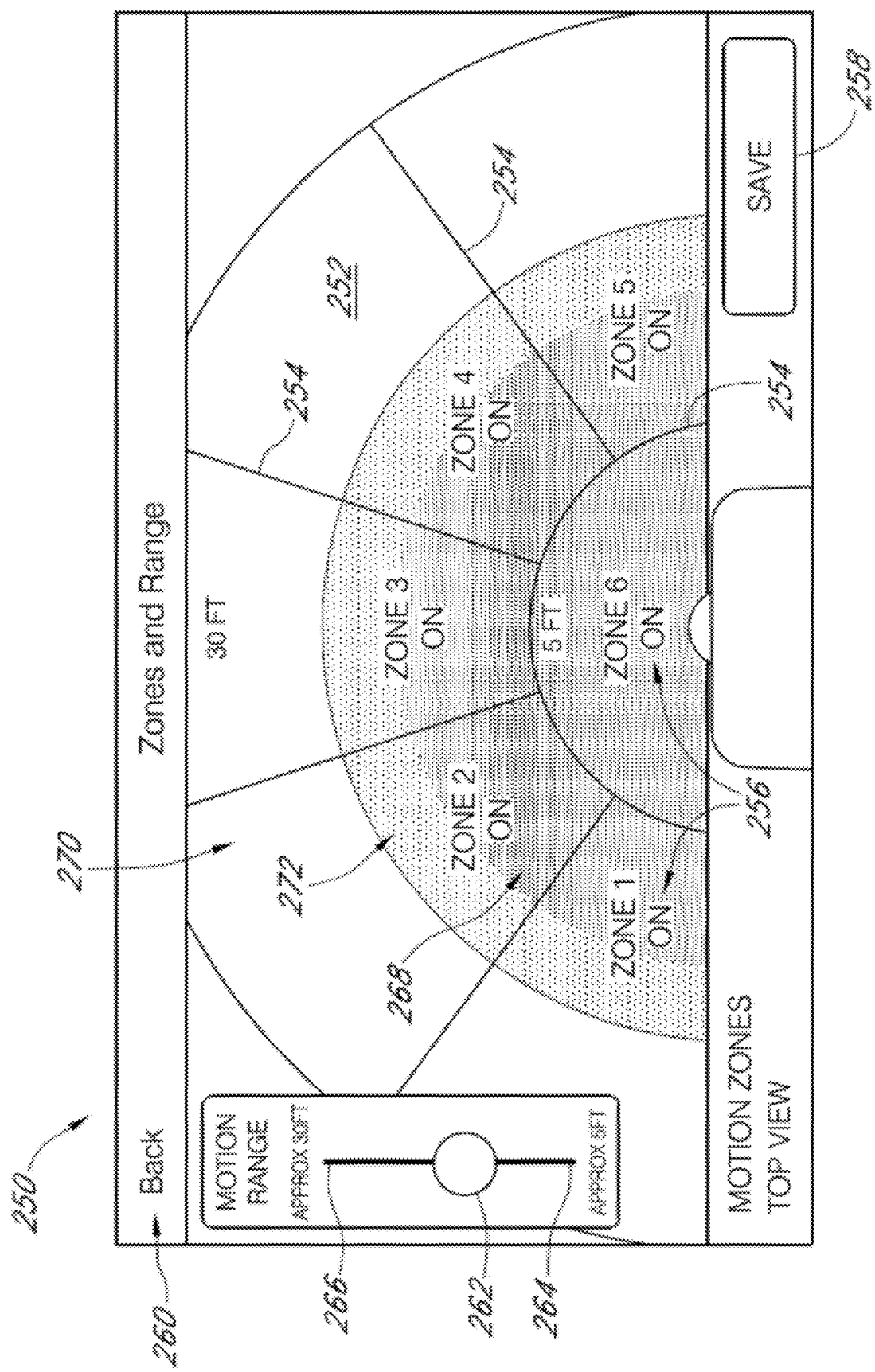
FIGS. 27-33 are screenshots of a graphical user interface for use in a technique for creating and/or customizing intrusion zones for an A/V recording and communication device according to various aspects of the present disclosure.

FIGS. 27-33 are screenshots of one example of a graphical user interface (GUI) 250 (which may include one of the GUI(s) 2622) for modifying settings of the A/V recording and communication device 2202 according to an aspect of the present disclosure. In one example, the user may modify settings by selecting a menu choice from within a software application (e.g., the device application 2618) installed on the user's computer or mobile device. With reference to FIG. 27, upon selecting the menu choice for modifying settings of the A/V recording and communication device 2202, the software application may display, on a display (e.g., the display 2620) of the user's computer or mobile device, a diagram 252 of the field of view about the A/V recording and communication device 2202. The diagram 252 may indicate the motion zones within the field of view, with each zone delineated by boundary lines 254 and enumerated with a unique zone identifier, such as a number (Zones 1-6). In the embodiment illustrated in FIG. 27, the zone diagram 252 is a top view, but in alternative embodiments the zone diagram 252 may be presented from a different perspective, such as a front view or a side view.

With further reference to FIG. 27, the zone diagram 252 further includes an ON/OFF indicator 256 for each zone. In the configuration of FIG. 27, Zones 1-6 are all ON. The user may toggle selected ones of the zones ON and OFF by individually selecting each zone. For example, if the display of the user's computer or mobile device is a touchscreen, the user may toggle a selected zone by touching that area of the touchscreen. In another example, the user may select zones to toggle ON/OFF by clicking on those zones in the GUI 250 using a pointing device such as a mouse or a trackball. If conditional settings, which are described below, are not used, then zones that are ON will trigger motion alerts when movement is detected in those zones, while no motion alerts will be triggered for any zones that are OFF. However, if conditional settings are used, zones that are ON will trigger motion alerts when movement is detected in those zones and at least one conditional setting is satisfied, as further discussed below.

Figure 28:
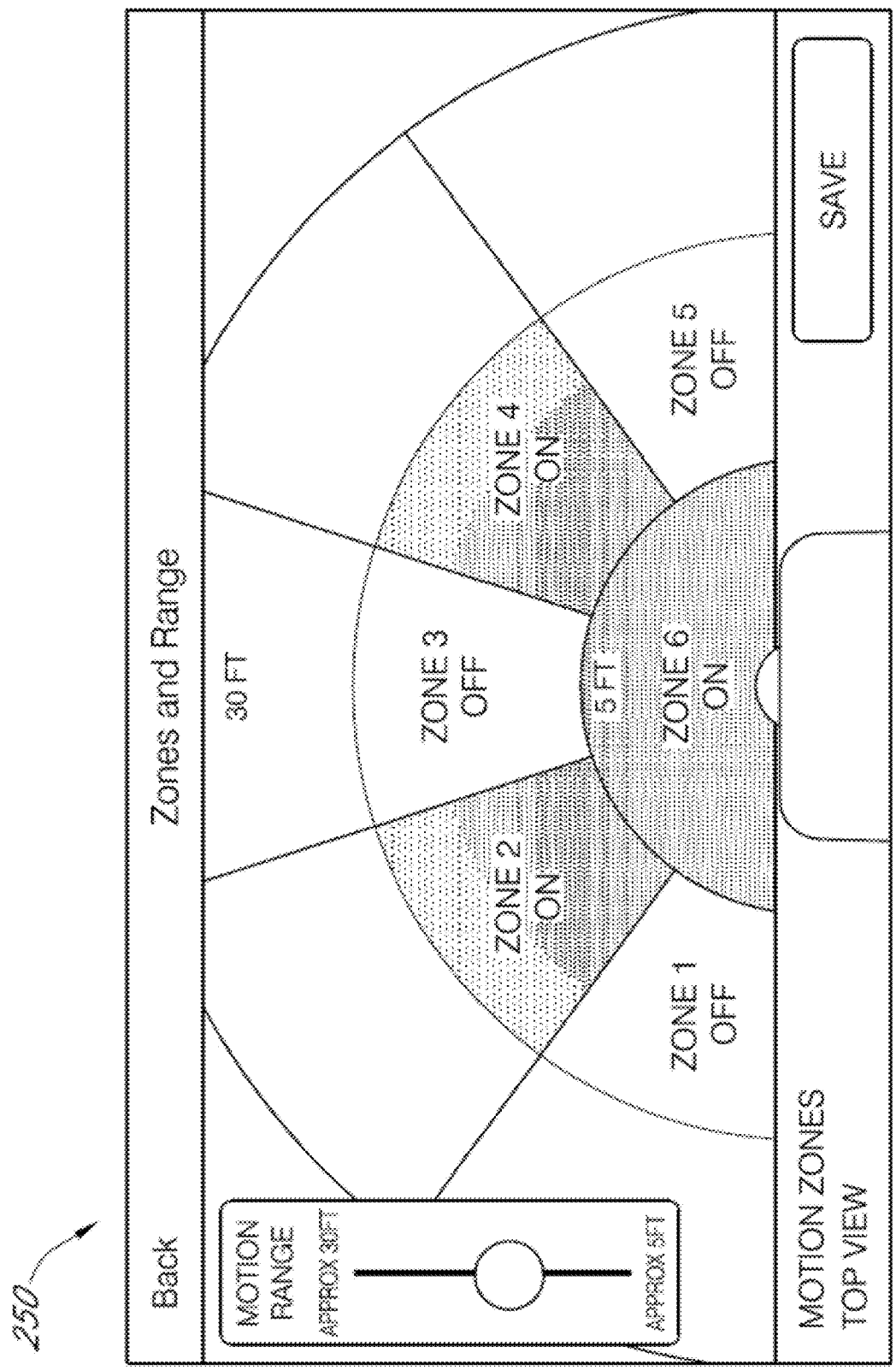
Figure 29:
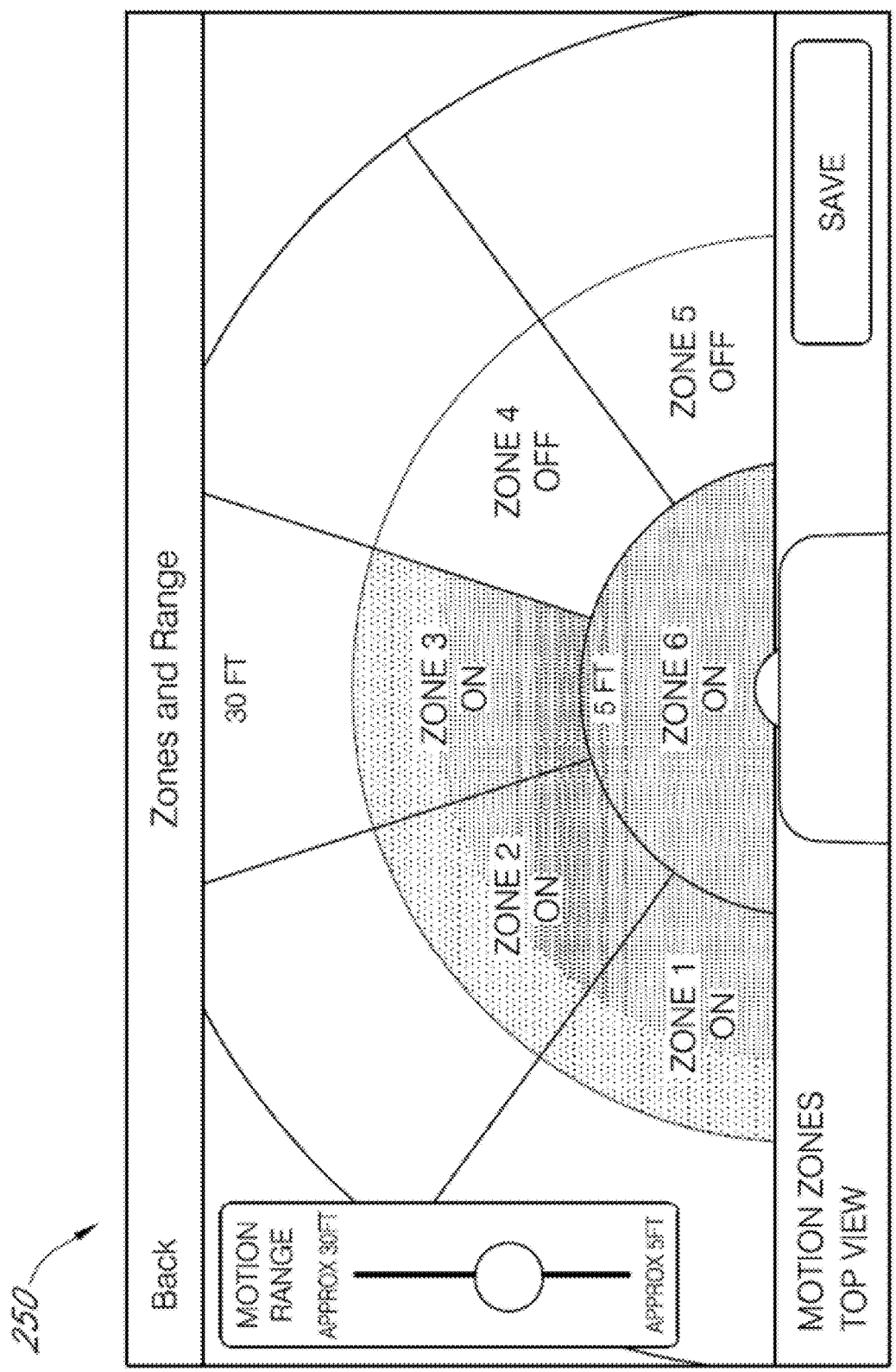
Figure 30:
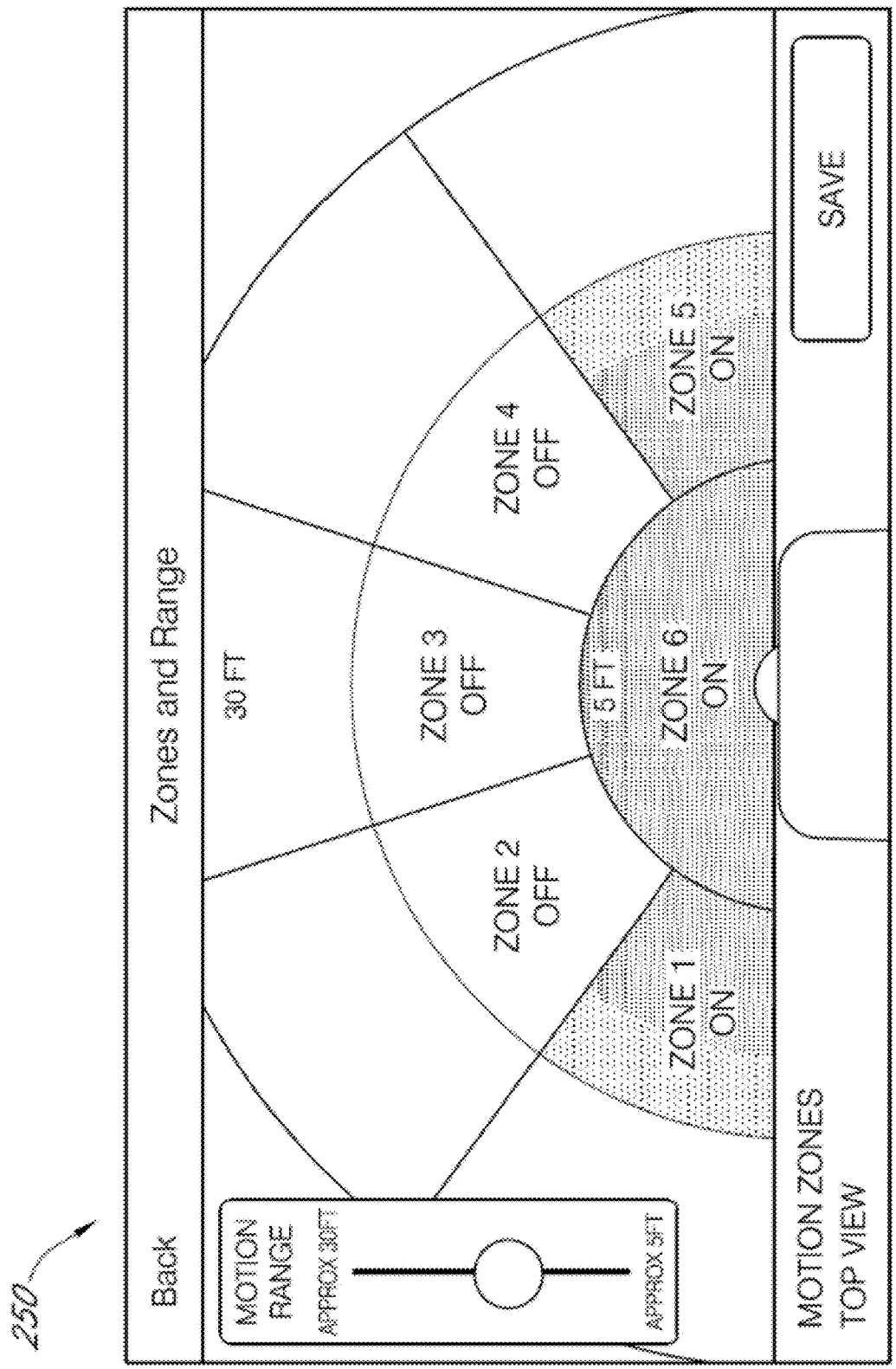
Figure 31:
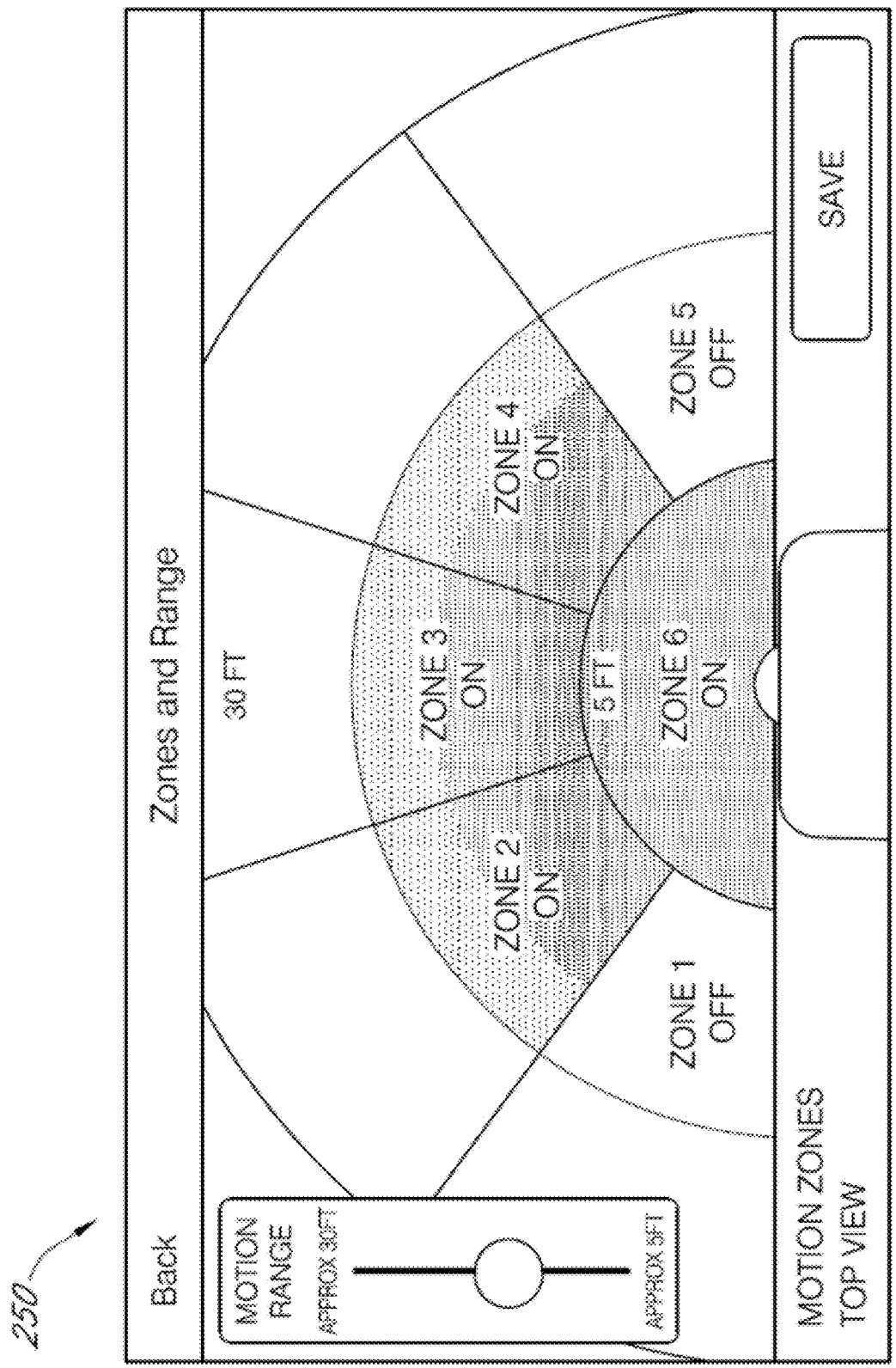

In certain of the present embodiments, the user may toggle individual zones ON and OFF independently of the other zones, such that any combination of zones may be ON at any given time. For example, FIGS. 28-31 illustrate some possible combinations. With reference to FIG. 28, Zones 1, 3, and 5 are OFF, while Zones 2, 4, and 6 are ON. With reference to FIG. 29, Zones 4 and 5 are OFF, while Zones 1-3 and 6 are ON. With reference to FIG. 30, Zones 2-4 are OFF, while Zones 1, 5, and 6 are ON. With reference to FIG. 31, Zones 1 and 5 are OFF, while Zones 2-4 and 6 are ON. With reference to FIG. 27, the GUI 250 further includes a SAVE button 258. When the user has set a desired zone configuration by toggling selected ones of the zones ON and OFF, he or she selects the SAVE button 258 to update the zone configuration setting for the A/V recording and communication device 2202. The user may then close the zone diagram 252 by selecting the BACK button 260, which may return the user to a previous screen (not shown) within the software application.

With further reference to FIG. 27, the GUI 250 may further include a range adjustment component 262 that enables the user to remotely modify the range of motion sensors (e.g., the passive infrared sensors 144, 1834). In the illustrated embodiment, the range adjustment component 262 comprises a slider widget. A first end 264, or lower end, of the range of the slider widget 262 corresponds to a minimum range of the motion sensors (e.g., the passive infrared sensors 144, 1834), and a second end 266, or upper end, of the range of the slider widget 262 corresponds to a maximum range of the motion sensors (e.g., the passive infrared sensors 144, 1834). The first and second ends 264, 266 of the slider widget 262 may include text indicating the distance corresponding to the minimum and maximum ranges of the motion sensors (e.g., the passive infrared sensors 144, 1834). In the illustrated embodiment, the minimum range is indicated as approximately five feet, while the maximum range is indicated as approximately thirty feet. These ranges are merely examples, and are not limiting. In fact, in certain embodiments the textual indicators of the minimum and maximum ranges may not be provided at all.

With further reference to FIG. 27, the current setting of the range of the motion sensors (e.g., the passive infrared sensors 144, 1834) is indicated on the zone diagram 252 by contrasting colors or shades of the same color, with a darker area 268 indicating the area where the motion sensors (e.g., the passive infrared sensors 144, 1834) will trigger motion alerts (the ON area 268), and a lighter area 270 indicating the area where the motion sensors (e.g., the passive infrared sensors 144, 1834) will not trigger motion alerts (the OFF area 270). A transition area 272 between the ON area 268 and the OFF area 270 is indicated by a color/shade between the darker area 268 and the lighter area 270, with the color of the transition area 272 fading gradually toward the OFF area 270. In certain embodiments, the transition area 272 is part of the ON area 268, such that the motion sensors (e.g., the passive infrared sensors 144, 1834) will trigger motion alerts in the transition area 272, but in other embodiments the transition area 272 may be part of the OFF area 270, such that the motion sensors (e.g., the passive infrared sensors 144, 1834) will not trigger motion alerts in the transition area 272.

In the configuration of FIG. 27, the range of the motion sensors (e.g., the passive infrared sensors 144, 1834) is set roughly halfway between the minimum and maximum settings. By contrast, in the configuration of FIG. 32, the range of the motion sensors (e.g., the passive infrared sensors 144, 1834) is set to the minimum (slider widget 262 at first end 264), and in the configuration of FIG. 33, the range of the motion sensors (e.g., the passive infrared sensors 144, 1834) is set to the maximum (slider widget 262 at second end 266). When the user has set a desired range for the motion sensors (e.g., the passive infrared sensors 144, 1834), he or she selects the SAVE button 258 to update the range setting for the A/V recording and communication device 2202. The user may then close the zone diagram 252 by selecting the BACK button 260, which may return the user to a previous screen (not shown) within the software application. In the illustrated embodiment, the ranges of the motion sensors (e.g., the passive infrared sensors 144, 1834) may not be adjusted individually. That is, any movement of the slider widget 262 simultaneously adjusts the range of all of the motion sensors (e.g., the passive infrared sensors 144, 1834). However, alternative embodiments may enable the ranges of the motion sensors (e.g., the passive infrared sensors 144, 1834) to be adjusted individually.

In certain of the present embodiments, if the user closes the zone diagram 252 (whether by selecting the BACK button 260, or exiting the application, or by any other action) without selecting the SAVE button 258, then any changes that the user may have made to the settings for the motion sensors (e.g., the passive infrared sensors 144, 1834), such as toggling one or more of the motion sensors (e.g., the passive infrared sensors 144, 1834) ON or OFF, or adjusting a range of one or more of the motion sensors (e.g., the passive infrared sensors 144, 1834), will not be saved and will not be sent to the A/V recording and communication device 2202.

Figure 34:
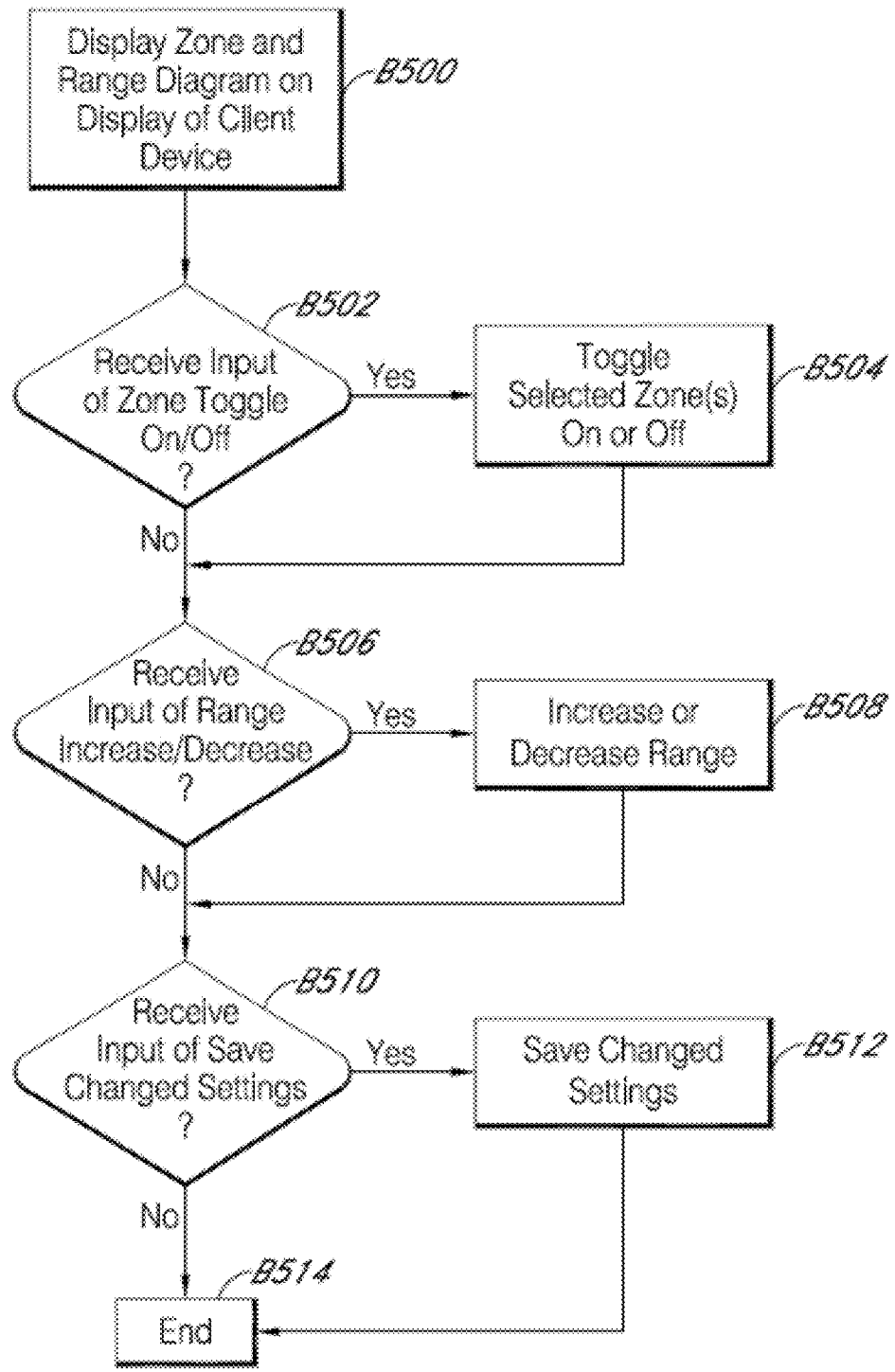
FIG. 34 is a flowchart illustrating a process for creating and/or customizing intrusion zones for an A/V recording and communication device according to various aspects of the present disclosure.

FIG. 34 is a flowchart showing an embodiment of a process according to the present disclosure. According to the process shown in FIG. 34, a user may remotely modify the settings of the A/V recording and communication device 2202. Referring to FIGS. 27 and 34, at block B500 a diagram 252 of the field of view about the A/V recording and communication device 2202 is displayed on a display of the user's computer or mobile device (e.g., the client device 2208, 2210). The diagram 252 facilitates modifying the zone and range settings of the A/V recording and communication device 2202. For example, the user may toggle selected ones of the zones ON and OFF and/or increase and decrease a range (or sensitivity) of the motion sensors (e.g., the passive infrared sensors 144, 1834), as described above with reference to FIGS. 27-33. The displaying of the diagram 252 on the display of the user's computer or mobile device may be performed by software executing on the user's computer or mobile device, for example.

With further reference to FIG. 34, at block B502 the process determines whether an input has been received to toggle a selected zone ON or OFF. The input may come from the user, for example according to the process described above with reference to FIGS. 27-33. If at least one input is received to toggle a selected zone ON or OFF, then the process moves to block B504, where the selected zone(s) is/are toggled ON or OFF. If, however, no input is received to toggle a selected zone ON or OFF, then the process moves to block B506.

At block B506, the process determines whether an input has been received to adjust the range of the motion sensors (e.g., the passive infrared sensors 144, 1834). The input may come from the user, for example according to the process described above with reference to FIGS. 27, 32, and 33. If an input is received to adjust the range of the motion sensors (e.g., the passive infrared sensors 144, 1834), then the process moves to block B508, where the range of the motion sensors (e.g., the passive infrared sensors 144, 1834) is increased or decreased. If, however, no input is received to adjust the range of the motion sensors (e.g., the passive infrared sensors 144, 1834), then the process moves to block B510.

At block B510, the process determines whether an input has been received to save any settings that may have been changed at either or both of block B502 and block B506. The input may come from the user, for example according to the processes described above with reference to FIGS. 27-33. If an input is received to save any changed settings, then the process moves to block B512, where the changed settings are saved, after which the process ends at block B514. If, however, no input is received to save any changed settings, then the process ends at block B514.

In certain embodiments, saving any changed settings may further comprise sending the changed settings to a server, such as (but not limited to) the server 118 (FIG. 1), the backend server 2222 (FIG. 22), or the server 900C (FIG. 49), from which the A/V recording and communication device 2202 may subsequently download the changed settings. For example, to implement the new conditional settings in the A/V recording and communication device 2202, the server 118/2222/900C may communicate with the A/V recording and communication device 2202. In the process of the communication, the server 118/2222/900C may provide the updated user settings and instruct the A/V recording and communication device 2202 to overwrite any previous conditional settings. This process may be performed in various ways. For example, and without limitation, the user may press the button 2314 on the A/V recording and communication device 2202, thereby causing the communication to occur, or the A/V recording and communication device 2202 may detect motion and then initiate the communication with the server 118/2222/900C, or a regular "check in" communication between the server 118/2222/900C and the A/V recording and communication device 2202 may be implemented. In one aspect of the present disclosure, the changed settings may be compiled into a single communication to the A/V recording and communication device 2202 containing instructions for all zones, instead of sending numerous communications, piecemeal, for each zone.

After the settings of the A/V recording and communication device 2202 are changed, as described above, the user may then receive notifications consistent with the changed settings. In one aspect of the present disclosure, the system of the present disclosure may implement the settings by running software capable of analyzing the inputs from the motion sensors (e.g., the passive infrared sensors 144, 1834), and then checking to see if the input is in accordance with the preferred settings. For example, assume the user modifies Zone 5, as shown in FIG. 27, so that no motion alerts are generated for any movement farther than ten feet away from the A/V recording and communication device 2202 in Zone 5. Also assume for purposes of this example that passive infrared sensor 144-3, which is responsible for Zone 5, has a maximum range of fifty feet, and thus can detect movement up to fifty feet away. The A/V recording and communication device 2202 may analyze movement based on the input from passive infrared sensor 144-3, and may determine the distance of the movement from the A/V recording and communication device 2202. If the A/V recording and communication device 2202 determines that the distance of the movement from the A/V recording and communication device 2202 is greater than ten feet, the A/V recording and communication device 2202 may ignore or filter out the movement and not initiate a communication with the system network (and the user will thus not receive a motion alert). The A/V recording and communication device 2202 may apply these principles to all zones and settings, and may also provide features that take into account possible false positive triggers, such as certain temperature conditions, light conditions, and/or moisture conditions, and determine whether a given input is a false detection. Whether or not false detections are ignored or filtered out may be governed by the preferred settings saved by the user.

In another aspect of the present disclosure, the user may manipulate physical controls, such as switches, sliders, or dials (not shown), located on the A/V recording and communication device 2202, in lieu of doing so with a remote software application.

As discussed above, in some embodiments, an aspect of the present disclosure comprises GUI 2622 displayed on a display 2620 of client device 2208, 2210 for enabling modification of motion zones for a A/V recording and communication device 2202. The GUI 2622 may comprise a diagram of a field of view about the A/V recording and communication device 2202, the diagram including a plurality of motion zones 2350 within the field of view, with each motion zone 2350 delineated by boundary lines and enumerated with a unique motion zone identifier, wherein the zone diagram further includes an ON/OFF indicator for each motion zone 2650. In some embodiments, each unique zone identifier may comprise a number. In some embodiments, the zone diagram may be a top view. Some embodiments may further comprise a range adjustment component that enables a range of each of the motion zones 2350 to be modified. In some embodiments, the range adjustment component may comprise a slider widget. In some embodiments, contrasting colors or shades of the same color may indicate areas where motion alerts will be triggered and areas where motion alerts will not be triggered. In some embodiments, the areas where motion alerts will be triggered may be indicated by a dark color or shade and the areas where motion alerts will not be triggered may be indicated by a light color or shade. Some embodiments may further comprise a transition area between the dark areas and the light areas, with the transition area having a gradually changing color or shade.

Although a plurality of motion sensors and motion zones 2350 are illustrated and discussed above with respect to FIGS. 27-34, in alternative embodiments a single motion sensor and/or motion zone 2350 may be used to satisfy the requirements of a specific implementation. Further, customization of motion settings could be performed without displaying a graphic of the field of view, e.g., a user could specify that any motion detected during certain hours is a red flag regardless of where the detected motion occurred. In addition, although specific embodiments for setting motion zones 2350 using A/V recording and communication devices 2202 are discussed above with respect to FIGS. 27-34, any of a variety of A/V recording and communication devices 2202 as appropriate to the requirements of a specific application may be used in accordance with embodiments of the present disclosure.

Figure 32:
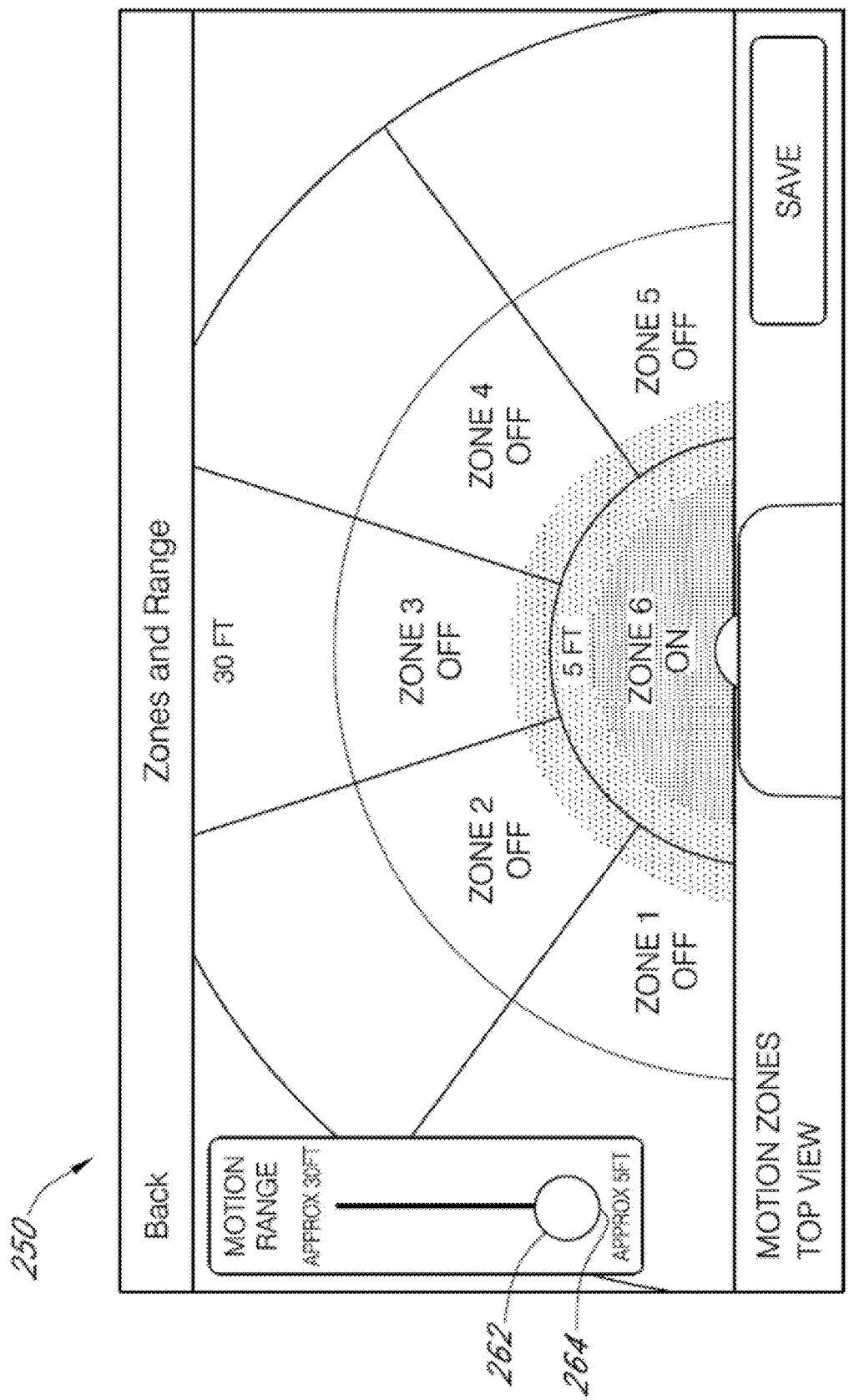
Figure 33:
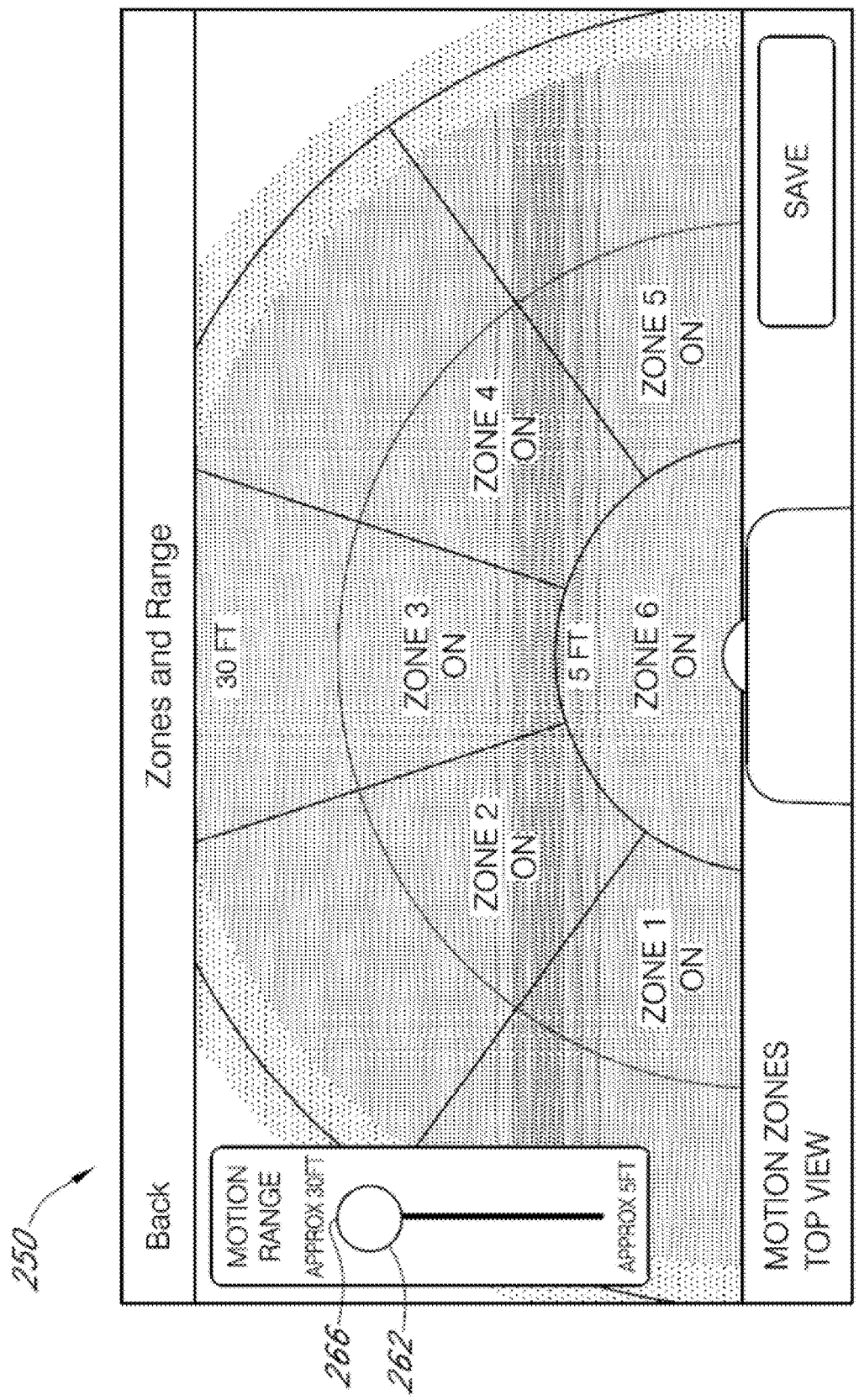
Figure 35A:
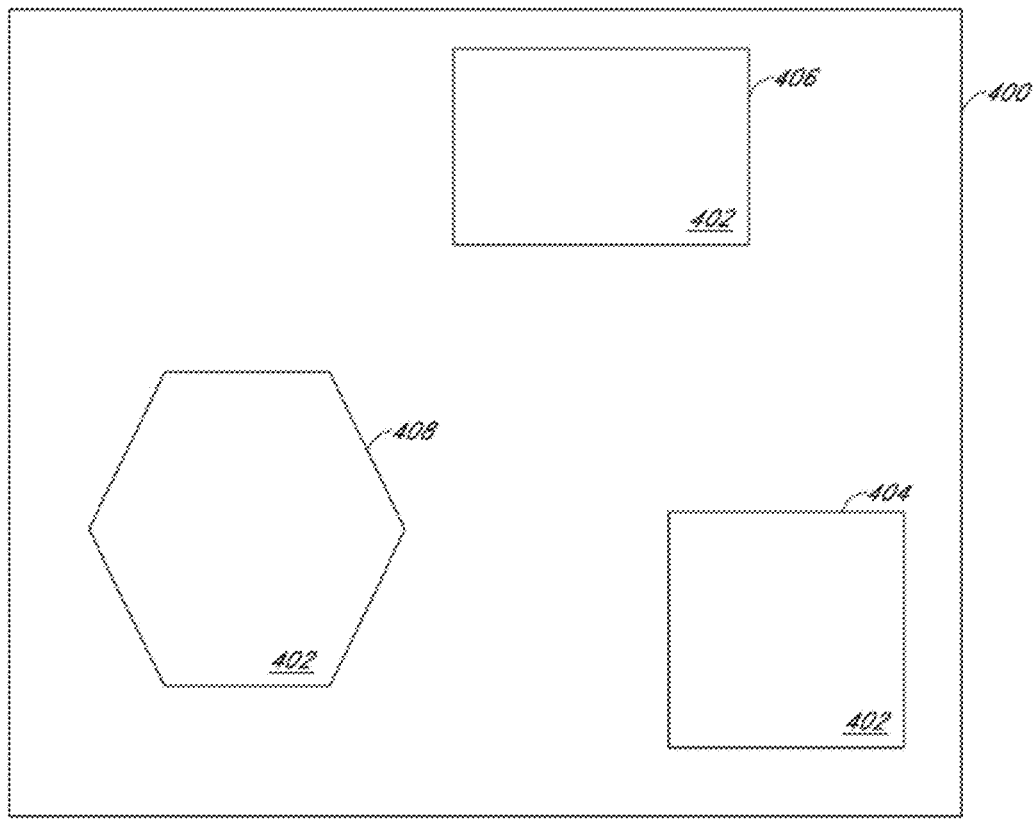
FIG. 35A is a first schematic diagram of a technique for creating and/or customizing intrusion zones for an A/V recording and communication device according to various aspects of the present disclosure.

Some of the present embodiments provide advantageous motion detection processes and techniques. For example, during an initial setup process, or at any time after the A/V recording and communication device 2202 has been set up, the user may designate one or more zones within the field of view of the camera as motion zones of interest. For example, and using FIG. 35A as a reference, when configuring the camera 134's motion detection, a configuration process may present the user with a visual representation of the field of view 400 of the camera 134. For example, an application executing on the user's client device 800, such as a smartphone, may show a live view from the camera 134 of the user's A/V recording and communication device 2202 on the display 806 of the user's client device 114/800 (FIGS. 1 and 32). The configuration process may prompt the user to designate one or more motion zones of interest 402 by selecting areas on the display 806 of the user's client device 800. For example, the user may draw one or more polygons 404, 406, 408 on the display 806 to designate the motion zone(s) of interest 402. If the display 806 of the user's client device 800 is a touchscreen, the user may designate the motion zone(s) 402 by tracing the polygon(s) 404, 406, 408 on the display 806 with his or her finger. The configuration process may enable the user to designate motion zone(s) 402 having any shape and/or number of sides. For example, the motion zone(s) 402 may be regular polygons such as the square 404, rectangle 406, and hexagon 408 shown in FIG. 35A, or any other type of regular polygon such as circles, pentagons, octagons, decagons, etc., or any type of irregular polygons. The configuration process may allow the user to designate any number of motion zones 402, such as one zone 402, two motion zones 402, three motion zones 402, etc. When all desired motion zones 402 have been created, the configuration process may prompt the user to save the motion zones 402, after which the created motion zones 402 may be sent from the user's client device 800 to a device in the network, such as a server 118/900C (FIGS. 1 and 33), and to the user's A/V recording and communication device 2202 via the user's network 110 (FIG. 1).

After one or more motion zones of interest 402 have been designated, embodiments of the present motion detection processes and techniques may incorporate those motion zones 402. For example, the camera 134, which may be powered on at all times, may continuously monitor motion within the field of view 400. The A/V recording and communication device 2202, however, may not begin recording and/or streaming video to the user's client device 114/800 unless and until a moving object enters one of the motion zones 402. The recording and/or streaming may continue until the moving object exits the motion zone 402 it earlier entered. Further, if the moving object stops moving, but remains in the motion zone 402, the recording and/or streaming may continue while the object remains stationary within the motion zone 402. This aspect of the present embodiments creates an advantage over systems that rely on other types of motion sensors, such as passive IR sensors, that typically only detect moving objects, and therefore do not typically record and/or stream stationary objects. The object may, of course, be a person.

Figure 35B:
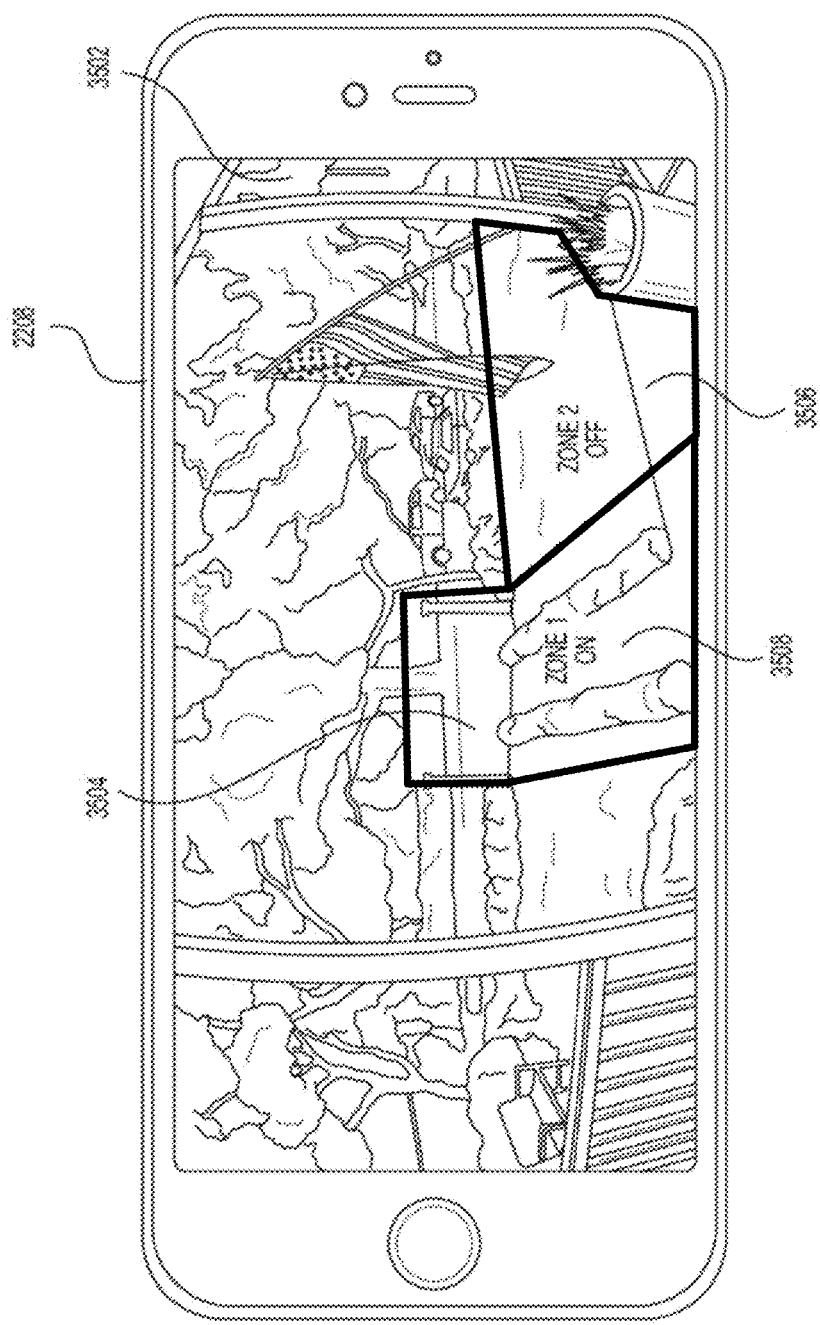
FIG. 35B is a second schematic diagram of a technique for creating and/or customizing intrusion zones for an A/V recording and communication device according to various aspects of the present disclosure.

FIG. 35B illustrates another technique for creating and/or customizing intrusion zones for the A/V recording and communication device 2202. For example, the client device 2208 may be displaying a field of view 3502 of the camera 2204 of the A/V recording and communication device 2202. While displaying the field of view 3502, a user may designate at least a first motion zone of interest 3504 and a second motion zone of interest 3506, such as by selecting areas on the display of the client device 2208 (described herein). In some examples, the user may have previously designated the first motion zone of interest 3504 and/or the second motion zone of interest 3506, and the client device 1108 may have saved data representing the first motion zone of interest 3504 and/or the second motion zone of interest 3506. In some examples, the user may have previously created intrusion zone(s) 2340 for the first motion zone of interest 3504 and/or the second motion zone of interest 3506, where the client device 1108 saved the intrusion zone(s) 2340. In such examples, the user may later associate the intrusion zone(s) 2340 with the security system 2228. Still, in some examples, the user designates the first motion zone of interest 3506 and/or the second motion zone of interest 3506 when creating intrusion zone(s) 2340.

After creating the first motion zone of interest 3504 and/or the second motion zone of interest 3506, the user may then turn at least the first motion zone of interest 3504 ON, as represented by 3508. Additionally, the user may select activation mode(s) 2346 to associate with the first motion zone of interest 3604, conditional setting(s) 2344 to associated with the first motion zone of interest 3504 (such as if conditional setting(s) 2344 were not already selected), and/or action(s) 2348 to associate with the first motion zone of interest 3604. The client device 1108 may then create an intrusion zone 2340 associated with the first motion zone of interest 3504 (e.g., which may then represent a motion zone 2342 for the intrusion zone 2340).

In some examples, although not illustrated in the example of FIG. 35B, the user may also turn the second motion zone of interest 3506 ON, but without associating the second motion zone of interest 3506 with conditional setting(s) 2344, activation mode(s) 2346, and/or action(s) 2348. In such an example, the second motion zone of interest 3506 may be configured such that the A/V recording and communication device 2202, the hub device 2212, and/or the backend server 1122 generates a user alert 2334 whenever motion is detected in the second motion zone of interest 3506 (e.g., without requiring conditional setting(s) 2344 and/or activation mode(s) 2346 to be satisfied).

Figure 36:
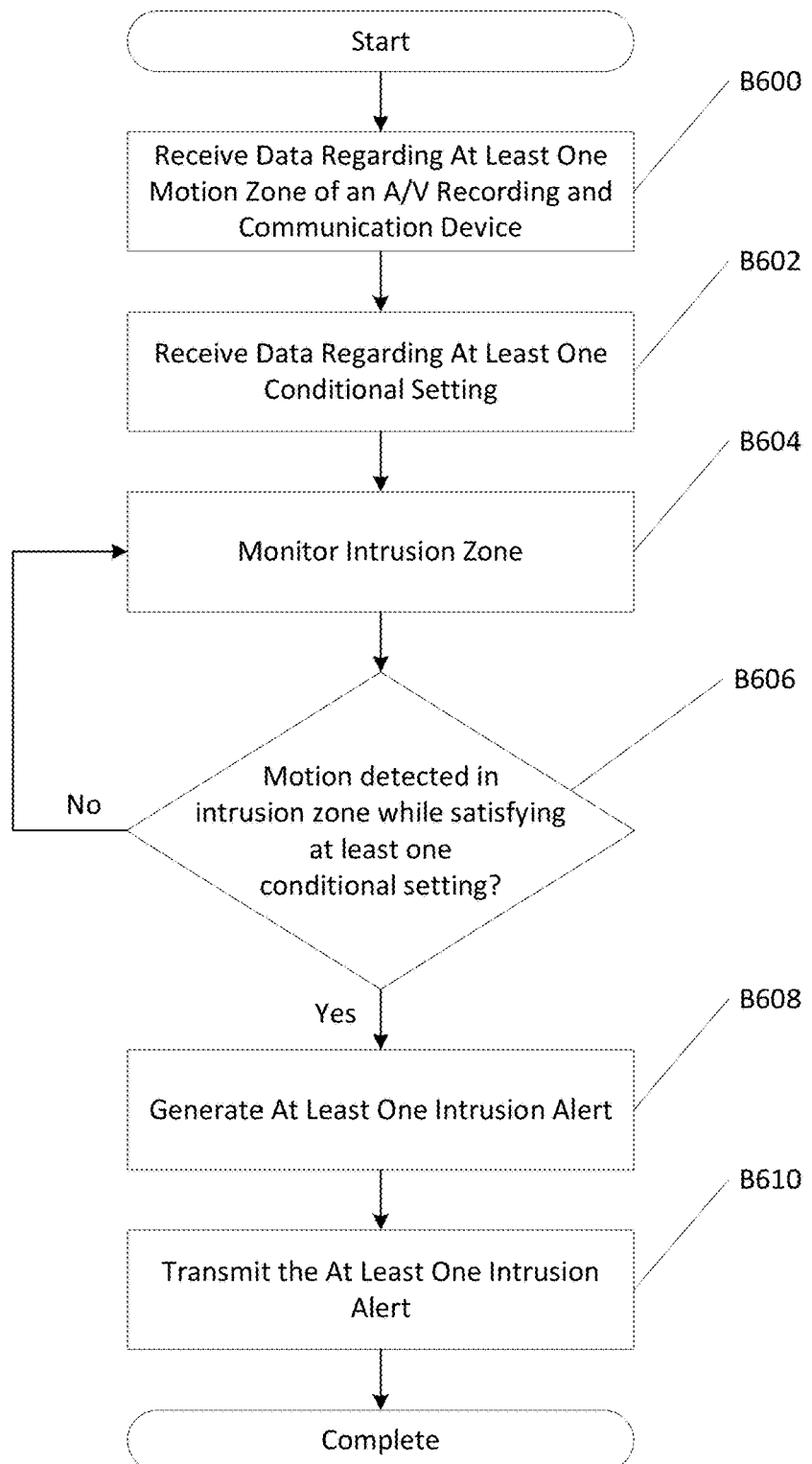
FIG. 36 is a flowchart illustrating a process for monitoring an intrusion zone using at least one conditional setting of an A/V recording and communication device according to various aspects of the present disclosure.

In some embodiments, the A/V recording and communication device 2202 may not begin recording and/or streaming video to the user's client device 114/800 until a moving object enters one of the motion zones 402 and a conditional setting is satisfied, as further discussed below. For example, FIG. 36 is a flowchart illustrating a process for monitoring an intrusion zone using at least one conditional setting of the A/V recording and communication device 130 according to various aspects of the present disclosure. The process may include receiving (block B600) data regarding the at least one motion zone. In some embodiments, the at least one motion zone may include one or more preset zones in the field of view of the A/V recording and communication device 2202, such as described above with respect to FIGS. 27-34. In other embodiments, the at least one motion zone may include one or more motion zones of interest, such as described above with respect to FIG. 35A. For example, the at least one motion zone may comprise one or more shapes, such as (but not limited to) the shapes 404, 406, 408 illustrated in FIG. 35A. The data regarding the at least one motion zone (may be referred to as motion zone data) may include (but is not limited to) one or more user preferences regarding the area(s) within the A/V recording and communication device 2202's field of view that the user desires for intrusion monitoring. As discussed above, the motion zone data may be received by displaying on a display of a computing device a user interface for creating and/or customizing at least one intrusion zone, where the at least one intrusion zone includes at least one motion zone within the field of view of the A/V recording and communication device coupled with at least one conditional setting of the at least one motion zone, as further described below.

In further reference to FIG. 36, the process may also include receiving (block B602) data regarding at least one conditional setting (may also be referred to as conditional setting data), as further described below. In various embodiments, conditional settings may be used to customize the user's preferences for monitoring the at least one motion zone. In various embodiments, a motion zone may be referred to as an intrusion zone when such motion zone is coupled with one or more conditional settings. For example, a conditional setting may include a time of day, e.g. if the detected motion occurs during a designated interval, such as between sunset and sunrise, or between midnight and 6:00 AM, then it may be indicative of a threat. In this case, if the conditional setting is satisfied (i.e. if the detected motion occurs during the designated interval), then one or more actions may be initiated, as described below. Other examples of conditional settings may include (but are not limited to) a level of ambient light (e.g. if the detected motion occurs during a period of low light, such as between sunset and sunrise, then it may be indicative of a threat), a location where the motion was detected (e.g. if the detected motion was inside the home (or in the front yard, or the back yard, or along the side of the home, etc.), then it may be indicative of a threat), a direction of movement of the person/object that caused the detected motion (e.g. if the person that caused the motion detection is moving toward the A/V recording and communication device, then it may be indicative of a threat), a speed of movement of the person/object that caused the detected motion (e.g. if the person that caused the motion detection is moving rapidly, then it may be indicative of a threat), a length of time that a person/object is within a motion zone (e.g. if the person that caused the motion detection remains in the motion zone for longer than a preset length of time, then it may be indicative of a threat), a level of reflecting light intensity (e.g. a metallic object carried by an intruder, such as a firearm, a knife, etc., might reflect light at an intensity higher than the surroundings and, therefore, if reflected light is above a threshold intensity then it may be indicative of a threat), and/or a body posture of a person within the motion zone (e.g. if the person that caused the motion detection is crouching, or laying prone, or assuming another posture that may indicate an intent to evade detection, then it may be indicative of a threat).

The process may also include monitoring (block B604) the at least one intrusion zone of the A/V recording and communication device 2202 to detect motion using processes and hardware as described above. During monitoring, the process may include determining (block B606) whether motion is detected in the at least one intrusion zone while satisfying at least one conditional setting. If motion is detected, but at least one conditional setting is not satisfied, then the process may continue to monitor (block B604) the at least one intrusion zone of the A/V recording and communication device 2202. However, in some embodiments, upon a determination that motion is detected and at least one conditional setting is satisfied, the process may include determining an intrusion zone action and executing the intrusion zone action, as further described below. For example, if motion is detected and at least one conditional setting is satisfied, then the process may include generating (block B608) at least one intrusion alert and transmitting (block B610) the at least one intrusion alert to a client device 114/800, a server 118/900C, and/or a social media network (not shown), as further described below.

Figure 42:
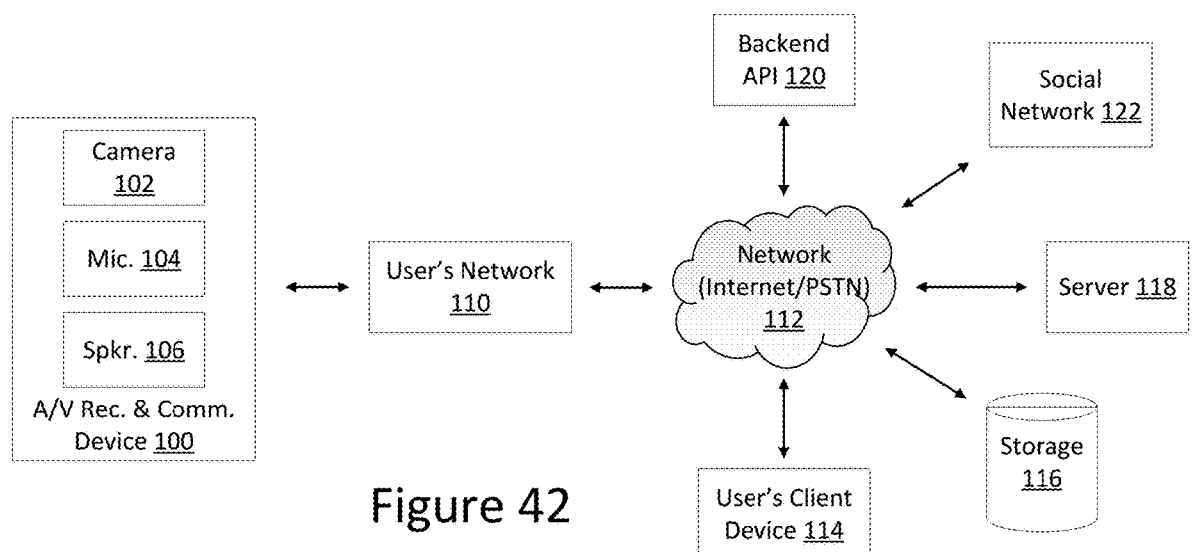
FIG. 42 is a functional block diagram illustrating a system for monitoring an intrusion zone using at least one conditional setting of an A/V recording and communication device according to various aspects of the present disclosure.
Figure 37:
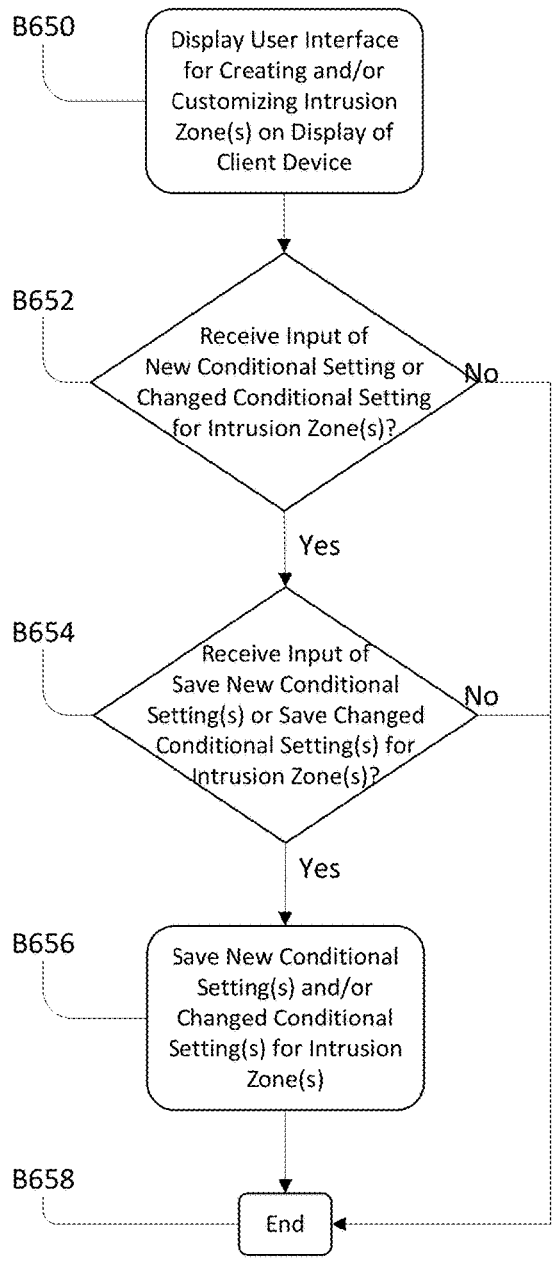
FIG. 37 is a flowchart illustrating a process for setting one or more new conditional settings and/or changing one or more existing conditional settings for intrusion zone(s) of an A/V recording and communication device according to various aspects of the present disclosure.

FIG. 37 is a flowchart illustrating a process for setting one or more new conditional settings and/or changing one or more existing conditional settings for intrusion zone(s) of an A/V recording and communication device 130 according to various aspects of the present disclosure. The process may include displaying (block B650) a user interface for creating and/or customizing at least one intrusion zone on the display 806 of the client device 800 (FIG. 42). In various embodiments, the user interface may be configured to present options for the user to indicate preferences for conditional settings, such as (but not limited to) a time of day, a level of ambient light, a direction of movement (of the person/object that caused the detected motion), a speed of movement (of the person/object), a length of time that a person/object is within a motion zone, a level of reflecting light intensity, and/or a body posture of a person within the motion zone. As discussed above, the user interface may include at least one area within the field of view of the A/V recording and communication device for monitoring, such as (but not limited to) the zones discussed above with respect to FIGS. 27-35. For example, the user interface may include a diagram that includes at least one motion zone within the field of view of the A/V recording and communication device. If the diagram indicates a plurality of motion zones, each of the plurality of motion zones may be delineated by boundary lines, and each of the motion zones may be enumerated with a unique zone number. In some embodiments, the process may include receiving motion zone data, such as (but not limited to) a selection of the at least one motion zone, where the selection indicates the user's preference for one or more areas within the field of view of the A/V recording and communication device for intrusion detection.

In further reference to FIG. 37, the process may further include receiving (block B652) conditional setting data, such as (but not limited to) input of new conditional settings and/or changed conditional settings for at least one intrusion zone. If such inputs are not received, then the process may end (block B658). However, if such inputs are received, then the process may include receiving (block B654) input to save the new conditional settings and/or to save the changed conditional settings for the intrusion zone(s). If inputs to save settings are not received, then the process may end (block B658). However, if inputs to save settings are received, then the process may include saving (block B656) the new conditional settings and/or changed conditional settings for the at least one intrusion zone. In some embodiments, the saving of the new conditional settings and/or changed conditional settings may include transmitting a setting save signal to the server 118/900C.

Figure 38:
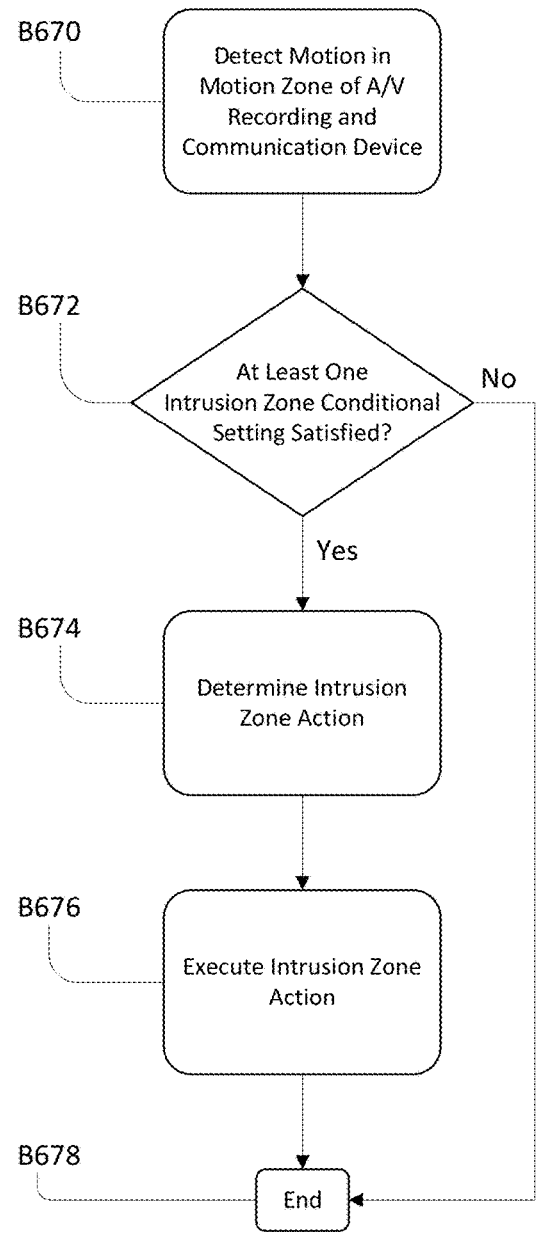
FIG. 38 is a flowchart illustrating a process for taking an action based upon a conditional setting for an intrusion zone of an A/V recording and communication device according to various aspects of the present disclosure.

FIG. 38 is a flowchart illustrating a process for taking an action based upon a conditional setting for an intrusion zone of an A/V recording and communication device according to various aspects of the present disclosure. The process may include monitoring and detecting (block B670) motion in at least one motion zone of the A/V recording and communication device, such as (but not limited to) the A/V recording and communication device 2202. In some embodiments, motion may be detected using the PIR sensors 144 and/or the camera 102/134, as described above. Upon detecting motion, the process may include determining (block B672) whether at least one intrusion zone conditional setting is satisfied. For example, if a conditional setting of the at least one intrusion zone comprises a time of day, then the process may compare a current time to a set time interval to determine whether the detected motion occurred during the set time interval. In another example, if a conditional setting of the at least one intrusion zone comprises a level of ambient light, then the process may compare a current level of ambient light to a set level of ambient light to determine whether the detected motion occurred during a period of low ambient light. In another example, if a conditional setting of the at least one intrusion zone comprises a location where the motion was detected, then the process may determine if the location where the motion was detected matches one or more preset locations. In another example, if a conditional setting of the at least one intrusion zone comprises a direction of movement, then the process may determine a direction of movement of the person/object that caused the detected motion to determine whether the detected direction of movement matches the set direction of movement. In another example, if a conditional setting of the at least one intrusion zone comprises a speed of movement, then the process may compare a speed of movement of the person/object that caused the detected motion to a set threshold speed to determine whether the detected speed of movement is above or below the set threshold speed. In another example, if a conditional setting of the at least one intrusion zone comprises a length of time that a person/object remains within a motion zone, then the process may compare a length of time that a person/object remains within a motion zone to a set threshold time to determine whether the detected length of time is above or below the set threshold length of time. In another example, if a conditional setting of the at least one intrusion zone comprises a level of reflecting light intensity, then the process may compare a detected level of reflecting light intensity to a set threshold intensity to determine whether the detected level of reflecting light intensity is above or below the set threshold intensity. In another example, if a conditional setting of the at least one intrusion zone comprises a body posture of a person within the motion zone, then the process may compare a detected body posture of a person within the motion zone to one or more preset body postures to determine whether the detected body posture of a person within the motion zone matches the one or more preset body postures.

In further reference to FIG. 38, if no conditional setting is satisfied, the process may end (block B678). However, if at least one conditional setting is satisfied, then the process may include determining (block B674) and executing (block 676) at least one intrusion zone action. In some embodiments, the intrusion zone action may include generating an intrusion alert and transmitting it to a client device 114/800. In various embodiments, the intrusion alert may be transmitted to the client device 114/800 even when motion alerts are inactive for the at least one motion zone where the motion was detected. For example, if motion is detected but motion alerts are inactive for the at least one motion zone where the motion was detected, then no alert may be sent unless at least one conditional setting is also satisfied.

Further, the intrusion alert may include a notification about a type of alert based on the particular conditional setting that was satisfied. For example, if the particular conditional setting that was satisfied comprises a location of motion detection, then the intrusion alert may include a notification that identifies where the motion was detected (e.g., inside the home, or in the front yard, or in the backyard, or along the side of the home, etc.). The intrusion alert may further include an indication of the at least one motion zone where the motion was detected.

In further reference to FIG. 38, the intrusion action may include a variety of actions to combat an unwanted presence of an intruder. For example, in some embodiments, the intrusion action may include activating at least one lighting device to illuminate the area surrounding the A/V recording and communication device 2202. In further embodiments, the intrusion action may include transmitting an intrusion alert to the server 118/900C for providing a warning message about the detected motion to at least one social network 122 (FIG. 42). The social network 122 may include any social media service or platform that uses computer-mediated tools that allow participants to create, share, and/or exchange information in virtual communities and/or networks, such as (but not limited to) social networking websites and/or applications running on participant devices. Non-limiting examples of social networks include Facebook, Twitter, Snapchat, and Nextdoor. The intrusion action may also include transmitting an intrusion alert to a client device or set of client devices that differs from a second client device or set of client devices, where the second client device or set of client devices may have been designated to receive an alert when motion is detected but no conditional settings were satisfied. Further, the intrusion action may include activating an intruder intervention module configured to intervene with a person that may have caused the detected motion. Such intervention may include emitting a warning sound and/or a recorded warning message using the speaker 157 of the A/V recording and communication device 2202.

Figure 39:
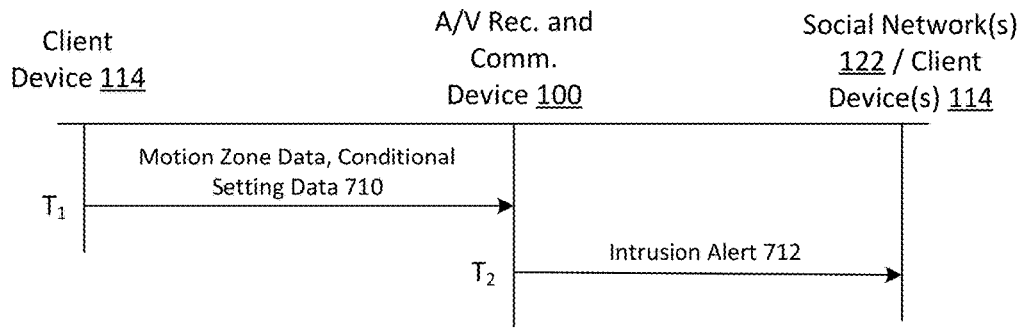
FIGS. 39-41 are sequence diagrams illustrating embodiments of processes for monitoring an intrusion zone using at least one conditional setting of an A/V recording and communication device according to various aspects of the present disclosure.
Figure 40:
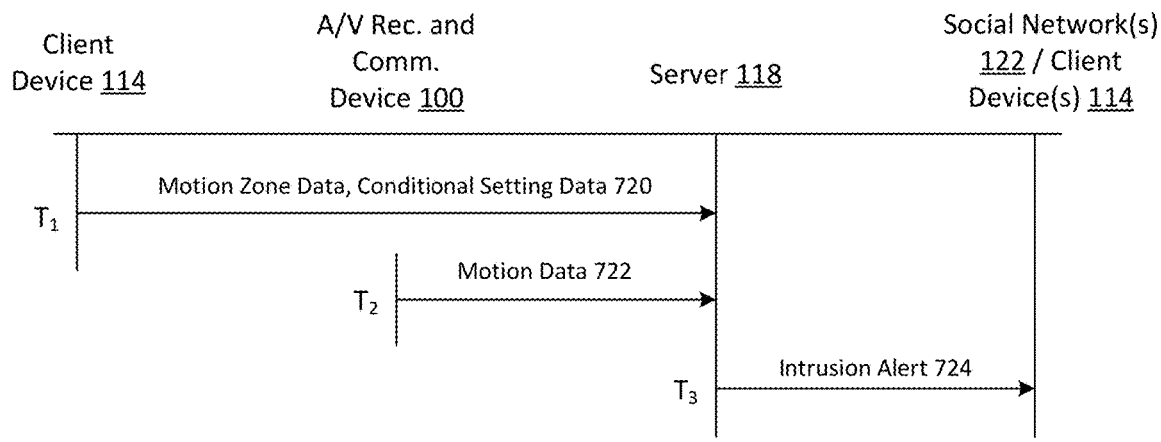
Figure 41:
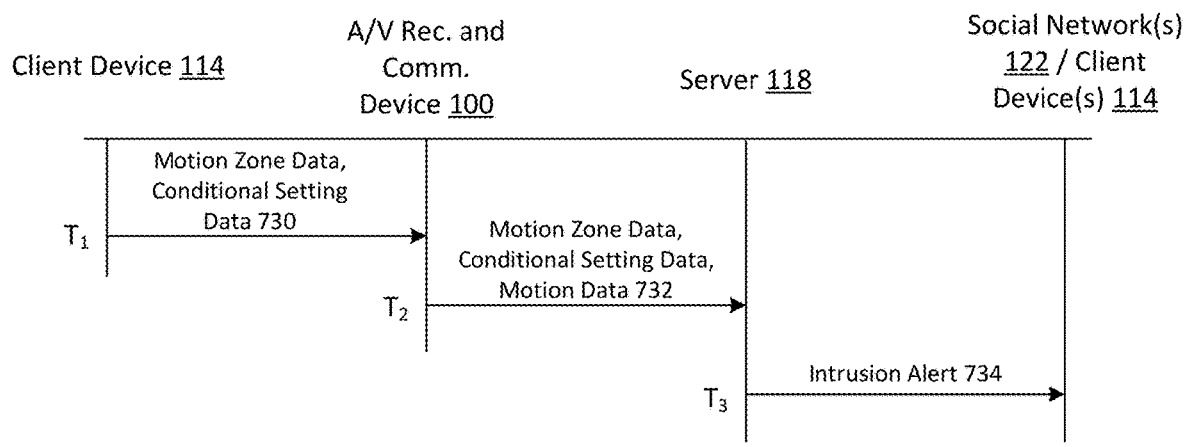

FIGS. 39-41 are sequence diagrams illustrating embodiments of processes for monitoring an intrusion zone using at least one conditional setting according to various aspects of the present disclosure. With reference to FIG. 39, the process may include a client device 114, an A/V recording and communication device 100, and at least one social network 122 (FIG. 42). In such embodiments, at a time $T_1$, the client device 114 may transmit motion zone data and conditional setting data 710 (may also be referred to as "first signal 710") to the A/V recording and communication device 100. Prior to transmitting the first signal 710, the client device 114 may be configured to receive motion zone data and conditional setting data from a user, as discussed above. In various embodiments, the A/V recording and communication device 100 receives the motion zone data and conditional setting data 710 and may be configured to monitor at least one intrusion zone comprising at least one motion zone coupled with at least one conditional setting, as discussed above. Upon detecting motion in the at least one intrusion zone while satisfying at least one conditional setting, the A/V recording and communication device 100 may generate and transmit an intrusion alert 712 back to the client device 114 and/or to at least one social network 122 at a time $T_2$, and the at least one social network 122 and/or the client device 114 may receive the transmitted intrusion alert 712 from the A/V recording and communication device 100. In various embodiments, the intrusion alert 712 may be transmitted to, and received by, at least one other client device 114 in addition to, or instead of, the client device 114 that transmitted the motion zone data and the conditional setting data 710 to the A/V recording and communication device 100.

In reference to FIG. 40, the process may include a client device 114, an A/V recording and communication device 100, a server 118, and at least one social network 122. In such embodiments, at a time $T_1$, the client device 114 may transmit motion zone data and conditional setting data 720 (may also be referred to as "first signal 720") to the server 118. Prior to transmitting the first signal 720 to the server 118, the client device 114 may be configured to receive motion zone data and conditional zone data input from a user, as discussed above. At a time $T_2$, the A/V recording and communication device 100 may transmit a second signal 722 comprising data related to motion (may be referred to as motion data) captured using its camera 102, PIR sensor(s) 144, and/or any other suitable motion detecting sensor or device. In some embodiments, time $T_2$ may be after time $T_1$, while in other embodiments time $T_2$ may substantially coincide with time $T_1$ (e.g., the first signal 720 and the second signal 722 may be transmitted at substantially the same time). Upon receiving the first and second signals 720, 722, the server 118 may transmit an intrusion alert 724 to at least one social network 122 and/or to the client device 114 at a time $T_3$. Likewise, the at least one social network 122 and/or the client device 114 may receive the transmitted intrusion alert 724 from the server 118. In various embodiments, the intrusion alert 724 may be transmitted to, and received by, at least one other client device 114 in addition to, or instead of, the client device 114 that transmitted the motion zone data and the conditional setting data 720 to the server 118.

In reference to FIG. 41, the process may include a client device 114, an A/V recording and communication device 100, a server 118, and at least one social network 122. In such embodiments, at a time $T_1$, the client device 114 may transmit motion zone data and conditional setting data 730 to the A/V recording and communication device 100. Prior to transmitting the motion zone data and the conditional setting data 730, the client device 114 may be configured to receive motion zone data and conditional zone data input from a user, as discussed above. At a later time $T_2$, the A/V recording and communication device 100 may transmit a combined signal 732 to the server 118, the combined signal 732 comprising the motion zone data and the conditional setting data 730 received from the client device 114 along with motion data captured by the A/V recording and communication device 100. Prior to transmitting the combined signal 732 to the server 118, the A/V recording and communication device 100 may capture the motion data using its camera 102, PIR sensor(s) 144, and/or any other suitable motion detecting sensor or device. Upon receiving the transmitted combined signal 732 from the A/V recording and communication device 100, the server 118 may transmit an intrusion alert 734 to the at least one social network 122 and/or the client device 114 at a time $T_3$, and the at least one social network 122 and/or the client device 114 may receive the transmitted intrusion alert 734 from the server 118. In various embodiments, the intrusion alert 734 may be transmitted to, and received by, at least one other client device 114 in addition to, or instead of, the client device 114 that transmitted the motion zone data and the conditional setting data 730 to the server 118.

Each of the processes described herein, including at least the processes 4300, 4400, 4500, 4600, and 4700 are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 43:
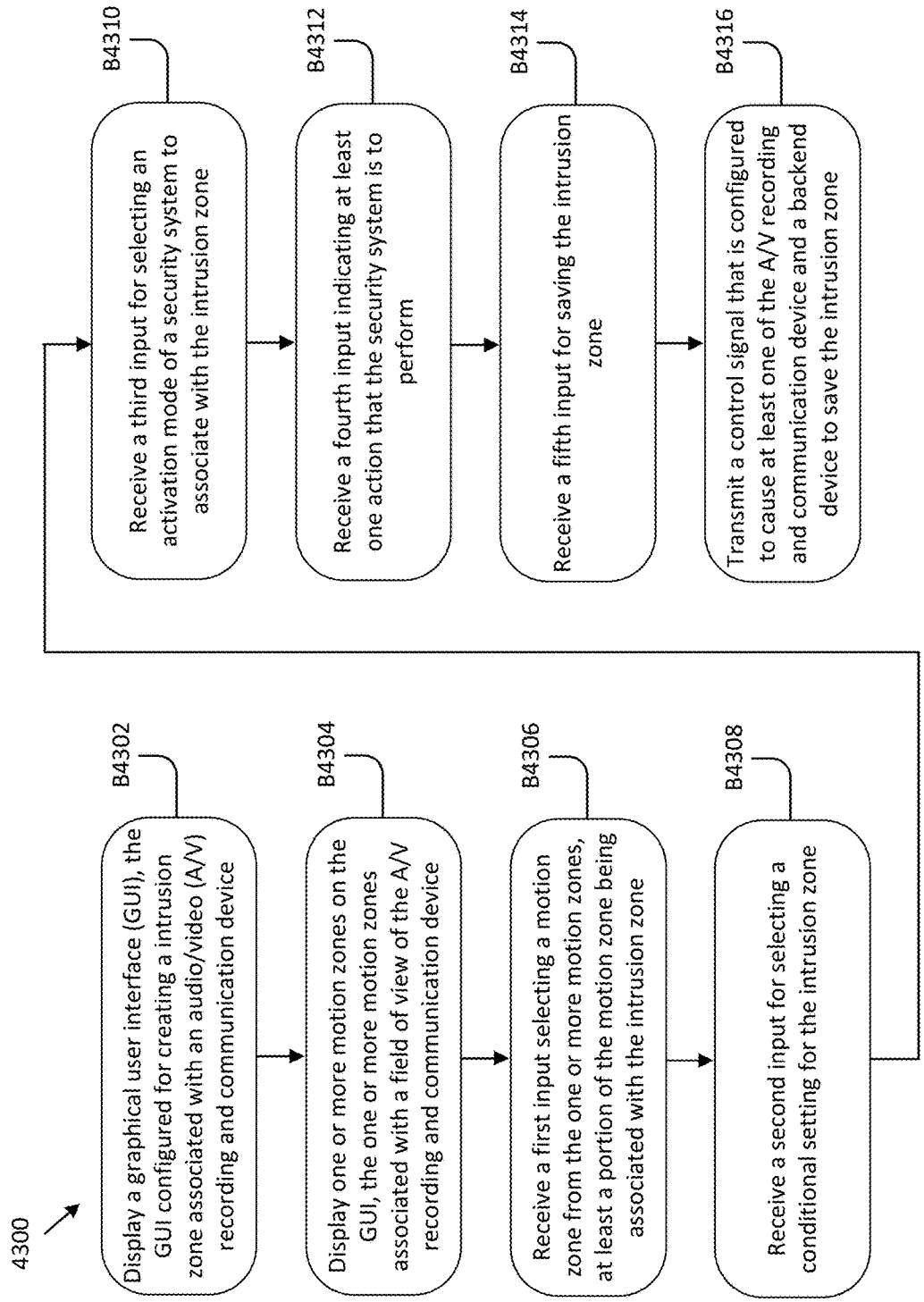
FIG. 43 is a flowchart illustrating a process for creating an intrusion zone for an A/V recording and communication device, where the intrusion zone is associated with a security system, according to various aspects of the present disclosure.

FIG. 43 is a flowchart illustrating a process 4300 for creating an intrusion zone for an A/V recording and communication device, where the intrusion zone is associated with a security system, according to various aspects of the present disclosure. The process 4300, at block B4302, displays a graphical user interface (GUI), the GUI configured for creating an intrusion zone associated with an audio/video (A/V) recording and communication device. For example, the processor 2612 of the client device 2208, 2210 may cause a GUI 2622 to be displayed using the display 2620. As discussed above, the GUI 2622 may be configured to for creating an intrusion zone 2340 associated with the A/V recording and communication device 2202. In some examples, the intrusion zone 2340 is associated with the security system 2228.

The processor 4300, at block B4304, displays one or more motion zones on the GUI, the one or more motion zones being associated with a field of view of the A/V recording and communication device. For example, the processor 2612 of the client device 2208, 2210 may cause one or more motion zones 2350 to be displayed on the GUI 2622. The one or more motion zones 2350 may be associated with a field of view of the A/V recording and communication device 2202. In some examples, the processor 2612 of the client device 2208, 2210 may cause six motion zones 2350 to be displayed on the GUI 2622. In other example, the processor 2612 of the client device 2208, 2210 may cause any other number of motion zones 2350 to be displayed on the GUI 2622. In some embodiments, the client device 2208, 2210 may enable the user to create a motion zone 2350 and/or an intrusion zone 2342, such as by overlaying or otherwise creating a rectangle, circle, triangle, or a polygon over the field of view of the camera 2304 and/or over the field of view of the motion sensor 2308.

The processor 4300, at block B4306, receives a first input selecting a motion zone from the one or more motion zones, at least a portion of the motion zone being associated with the intrusion zone. For example, the processor 2612 of the client device 2208, 2210 may receive, using the input interface 2604, the first input selecting a motion zone 2342 from the one or more motion zones 2350. At least a portion of the motion zone 2342 may be associated with the intrusion zone 2340. For instance, in some examples, the processor 2612 of the client device 2208, 2210 may further receive, using the input interface 2604, input that indicates a range at which the A/V recording and communication device 2202 detects motion within the motion zone 2342. In such examples, the range may correspond to the at least the portion of the motion zone 2342 that is associated with the intrusion zone 2340.

The process 4300, at block B4308, receives a second input selecting a conditional setting for the intrusion zone. For example, the processor 2612 of the client device 2208, 2210 may receive, using the input interface 2604, the second input selecting a conditional setting 2344 for the intrusion zone 2340. As discussed above, the conditional setting 2344 may include, but is not limited to, a time of day, a level of ambient light, a direction of movement, a speed of movement, a length of time an object is within an intrusion zone, a level of reflecting light intensity, and/or a body posture of a person within an intrusion zone. In some examples, the processor 2612 of the client device 2208, 2210 may receive, using the input interface 2604, input selecting more than one conditional setting 2344. In some examples, such as when the intrusion zone 2340 is not associated with a conditional setting 2344, the process 4300 may not include block B4308.

The process 4300, at block B4310, receives a third input for selecting an activation mode of a security system to associate with the intrusion zone. For example, the processor 2612 of the client device 2208, 2210 may receive, using the input interface 2604, the third input selecting the activation mode 2346 of the security system 2228 to associate with the intrusion zone 2340. As discussed above, the activation mode 2346 of the security system 2228 may include, but is not limited to, an armed stay mode, an armed away mode, an armed vacation mode, a disarmed mode, and a custom armed mode. In some examples, the processor 2612 of the client device 2208, 2210 may receive, using the input interface 2604, input selecting more than one activation mode 2340 to associate with the intrusion zone 2340.

The process 4300, at block B4312, receives a fourth input indicating at least one action that the security system is to perform. For example, the processor 2612 of the client device 2208, 2210 may receive, using the input interface 2604, the fourth input indicating at least one action 2348 that the security system 2228 is to perform based on the A/V recording and communication device 2202 detecting motion within the intrusion zone 2340 and, in some examples, the conditional setting 2344 being satisfied (e.g., examples where the conditional setting 2344 is selected at block B4308). As discussed above, the at least one action 2348 may include, but is not limited to, activating the alarm 2230 of the security system 2228, outputting a warning sound (e.g., using the speaker of the hub device 2212), transmitting a user alert 2334 to the client device 2208, 2210 and/or the security monitoring server 2226, and/or changing a state of at least one automation device 2216 (e.g., locking a lock, powering on a light, locking a window, etc.).

In some examples, the processor 2612 of the client device 2208, 2210 may also receive, using the input interface 2604, an input indicating at least one action 2348 that the A/V recording and communication device 2202 is to perform based on the A/V recording and communication device 2202 detecting motion within the intrusion zone 2340 and, in some examples, the conditional setting 2344 being satisfied (e.g., examples where the conditional setting 2344 is selected at block B4308). The at least one action 2348 that the A/V recording and communication device 2202 is to perform may include, but is not limited to, recording image data 2324 using the camera 2304, activating a light (e.g., floodlight(s) 2104), outputting a warning sound using the speaker 2310 and/or a siren, and/or transmitting a user alert 2334 to at least one of the client device 2208, 2210, the hub device 2212, and the backend server 2222.

The process 4300, at block B4314, receives a fifth input for saving the intrusion zone. For example, the processor 2612 of the client device 2208, 2210 may receive, using the input interface 2604, the fifth input for saving the intrusion zone 2340. In some examples, based on receiving the fifth input, the processor 2612 of the client device 2208, 2210 may generate a control 2338 that is configured to cause at least one of the A/V recording and communication device 2202 and the security system 2228 to save the intrusion zone 2340 and/or monitor the intrusion zone 2340.

The process 4300, at block B4216, transmits a control signal that is configured to cause at least one of the A/V recording and communication device and a network device to save the intrusion zone. For example, the processor 2612 of the client device 2208, 2210 may transmit, using the communication module 2610, the control signal 2338 that is configured to cause the at least one of the A/V recording and communication device 2202 and the security system 2228 to save the intrusion zone 2340. In some examples, the processor 2612 of the client device 2208, 2210 transmits the control signal 2338 to the network device (e.g., the hub device 2212 and/or the backend server 2222), which then transmits the control signal 2338 (and/or an additional control signal 2338) to the A/V recording and communication device 2202. In some examples, when the control signal 2338 does not include data representing the intrusion zone 2340, the processor 2612 of the client device 2208, 2210 may further transmit, using the communication module 2610, the data representing the intrusion zone 2340.

In some examples, the example process 4300 of FIG. 43 may be repeated for one or more additional intrusion zones 2340 for the A/V recording and communication device 2202, where the one or more additional intrusion zones 2340 may be associated with the security system 2228. For example, at least two intrusion zones 2340 may be created for the A/V recording and communication device 2202, where each of the intrusion zones 2340 may be associated with a respective motion zone 2342, a respective conditional setting 2344, a respective activation mode 2346, and/or at least one respective action 2348. As such, in some examples, the network device (e.g., the hub device 2212 and/or the backend server 2222) may cause the security system 2228 to perform different actions 2348 based on if the A/V recording and communication device 2202 detects first motion within a first intrusion zone 2340 or second motion within a second intrusion zone 2340.

The process 4300 of FIG. 43 may be implemented in a variety of embodiments, including those discussed above. However, the below-detailed embodiments are not intended to be limiting, and are provided merely as example embodiments of the present disclosure. Other embodiments similar to those outlined herein may also fall within the scope of the present disclosure.

For example, a user of the client device 2208 may want to create a new intrusion zone 2340 to associate with the security system 2228 installed at the user's property, where the user's property further includes the A/V recording and communication device 2202. As such, the processor 2612 of the client device 2208 may display the GUI 2522 that is configured to create the intrusion zone 2340 (e.g., block B4302). Additionally, after selecting the A/V recording and communication device 2202 to associate with the intrusion zone 2340, the processor 2612 of the client device 2208 may display the motion zones 2350 (and/or may allow the user to create motion zones 2350) associated with the field of view of the A/V recording and communication device 2202 on the GUI 2522, which may be similar to the example shown in FIG. 27 (e.g., block B4304).

While displaying the GUI 2522, the processor 2612 of the client device 2208 may receive, using the input interface 2604, the first input selecting the motion zone 2342 from the motion zones 2350 (e.g., block B4306). For example, the user may select the motion zone 2342 that includes the front door of the property. The processor 2612 of the client device 2208 may then receive, using the input interface 2604, the second input selecting the conditional setting 2344 (e.g., block B4308). For example, the user may select the conditional setting 2344 to include a time of day, such as hours of the day that correspond to nighttime (e.g., 8:00 p.m. to 8:00 a.m.). Additionally, the processor 2612 of the client device 2208 may receive, using the input interface 2604, the third input selecting the activation mode 2346 of the security system 2228 (e.g., block B4310). For example, the user may select the armed stay mode. Furthermore, the processor 2612 of the client device 2208 may receive, using the input interface 2604, the fourth input selecting the at least one activity 2348 that the security system 2228 is to perform (e.g., block B4312). For example, the user may select that the security system 2228 activates the alarm 2230.

Next, when the user is finished, the processor 2612 of the client device 2208 may receive, using the input interface 2604, the fifth input for saving the intrusion zone 2340 (e.g., block B4314). In response, the processor 2612 of the client device 2208 may transmit, using the communication module 2610, the control signal 2338 that is configured to cause at least one of the A/V recording and communication device 2202 and the security system 2228 to save the intrusion zone 2340 (e.g., block B4316). By saving the intrusion zone 2340, the security system 2228 may activate the alarm 2230 when motion is detected by the A/V recording and communication device 2202 within the intrusion zone 2340 and the conditional setting 2344 is satisfied.

Figures 44, 45:
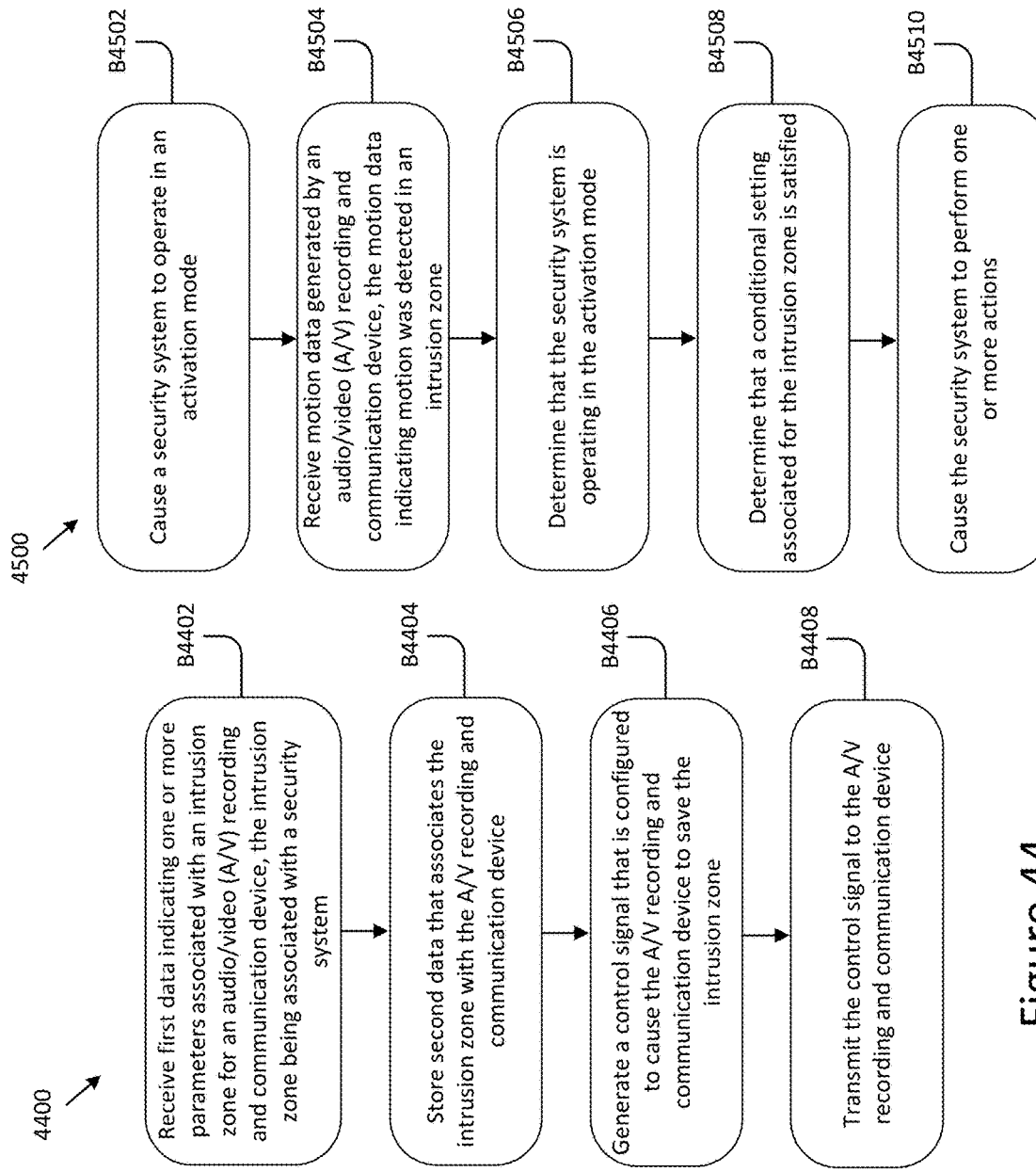
FIG. 44 is a flowchart illustrating an example process for receiving and storing data representing an intrusion zone for an A/V recording and communication device, where the intrusion zone is associated with a security system, according to various aspects of the present disclosure.
FIG. 45 is a flowchart illustrating an example process for utilizing an intrusion zone for an A/V recording and communication device, where the intrusion zone is associated with a security system, according to various aspects of the present disclosure.

FIG. 44 is a flowchart illustrating an example process 4400 for receiving and storing data representing an intrusion zone for an A/V recording and communication device, where the intrusion zone is associated with a security system, according to various aspects of the present disclosure. In some examples, the example process 4400 of FIG. 44 may occur after block B4316 of the example process 4300 of FIG. 43.

The process 4400, at block B4402, receives first data indicating one or more parameters associated with an intrusion zone of an audio/video (A/V) recording and communication device, the intrusion zone being associated with a security system. For example, the processor 2506 of the backend server 2222 may receive, using the communication module 2502 (and/or the processor 2408 of the hub device 2212 may receive, using the communication module 2404), the first data (e.g., a control signal 2338, data representing the intrusion zone 2340, etc.) associated with the intrusion zone 2340 of the A/V recording and communication device 2202. The first data may include one or more parameters, such as, but not limited to, motion zone(s) 2342, conditional setting(s) 2344, activation mode(s) 2346, and action(s) 2348. In some examples, the processor 2506 of the backend server 2222 may receive, using the communication module 2502 (and/or the processor 2408 of the hub device 2212 may receive, using the communication module 2404), the first data from the client device 2208, 22210. In some example, the processor 2408 of the hub device 2212 may receive, using the communication module 2404, the first data from the backend server 2222.

The process 4400, at block B4404, stores second data that associates the intrusion zone with the A/V recording and communication device. For example, the processor 2506 of the backend server 2222 (and/or the processor 2408 of the hub device 2212) may store second data that associates the intrusion zone 2340 with the A/V recording and communication device 2202. In some examples, the processor 2506 of the backend server 2222 (and/or the processor 2408 of the hub device 2212) may further store data that associates the intrusion zone 2340 with the security system 2228.

The process 4400, at block B4406, generates a control signal that is configured to cause the A/V recording and communication device to save the intrusion zone. For example, the processor 2506 of the backend server 2222 (and/or the processor 2408 of the hub device 2212) may generate the control signal 2338 that is configured to cause the A/V recording and communication device 2202 to save the intrusion zone 2340.

The process 4400, at block B4408, transmits the control signal to the A/V recording and communication device. For example, the processor 2506 of the backend server 2222 may transmit, using the communication module 2502 (and/or the processor 2408 of the hub device 2212 may transmit, using the communication module 2404), the control signal 2338 to the A/V recording and communication device 2202. In some examples, the processor 2506 of the backend server 2222 may transmit, using the communication module 2502, the control signal 2338 to the hub device 2212 which then transmits the control signal 2338 (and/or an additional control signal 2338) to the A/V recording and communication device 2202.

FIG. 45 is a flowchart illustrating an example process 4500 for utilizing an intrusion zone for an A/V recording and communication device, where the intrusion zone is associated with a security system, according to various aspects of the present disclosure. The process 4500, at block B4502, causes a security system to operate in an activation mode. For example, the processor 2506 of the backend server 2222 (and/or the processor 2408 of the hub device 2212) may cause the security system 2228 to operate in the activation mode 2346. In some examples, the processor 2506 of the backend server 2222 may cause the security system 2228 to operate in the activation mode 2346 by transmitting, using the communication module 2502, a control signal 2338 to the hub device 2212, where the hub device 2212 causes the security system 2228 to enter the activation mode 2346 in response to receiving the control signal 2338.

The process 4500, at block B4504, receives motion data generated by an audio/video (A/V) recording and communication device, the motion data indicating that motion was detected in an intrusion zone. For example, the processor 2506 of the backend server 2222 may receive, using the communication module 2502 (and/or the processor 2408 of the hub device 2212 may receive, using the communication module 2404), the motion data 2330 generated by the A/V recording and communication device 2202. The motion data 2330 may indicate that the A/V recording and communication device 2202 detected motion within the intrusion zone 2340, such as within the motion zone(s) 2342 associated with the intrusion zone 2340. In some examples, the processor 2506 of the backend server 2222 may receive, using the communication module 2502, the motion data 2330 from the A/V recording and communication device 2202 and/or the hub device 2212.

The process 4500, at block B4506, determines that the security system is operating in the activation mode. For example, based on receiving the motion data 2330, the processor 2506 of the backend server 2222 (and/or the processor 2408 of the hub device 2212) may determine that the security system 2228 is operating in the activation mode 2346 associated with the intrusion zone 2340. In some examples, the processor 2506 of the backend server 2222 may transmit, using the communication module 2502, a request to the hub device 2212, where the request is for the current activation mode 2346 in which the security system 2228 is operating. In response, the processor 2506 of the backend server 2222 may receive, using the communication module 2502, mode data 2352 from the hub device 2212 that indicates the activation mode 2346.

The processor 4500, at block B4508, determines that a conditional setting for the intrusion zone is satisfied. For example, the processor 2506 of the backend server 2222 (and/or the processor 2408 of the hub device 2212) may determine that the conditional setting 2344 for the intrusion zone 2340 is satisfied. In some examples, the processor 2506 of the backend server 2222 may determine that the conditional setting 2344 is satisfied by receiving, using the communication module 2502 (and/or the processor 2408 of the hub device 2212 may determine that the conditional setting 2344 is satisfied by receiving, using the communication module 2404), data from the A/V recording and communication device 2202 that indicates that the conditional setting 2344 is satisfied. In some examples, the processor 2506 of the backend server 2222 (and/or the processor 2408 of the hub device 2212) may determine that the conditional setting 2344 for the intrusion zone 2340 is satisfied by analyzing the conditional setting 2344 with respect to current conditions, such as the current time, current amount of ambient light, and/or the like. In some examples, the processor 2506 of the backend server 2222 (and/or the processor 2408 of the hub device 2212) may determine that the conditional setting 2344 for the intrusion zone 2340 is satisfied by analyzing the motion data 2330, such as to determine a direction of motion, a speed of motion, a length of time an object is within the intrusion zone 2340, a body posture of a person within the intrusion zone 2340, and/or the like.

The process 4500, at block B4508, causes the security system to perform one or more actions. For example, the processor 2506 of the backend server 2222 (and/or the processor 2408 of the hub device 2212) may cause the security system 2228 to perform one or more actions 2348 based on the A/V recording and communication device detecting the motion within the intrusion zone 2340, the security system 2228 operating in the activation mode 2346, and/or the conditional setting 2344 being satisfied. As discussed above, the one or more actions 2348 may include, but are not limited to, activating the alarm 2230 of the security system 2228, outputting a warning sound (e.g., using the speaker of the hub device 2212, using a speaker of a wireless speaker in communication with the hub device 2212, and/or using a speaker of an automation device 2216), transmitting a user alert 2334 to the client device 2208, 2210 and/or the security monitoring service 2226, and/or changing a state of at least one automation device 2216 (e.g., locking a lock, powering on a light, locking a window, etc.). In some examples, the processor 2506 of the backend server 2222 may cause the security system 2228 to perform the one or more actions 2348 by transmitting, using the communication module 2502, a control signal 2338 to the hub device 2212. In response to receiving the control signal 2338, the processor 2408 of the hub device 2212 may then cause the security system 2228 to perform the one or more actions 2348.

In some examples, block B4504 through block B4510 of the example process 4500 of FIG. 45 may be repeated as the processor 2506 of the backend server 2222 (and/or the processor 2408 of the hub device 2212) continues to monitor the intrusion zone 2340. Additionally, in some examples, while monitoring the intrusion zone 2340, the processor 2506 of the backend server 2222 (and/or the processor 2408 of the hub device 2212) may refrain from causing the security system 2228 to perform the one or more actions 2348 based on determining that the security system 2228 is not operating in the activation mode 2346 (at block B4506) and/or determining that the conditional setting 2344 is not satisfied (at block B4508).

The process 4500 of FIG. 45 may be implemented in a variety of embodiments, including those discussed above. However, the below-detailed embodiments are not intended to be limiting, and are provided merely as example embodiments of the present disclosure. Other embodiments similar to those outlined herein may also fall within the scope of the present disclosure.

For example, the processor 2408 of the hub device 2212 may receive, using the communication module 2404, a control signal 2338 from the client device 2208, 2210 and/or the backend server 2222. Based on receiving the control signal 2338, the processor 2408 of the hub device 2212 may cause the security system 2228 to operate in an activation mode 2346, such as the armed stay mode (e.g., block B4502). While operating in the armed stay mode, the processor 2408 of the hub device 2212 may receive, using the communication module 2404, motion data 2330 from the A/V recording and communication device 2202 that indicates that motion was detected within an intrusion zone 2340 (e.g., block B4504). Based on receiving the motion data 2330, the processor 2408 of the hub device 2212 may analyze the intrusion zone 2340 to determine that the intrusion zone 2340 is associated with the armed stay mode and/or determine that the intrusion zone 2340 is associated with a conditional setting 2344, such as hours between 8:00 p.m. and 8:00 a.m. each day.

The processor 2408 of the hub device 2212 may then determine that the security system 2228 is operating in the armed stay mode (e.g., block B4506). Additionally, the processor 2408 of the hub device 2212 may determine that a current time is between 8:00 p.m. and 8:00 a.m. and, as such, the conditional setting 2344 associated with the security system 2228 is satisfied (e.g., block B4508). In response to determining that the security system 2228 is operating in the armed stay mode and determining that the conditional setting 2344 is satisfied, the processor 2408 of the hub device 2212 may cause the security system 2228 to perform one or more actions 2348 (e.g., block B4510). For a first example, the processor 2408 of the hub device 2212 may cause the security system 2228 to activate the alarm 2230. For a second example, the processor 2408 of the hub device 2212 may transmit, using the communication module 2404, a user alert 2334 to the client device 2208, 2210 and/or the backend server 2222, where the user alert 2334 indicates that the A/V recording and communication device 2202 detected motion within the intrusion zone 2340. For a third example, the processor 2408 of the hub device 2212 may transmit, using the communication module 2408, a control signal 2338 to the A/V recording and communication device 2202 that is configured to cause the A/V recording and communication device 2202 to capture image data 2324 using the camera 2304.

Figures 46, 47:
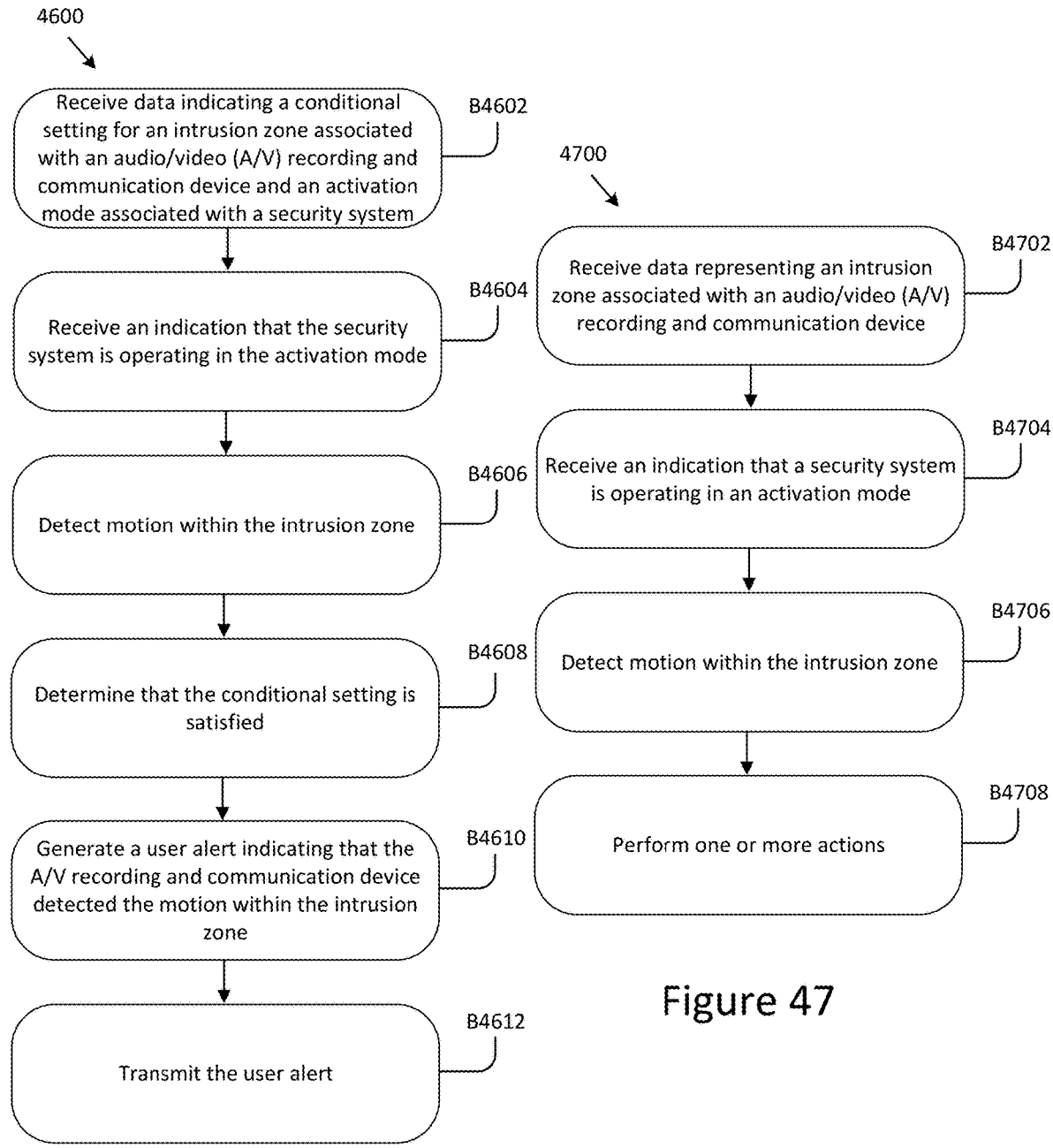
FIG. 46 is a flowchart illustrating a first example process for monitoring an intrusion zone for an A/V recording and communication device, where the intrusion zone is associated with a security system, according to various aspects of the present disclosure.
FIG. 47 is a flowchart illustrating a second example process for monitoring an intrusion zone for an A/V recording and communication device, where the intrusion zone is associated with a security system, according to various aspects of the present disclosure.

FIG. 46 is a flowchart illustrating a first example process 4600 for monitoring an intrusion zone for an A/V recording and communication device, where the intrusion zone is associated with a security system, according to various aspects of the present disclosure. The process 4600, at block B4602, receives data indicating a conditional setting for an intrusion zone associated with an audio/video (A/V) recording and communication device and an activation mode associated with a security system. For example, the processor 2316 of the A/V recording and communication device 2202 may receive, using the communication module 2312, data (e.g., a control signal 2338, data representing the intrusion zone 2340, etc.) indicating the conditional setting 2344 associated with the intrusion zone 2340 and the activation mode 2346 associated with the security system 2228. In some examples, the processor 2316 of the A/V recording and communication device 2202 may receive, using the communication module 2312, the data from the client device 2208, 2210, the hub device 2212, and/or the backend server 2222.

The process 4600, at block B4604, receives an indication that the security system is operating in the activation mode. For example, the processor 2316 of the A/V recording and communication device 2202 may receive, using the communication module 2312, mode data 1352 indicating that the security system 2228 is operating in the activation mode 2346 associated with the intrusion zone 2340. In some examples, based on receiving the mode data 2352, the processor 2316 of the A/V recording and communication device 2202 may begin monitoring the intrusion zone 2340 for motion.

The process 4600, at block B4606, detects motion within the intrusion zone. For example, the processor 2316 of the A/V recording and communication device 2202 may detect, using at least one of the camera 2304 and the motion sensor 2308, motion within the intrusion zone 2340. In some examples, the processor 2316 of the A/V recording and communication device 2202 may further detect a direction of the motion, a speed of the motion, a length of time that an object is within the intrusion zone 2340, a body posture of a person within the intrusion zone 2340, and/or the like.

The process 4600, at block B4608, determines that the conditional setting is satisfied. For example, the processor 2316 of the A/V recording and communication device 2202 may determine that the conditional setting 2344 for the intrusion zone 2340 is satisfied. In some examples, the processor 2316 of the A/V recording and communication device 2202 may determine that the conditional setting 2344 for the intrusion zone 2340 is satisfied by analyzing the conditional setting 2344 with respect to current conditions, such as the current time, current amount of ambient light, and/or the like. In some examples, the processor 2316 of the A/V recording and communication device 2202 may determine that the conditional setting 2344 for the intrusion zone 2340 is satisfied based on the direction of motion, the speed of motion, the length of time the object is within the intrusion zone 2340, the body posture of a person within the intrusion zone 2340, and/or the like.

The process 4600, at block B4610, generates a user alert indicating that the A/V recording and communication device detected the motion within the intrusion zone. For example, based on detecting the motion within the intrusion zone 2340 and/or determining that the conditional setting 2344 is satisfied, the processor 2316 of the A/V recording and communication device 2202 may generate the user alert 2334 indicating that the A/V recording and communication device 2202 detected the motion within the intrusion zone 2340.

The process 4600, at block B4612, transmits the user alert. For example, the processor 2316 of the A/V recording and communication device 2202 may transmit, using the communication module 2312, the user alert 2334 to the client device 2208, 2210, the hub device 2212, and/or the backend server 2222. Additionally, in some examples, the processor 2316 of the A/V recording and communication device 2202 may perform one or more additional actions 2348, such as, but not limited to, recording the image data 2324 using the camera 2304, activating a light (e.g., floodlight(s) 2104), and/or outputting a warning sound using the speaker 2310 and/or a siren.

In some examples, block B4604 through block B4612 of the example process 4600 of FIG. 46 may be repeated as the processor 2316 of the A/V recording and communication device 2202 continues to monitor the intrusion zone 2340. Additionally, in some examples, while monitoring the intrusion zone 2340, the processor 2316 of the A/V recording and communication device 2202 may refrain from generating and/or transmitting a user alert 2334 based on determining that the security system 2228 is not operating in the activation mode 2346 and/or determining that the conditional setting 2344 is not satisfied (at block B4608).

FIG. 47 is a flowchart illustrating a second example process 4700 for monitoring an intrusion zone for an A/V recording and communication device, where the intrusion zone is associated with a security system, according to various aspects of the present disclosure. The process 4700, at block B4702, receives data representing an intrusion zone associated with an audio/video (A/V) recording and communication device. For example, the processor 2316 of the A/V recording and communication device 2202 may receive, using the communication module 2312, data (e.g., a control signal 2338, data representing the intrusion zone 2340, etc.) representing the intrusion zone 2340 associated with the A/V recording and communication device 2202. In some examples, the processor 2316 of the A/V recording and communication device 2202 may receive, using the communication module 2312, the data from the client device 2208, 2210, the hub device 2212, and/or the backend server 2222.

The process 4700, at block B4704, receives an indication that a security system is operating in an activation mode. For example, the processor 2316 of the A/V recording and communication device 2202 may receive, using the communication module 2312, mode data 2352 indicating that the security system 2228 is operating in the activation mode 2346 associated with the intrusion zone 2340. In some examples, based on receiving the mode data 2352, the processor 2316 of the A/V recording and communication device 2202 may begin monitoring the intrusion zone 2340 for motion.

The process 4700, at block B4706, detects motion within the intrusion zone. For example, the processor 2316 of the A/V recording and communication device 2202 may detect, using at least one of the camera 2304 and the motion sensor 2308, motion within the intrusion zone 2340. In some examples, the processor 2316 of the A/V recording and communication device 2202 may further detect a direction of the motion, a speed of the motion, a length of time that an object is within the intrusion zone 2340, a body posture of a person within the intrusion zone 2340, and/or the like.

The process 4700, at block B4708, performs one or more actions. For example, based on detecting the motion within the intrusion zone 2340 and/or the security system 2228 operating in the activation mode 2346 associated with the intrusion zone 2340, the processor 2316 of the A/V recording and communication device 2202 may perform one or more actions 2348. As discussed above, the one or more actions 2348 may include, but are not limited to, recording image data 2324 using the camera 2304, activating a light (e.g., floodlight(s) 2104), outputting a warning sound using the speaker 2310 and/or a siren, and/or transmitting a user alert 2334 to at least one of the client device 2208, 2210, the hub device 2212, and the backend server 2222.

The processes described herein enable a user to configure an A/V recording and communication device 2202 and/or a security system 2228 such that the security system 2228 performs one or more actions 2348 at times when motion detected by the A/V recording and communication device 2202 is likely a threat to a user. For example, the user may create intrusion zone(s) 2340 for the A/V recording and communication device 2202. Each intrusion zone 2340 may be associated with motion zone(s) 2342 of the A/V recording and communication device 2202, conditional setting(s) 2344, activation mode(s) 2346 for the security system 2228, and/or action(s) 2348 that the security system 2228 is to perform. Based on the A/V recording and communication device detecting motion 2202 within the intrusion zone, a network device may determine that the security system 2228 is operating in one of the activation mode(s) 2346 and/or that at least one of the conditional setting(s) 2344 is satisfied before causing the security system 2228 to perform the action(s) 2348. As a result, the security system 2228 may perform the action(s) 2348, such as activating the alarm 2230 and/or transmitting a user alert 2334, in response to motion that is more likely to have been caused by an actual threat. Therefore, the user will more likely respond to warnings detected by the security system 2228.

Figure 48:
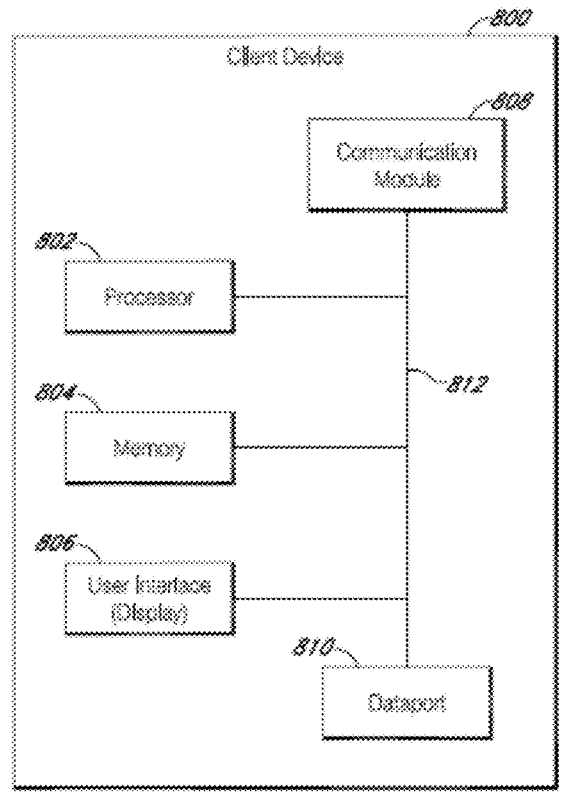
FIG. 48 is a functional block diagram of a client device on which the present embodiments may be implemented according to various aspects of the present disclosure.

FIG. 48 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 48, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM)). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/POD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 49:
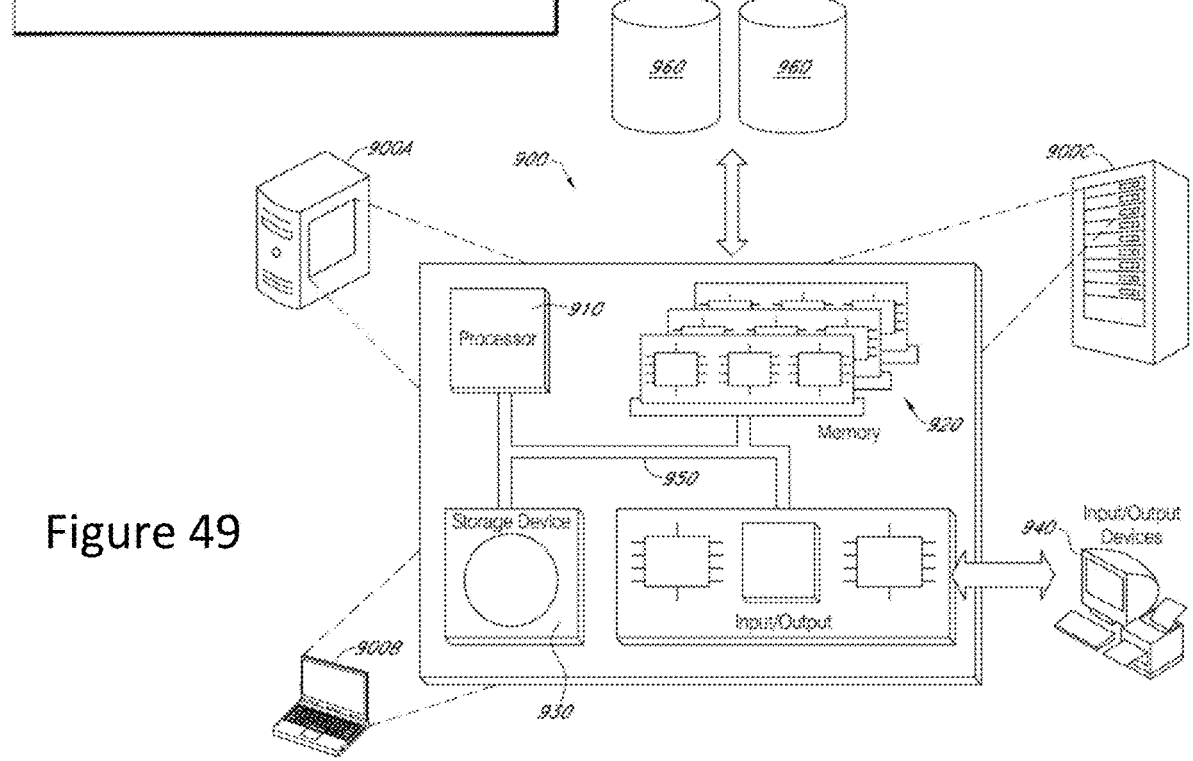
FIG. 49 is a functional block diagram of a general-purpose computing system on which the present embodiments may be implemented according to various aspects of present disclosure.

FIG. 49 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:
   sending first data representing a user interface to a display, the user interface associated with a field of view (FOV) of an audio/video recording and communication device (A/V device);
   receiving second data indicating a first portion of the user interface, the first portion of the user interface being associated with a first portion of the FOV, the first portion of the FOV being less than an entirety of the FOV;
   receiving third data indicating a first activation mode of a security system to associate with the first portion of the FOV; and
   sending fourth data that associates the first portion of the FOV with the first activation mode of the security system.

2. The method of claim 1, further comprising:
   receiving fifth data indicating a conditional setting, wherein the fourth data further associates the conditional setting with the first portion of the FOV.

3. The method of claim 1, further comprising:
   receiving fifth data indicating a second portion of the user interface, the second portion of the user interface being associated with a second portion of the FOV;
   receiving sixth data indicating a second activation mode of the security system; and
   sending seventh data that associates the second portion of the FOV with the second activation mode of the security system.

4. The method of claim 1, wherein the receiving of the third data indicating the first activation mode of the security system comprises receiving the third data indicating at least one of a stay mode, an away mode, a vacation mode, or a disarmed mode of the security system.

5. The method of claim 1, wherein, when the security system is operating in the first activation mode, the security system performs at least one action based at least in part on an automation device detecting an object.

6. The method of claim 1, further comprising generating the fourth data, the fourth data indicating at least:
   the first portion of the FOV;
   the first activation mode of the security system; and
   a command to associate the first portion of the FOV with the first activation mode.

7. The method of claim 1, further comprising generating the fourth data, the fourth data indicating at least:
   a motion zone from a plurality of motion zones, the motion zone being associated with the first portion of the FOV; and
   the first activation mode of the security system.

8. The method of claim 1, further comprising generating the fourth data, the fourth data indicating at least:
   an angle associated with the FOV, the angle corresponding to the first portion of the FOV; and
   the first activation mode of the security system.

9. The method of claim 1, further comprising:
   generating the first data representing the user interface, the user interface including a diagram that represents a plurality of motion zones associated with the A/V device, the plurality of motion zones corresponding to the FOV,
   wherein the receiving of the second data indicating the first portion of the user interface comprises receiving the second data representing a selection of a motion zone from the plurality of motion zones.

10. The method of claim 1, wherein:
    the user interface includes an image, the image depicting the FOV; and
    the receiving of the second data indicating the first portion of the user interface comprises receiving the second data representing a selection of a portion of the image, the portion of the image corresponding to the first portion of the FOV.

11. A method comprising:
    receiving, from a user device, first data that associates a portion of a field of view (FOV) of an audio/video recording and communication device (A/V device) with an activation mode from a plurality of activation modes associated with a security system, the portion of the FOV being less than an entirety of the FOV;

receiving second data generated by the A/V device;

determining, based at least in part on the second data, that the A/V device detected motion associated with the portion of the FOV;

determining that the security system is operating in the activation mode; and based at least in part on the A/V device detecting the motion associated with the portion of the FOV and the security system operating in the activation mode, causing the security system to perform at least one action.

12. The method of claim 11, wherein the causing the security system to perform the at least one action comprises causing the security system to perform at least one of activating an alarm, outputting a warning sound, sending a user alert to the user device, or changing a power state of at least one automation device.

13. The method of claim 11, wherein the determining that the A/V device detected the motion associated with the portion of the FOV comprises at least determining, based at least in part on the second data, that a motion sensor of the A/V device detected the motion, the motion sensor being associated with the portion of the FOV.

14. The method of claim 11, wherein the second data is image data, and wherein the determining that the A/V device detected the motion associated with the portion of the FOV comprises at least:

determining that a portion of the image data represents an object; and determining that the portion of the image data corresponds to the portion of the FOV.

15. The method as recited in claim 11, further comprising:

receiving, from the user device, third data representing a request to operate the security system in the activation mode, wherein the determining that the security system is operating in the activation mode is based at least in part on the receiving of the third data.

16. The method as recited in claim 11, wherein the activation mode causes the security system to perform at least one action when an automation device associated with the security system detects an event.

17. The method as recited in claim 11, wherein the receiving of the first data comprises receiving, from the user device, the first data indicating:

a motion zone associated with the A/V device, the motion zone being associated with the portion of the FOV; and the activation mode associated with the security system.

18. The method as recited in claim 11, wherein the receiving of the first data comprises receiving, from the user device, the first data indicating:

a portion of image data generated by the A/V device, the portion of the image data corresponding to the portion of the FOV; and the activation mode associated with the security system.

19. The method of claim 11, wherein the receiving of the first data comprises receiving, from the user device, the first data indicating:

the portion of the FOV of the A/V device; and at least one of a stay mode, an away mode, a vacation mode, or a disarmed mode associated with the security system.

20. The method as recited in claim 11, further comprising:

causing the security system to operate in the activation mode, wherein the determining that the security system is operating in the activation mode is based at least in part on the causing of the security system to operate in the activation mode.

21. The method as recited in claim 11, further comprising storing the first data that associates the portion of the FOV with the activation mode associated with the security system.

22. An electronic device comprising:

one or more sensors;

one or more processors; and one or more computer-readable media storing instructions that, when executed by the one or more processors, cause the electronic device to perform operations comprising:

receiving, from one or more computing devices, first data indicating a portion of a field of view (FOV) of the electronic device, the portion of the FOV being less than an entirety of the FOV;

receiving, from the one or more computing devices, second data indicating an activation mode from a plurality of activation modes associated with a security system;

generating third data using the one or more sensors;

detecting, based at least in part on the third data, motion associated with the portion of the FOV;

determining that the security system is operating in the activation mode; and based at least in part on the detecting of the motion associated with the portion of the FOV and the determining that the security system is operating in the activation mode, performing one or more actions.

23. The electronic device as recited in claim 22, wherein the one or more sensors include at least a motion sensor associated with the portion of the FOV, and wherein the detecting of the motion associated with the portion of the FOV comprises at least determining, based at least in part on the third data, that the motion sensor detected the motion.

24. The electronic device as recited in claim 22, wherein the one or more sensors include a camera and the third data is image data, and wherein the detecting the motion associated with the portion of the FOV comprises:

determining that a portion of the image data represents an object; and determining that the portion of the image data corresponds to the portion of the FOV.

* * * * *